(12) United States Patent
Hirai et al.

(10) Patent No.: US 9,314,737 B2
(45) Date of Patent: Apr. 19, 2016

(54) DEHUMIDIFIER AND METHOD FOR PRODUCING DEHUMIDIFIER

(75) Inventors: Kiyoshi Hirai, Hyogo (JP); Shinji Miyazawa, Hyogo (JP); Shinichi Yasui, Hyogo (JP); Akiko Miyake, Kobe (JP)

(73) Assignee: Kobelco Eco-Solutions Co., Ltd., Kobe-shi (JP)

( * ) Notice: Subject to any disclaimer, the term of this patent is extended or adjusted under 35 U.S.C. 154(b) by 126 days.

(21) Appl. No.: 14/240,213

(22) PCT Filed: Aug. 24, 2012

(86) PCT No.: PCT/JP2012/071417
§ 371 (c)(1),
(2), (4) Date: Feb. 21, 2014

(87) PCT Pub. No.: WO2013/027821
PCT Pub. Date: Feb. 28, 2013

(65) Prior Publication Data
US 2015/0290577 A1 Oct. 15, 2015

(30) Foreign Application Priority Data

Aug. 24, 2011 (JP) .................................. 2011-182856
Aug. 24, 2011 (JP) .................................. 2011-182862
Aug. 24, 2011 (JP) .................................. 2011-182864

(51) Int. Cl.
*B01D 53/26* (2006.01)
*C25B 1/04* (2006.01)
(Continued)

(52) U.S. Cl.
CPC .......... *B01D 53/261* (2013.01); *B01D 53/0423* (2013.01); *B01D 53/0462* (2013.01); *B01D 53/263* (2013.01); *C25B 1/04* (2013.01); *C25B 15/08* (2013.01); *B01D 2253/104* (2013.01); *B01D 2253/106* (2013.01); *B01D 2253/108* (2013.01); *B01D 2256/12* (2013.01); *B01D 2256/16* (2013.01); *B01D 2257/80* (2013.01);
(Continued)

(58) Field of Classification Search
CPC ............ B01D 53/261; B01D 53/0423; B01D 53/0462; B01D 2256/12; B01D 2256/16; B01D 2257/80; B01D 2259/40096; C25B 1/04
USPC ........ 95/90, 117; 96/121, 122, 126, 127, 131, 96/133, 143
See application file for complete search history.

(56) References Cited

U.S. PATENT DOCUMENTS 2,083,732 A * 6/1937 Moore et al. .................... 96/126
3,240,567 A * 3/1966 Caparreli et al. ............. 206/525
(Continued)

FOREIGN PATENT DOCUMENTS

DE 3310759 A1 9/1984
EP 0014895 A1 9/1980
(Continued)

*Primary Examiner* — Frank Lawrence
(74) *Attorney, Agent, or Firm* — The Webb Law Firm

(57) ABSTRACT

Provided is a dehumidifier including an adsorption column allowing a to-be-treated gas produced by electrolysis of water to circulate therethrough so as to allow moisture in the to-be-treated gas to be adsorbed therein, wherein the adsorption column includes an adsorbent capable of adsorbing moisture, a column body having a housing region containing the adsorbent, and a heating unit arranged within the column body and capable of heating the adsorbent so as to cause desorption of the adsorbed moisture from the adsorbent, and the column body is a tube having a bent portion.

5 Claims, 55 Drawing Sheets

(51) Int. Cl.
*C25B 15/08* (2006.01)
*B01D 53/04* (2006.01)

(52) U.S. Cl.
CPC ............. *B01D 2259/40088* (2013.01); *B01D 2259/40096* (2013.01); *B01D 2259/4566* (2013.01); *Y02E 60/366* (2013.01)

(56) References Cited

U.S. PATENT DOCUMENTS

| | | | | |
|---|---|---|---|---|
| 3,850,592 | A * | 11/1974 | Huffman | 95/123 |
| 4,304,577 | A | 12/1981 | Ito et al. | |
| 4,661,128 | A * | 4/1987 | Bachhofer et al. | 96/127 |
| 4,741,697 | A * | 5/1988 | Herbison | 433/25 |
| 5,240,483 | A * | 8/1993 | Rosen | 96/137 |
| 5,581,903 | A * | 12/1996 | Botich | 34/264 |
| 6,139,609 | A * | 10/2000 | Eimer et al. | 96/117.5 |
| 2005/0199126 | A1* | 9/2005 | Arno et al. | 96/108 |
| 2008/0202336 | A1 | 8/2008 | Hofer et al. | |

FOREIGN PATENT DOCUMENTS

| | | |
|---|---|---|
| EP | 0123086 A2 | 10/1984 |
| JP | 59213423 A | 12/1984 |
| JP | 623480 A | 2/1994 |
| JP | 2004149890 A | 5/2004 |
| JP | 2007185617 A | 7/2007 |
| JP | 2008138153 A | 6/2008 |
| JP | 2009179842 A | 8/2009 |

* cited by examiner

F I G . 7
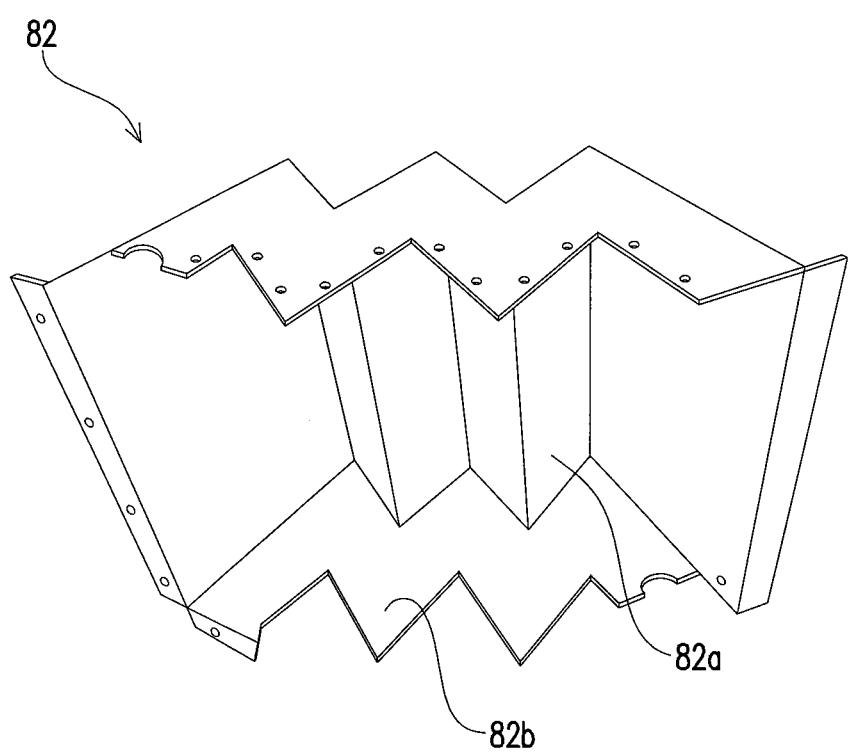

F I G . 16
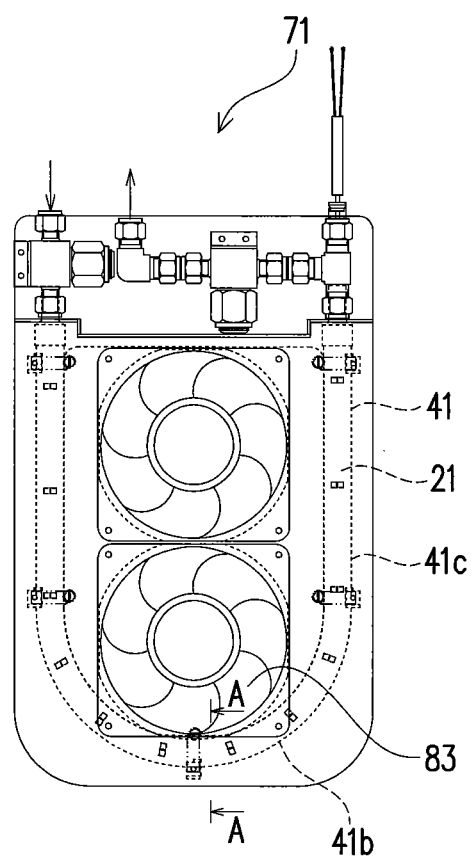

F I G . 25
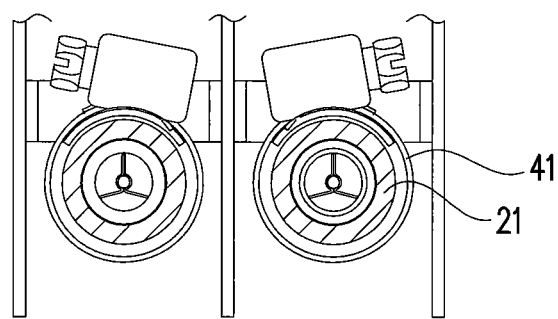

F I G . 29
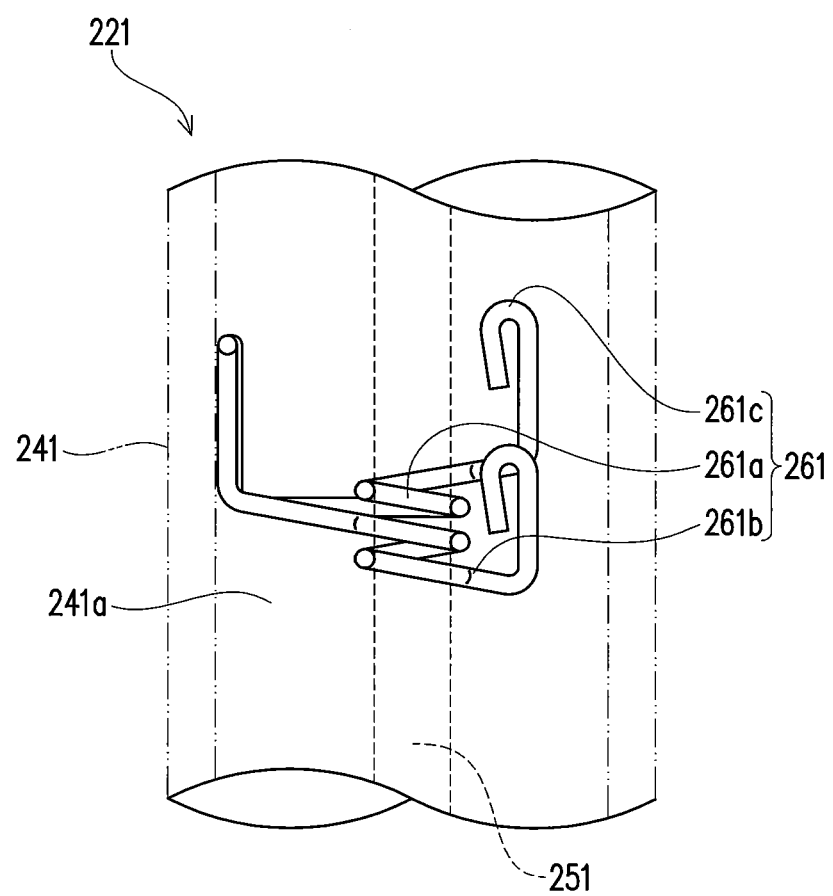

F I G . 33
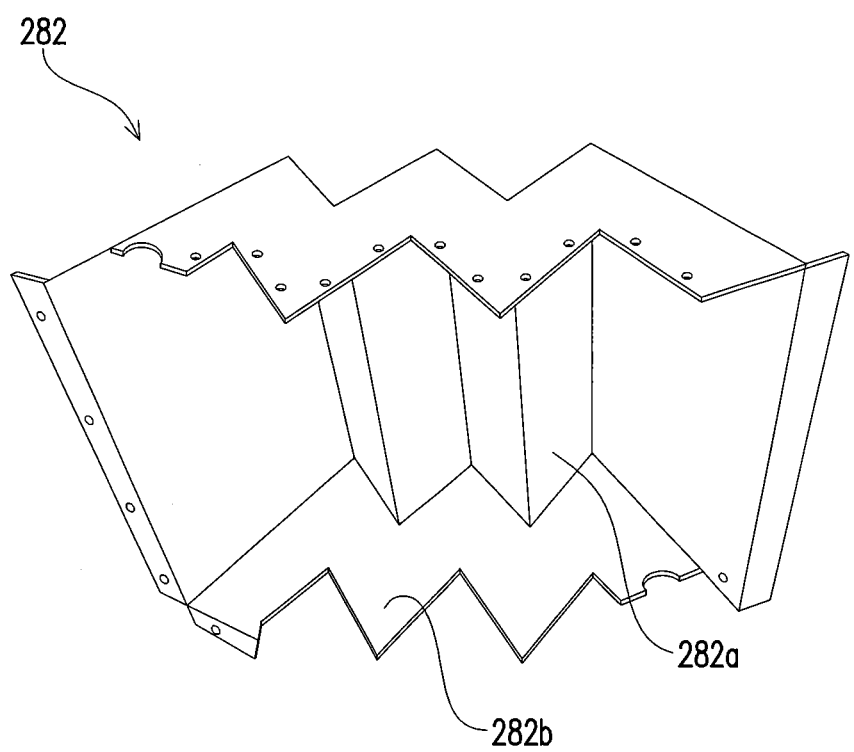

F I G . 41
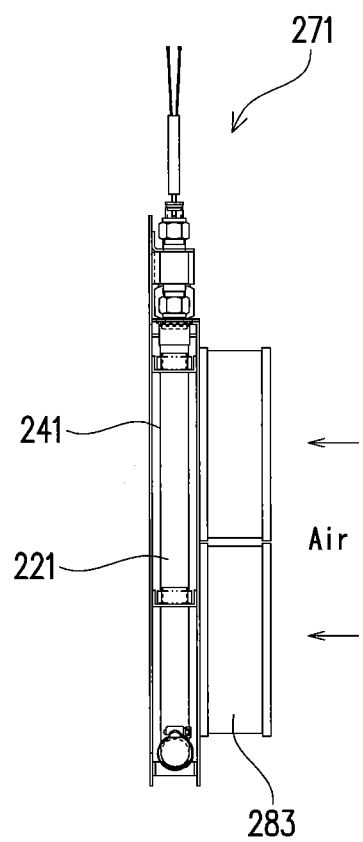

F I G . 44
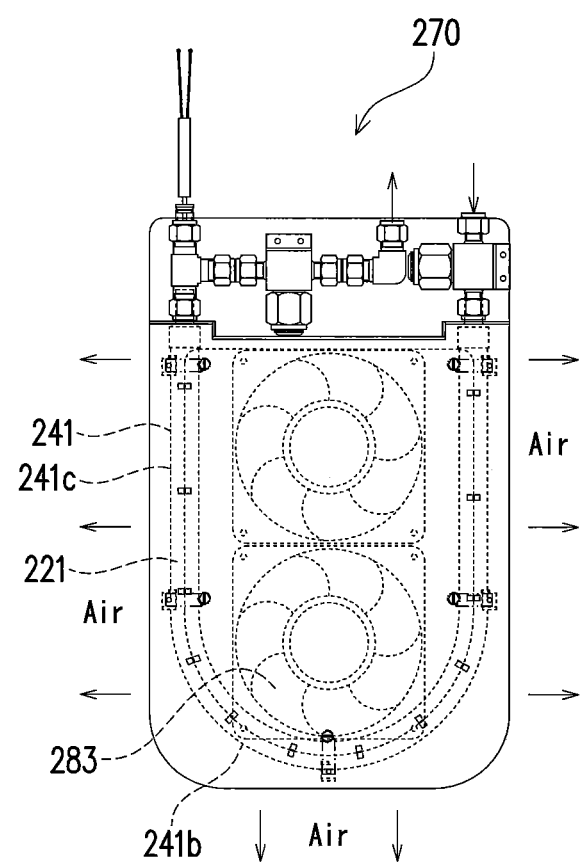

F I G . 52
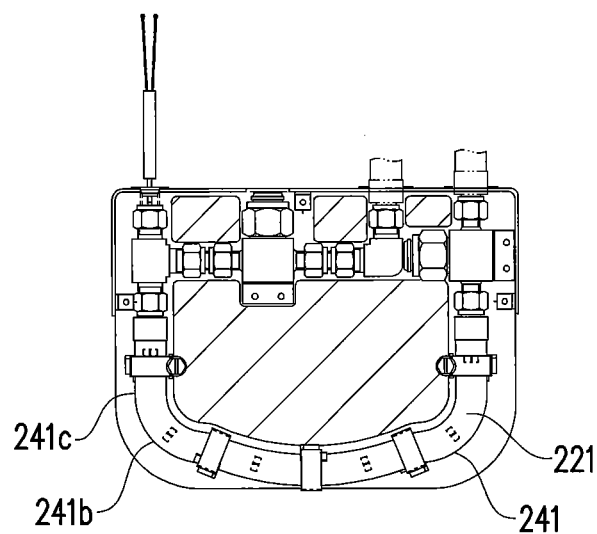

F I G. 6 1
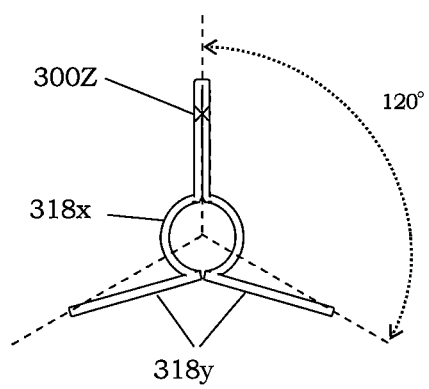
F I G. 6 2
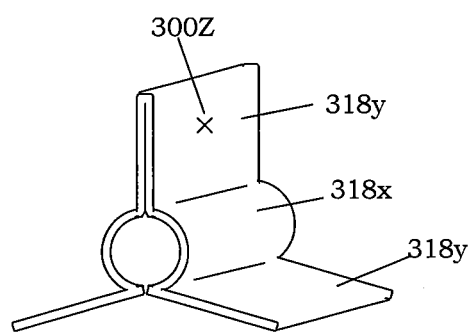

DEHUMIDIFIER AND METHOD FOR PRODUCING DEHUMIDIFIER

CROSS-REFERENCE TO RELATED APPLICATIONS

This application is the United States national phase of International Application No. PCT/JP2012/071417 filed Aug. 24, 2012 and claims priority to Japanese Patent Application Nos. 2011-182856, 2011-182862, and 2011-182864, the disclosures of which are incorporated herein by reference in its entirety.

FIELD

The present invention relates to a dehumidifier provided with an adsorption column allowing a to-be-treated gas containing moisture to circulate therethrough so as to allow moisture in the to-be-treated gas to be adsorbed therein, and to a method for producing a dehumidifier.

BACKGROUND

Conventionally, various types of dehumidifiers are known as a dehumidifier provided with an adsorption column allowing a to-be-treated gas to circulate therethrough so as to allow moisture in the to-be-treated gas to be adsorbed therein. For example, there is known a dehumidifier provided with an adsorption column including an adsorbent that adsorbs moisture, a column body that has a housing region containing the adsorbent, and a heating unit that is arranged within the column body and heats the adsorbent so as to cause desorption of the adsorbed moisture therefrom, see JP 2004-149890 A.

Such a dehumidifier includes a plurality of adsorption columns, specifically two adsorption columns, which are configured so that moisture in the to-be-treated gas can be alternately adsorbed therein. That is, this dehumidifier has a configuration such that, while moisture in the to-be-treated gas is adsorbed in one adsorption column, moisture is desorbed from an adsorbent in the other adsorption column so that the adsorbent is regenerated. More specifically, this dehumidifier has a configuration such that, while moisture in the to-be-treated gas is adsorbed in one adsorption column, a heating unit heats an adsorbent that has adsorbed moisture so as to cause desorption of the moisture from the adsorbent, followed by cooling the adsorbent, in the other adsorption column.

SUMMARY

Technical Problem

Conventionally, water is electrolyzed by a hydrogen-oxygen generator to generate hydrogen and oxygen, and the resultant hydrogen gas and oxygen gas are each injected into a tank for use.

Since moisture is contained in a gas obtained by electrolysis of water, moisture is removed therefrom using such a dehumidifier as mentioned above before injection into the tank.

Also, even in the case without the injection into the tank, moisture is removed from the gas using the dehumidifier, because of a problem that a drain occurs when moisture is contained in the gas, and for the purpose of removing moisture which is an impurity in the gas.

Recently, there has been a demand, for example, for transporting the hydrogen-oxygen generator to a location where hydrogen gas or oxygen gas is consumed by putting the hydrogen-oxygen generator in a transportation such as automobiles, so that such gas is generated in the consumption area.

Under such circumstances, there is a growing demand for not only the hydrogen-oxygen generator but also the dehumidifier to be compact. However, compactification of these devices, for which stationary use has been assumed, has hardly been studied so far, and thus the solution thereof also has not been sufficiently established.

Accordingly, it has been difficult to satisfy the above-mentioned demand.

Meanwhile, if the size of the dehumidifier is simply reduced, a degradation in moisture adsorption capacity of the adsorption column may possibly occur at a relatively early stage. Further, the functions of the dehumidifier may possibly be necessary to be stopped frequently, in order to regenerate the adsorbent.

Accordingly, it is desirable that the adsorption column have a long thin shape so as to improve the efficiency of heating and cooling the adsorbent while ensuring the content of the adsorbent, in view of the efficiency of moisture removal. However, when the adsorption column is made long, there is a constraint in installation space of the dehumidifier, and it becomes difficult to satisfy the demand for compactification to a sufficient extent.

In view of such circumstances, it is an object of the present invention to provide a dehumidifier in which the possibility of occurrence of a constraint in installation space is reduced, while the decrease in the efficiency of moisture removal is suppressed. Further, it is another object of the present invention to provide a method for producing such a dehumidifier.

Solution to Problem

In order to solve the above-mentioned problems, a dehumidifier according to the present invention includes an adsorption column allowing at least one to-be-treated gas of hydrogen and oxygen produced by electrolysis of water to circulate therethrough so as to allow moisture in the to-be-treated gas to be adsorbed therein, wherein the adsorption column includes: an adsorbent capable of adsorbing moisture; a column body having a housing region containing the adsorbent; and a heating unit arranged within the column body and capable of heating the adsorbent so as to cause desorption of the adsorbed moisture from the adsorbent, and the column body is a tube having a bent portion.

In the dehumidifier including the column body having a bent portion, it is preferable that the heating unit be formed into a rod shape, and the adsorption column further include a support member arranged within the column body and capable of supporting the heating unit along a center axis of the column body.

Preferably, the dehumidifier including the column body having a bent portion further includes a fin in contact with the outer surface of the tube.

Preferably, the dehumidifier including the column body having a bent portion further includes a duct housing the adsorption column therein and allowing a gas for cooling the adsorption column to circulate therethrough, wherein the duct is formed so as to have a zigzag flow path for the gas circulating in the duct.

In the dehumidifier including the column body having a bent portion, the tube is preferably a corrugated tube having a recess and a projection repeatedly formed along the circulation direction of the to-be-treated gas on its outer surface.

According to the present invention, there is further provided a method for producing a dehumidifier, the dehumidifier including: an adsorption column allowing at least one to-be-treated gas of hydrogen and oxygen produced by electrolysis of water to circulate therethrough so as to allow moisture in the to-be-treated gas to be adsorbed therein, the adsorption column including: an adsorbent capable of adsorbing moisture; a column body having a housing region containing the adsorbent; and a heating unit arranged within the column body and capable of heating the adsorbent so as to cause desorption of the adsorbed moisture from the adsorbent, the method including: after loading an inside of a straight tube constituting the column body with the heating unit and the adsorbent, bending the tube, so as to produce the dehumidifier including the column body formed of a tube having a bent portion.

In order to solve the above-mentioned problems, a dehumidifier according to the present invention includes an adsorption column allowing at least one to-be-treated gas of hydrogen and oxygen produced by electrolysis of water to circulate therethrough so as to allow moisture in the to-be-treated gas to be adsorbed therein, wherein the adsorption column includes: an adsorbent capable of adsorbing moisture; a column body having a housing region containing the adsorbent; and a heating unit arranged within the column body and capable of heating the adsorbent so as to cause desorption of the adsorbed moisture from the adsorbent, and the column body is a tube having at least one of a recess and a projection on its outer surface.

In the dehumidifier including the column body that is a tube having at least one of a recess and a projection on its outer surface, the tube is preferably a corrugated tube having a recess and a projection repeatedly formed along the circulation direction of the to-be-treated gas on its outer surface.

In the dehumidifier including the column body that is a tube having at least one of a recess and a projection on its outer surface, the tube preferably has a bent portion.

Preferably, the dehumidifier including the column body that is a tube having at least one of a recess and a projection on its outer surface further includes a fin in contact with the outer surface of the tube.

Preferably, the dehumidifier including the column body that is a tube having at least one of a recess and a projection on its outer surface further includes a duct housing the adsorption column therein and allowing a gas for cooling the adsorption column to circulate therethrough, wherein the duct is formed so as to have a zigzag flow path for the gas circulating in the duct.

In the dehumidifier including the column body that is a tube having at least one of a recess and a projection on its outer surface, it is preferable that the heating unit be formed into a rod shape, and the adsorption column further include a support member arranged within the column body and capable of supporting the heating unit along a center axis of the column body.

In order to solve the above-mentioned problems, a dehumidifier according to the present invention includes a plurality of adsorption columns allowing at least one to-be-treated gas of hydrogen and oxygen produced by electrolysis of water to circulate therethrough so as to allow moisture in the to-be-treated gas to be adsorbed therein, and a connector coupling the adsorption columns to each other, wherein the adsorption columns each have: an adsorbent capable of adsorbing moisture; a column body that has a housing region containing the adsorbent; and a heating unit that is arranged within the column body and heats the adsorbent so as to cause desorption of the adsorbed moisture from the adsorbent, the adsorption columns include one adsorption column and another adsorption column arranged so as to be parallel to each other, the connector is configured to couple the one adsorption column and the other adsorption column to each other on one end side of the one adsorption column and the other adsorption column, and the to-be-treated gas, after circulating through the housing region of the one adsorption column, circulates through the housing region of the other adsorption column via the connector.

In the dehumidifier including the connector, each of the adsorption columns preferably further includes a plurality of fins each lying along a circumferential direction.

Preferably, the dehumidifier including the connector further includes a blower capable of applying a blow from the outside to the plurality of adsorption columns so as to cool the adsorbent in the adsorption columns.

BRIEF DESCRIPTION OF DRAWINGS

FIG. 7 is a perspective view of the cover of the dehumidifier according to the first embodiment.

FIG. 16 is a schematic rear view of the first adsorption unit of the dehumidifier according to the other embodiment.

FIG. 25 is a cross sectional view in the direction of arrows B-B of FIG. 24.

FIG. 29 is a schematic view schematically showing a cross section, cut along the circulation direction of the to-be-treated gas, of the adsorption column provided in the dehumidifier according to the second embodiment.

FIG. 33 is a perspective view of the cover of the dehumidifier according to the second embodiment.

FIG. 41 is a schematic side view of the first adsorption unit of the dehumidifier according to the other embodiment.

FIG. 44 is a schematic front view of an adsorption unit of a dehumidifier according to another embodiment.

FIG. 52 is a cross sectional view in the direction of arrows A-A of FIG. 49.

FIG. 61 is a cross sectional view, cut along a plane perpendicular to an extending direction of a heating unit, of a support member according to a modification.

FIG. 62 is a perspective view showing the support member according to the modification.

DESCRIPTION OF EMBODIMENTS

Hereinafter, embodiments of the present invention are described with reference to the drawings.

<First Embodiment>

First, a dehumidifier according to a first embodiment is described.

The dehumidifier of the first embodiment includes an adsorption column allowing at least one to-be-treated gas of hydrogen and oxygen produced by electrolysis of water to circulate therethrough so as to allow moisture in the to-be-treated gas to be adsorbed therein. The adsorption column has an adsorbent that adsorbs moisture, a column body that has a housing region containing the adsorbent, and a heating unit that is arranged within the column body and heats the adsorbent so as to cause desorption of the adsorbed moisture from the adsorbent. The column body is a tube having bent portions.

As a specific example, a dehumidifier including two sets of adsorption units each having the aforementioned adsorption column for moisture removal from the to-be-treated gas is herein mentioned, and the first embodiment is described further in detail with reference to the drawings.

Figure 1:
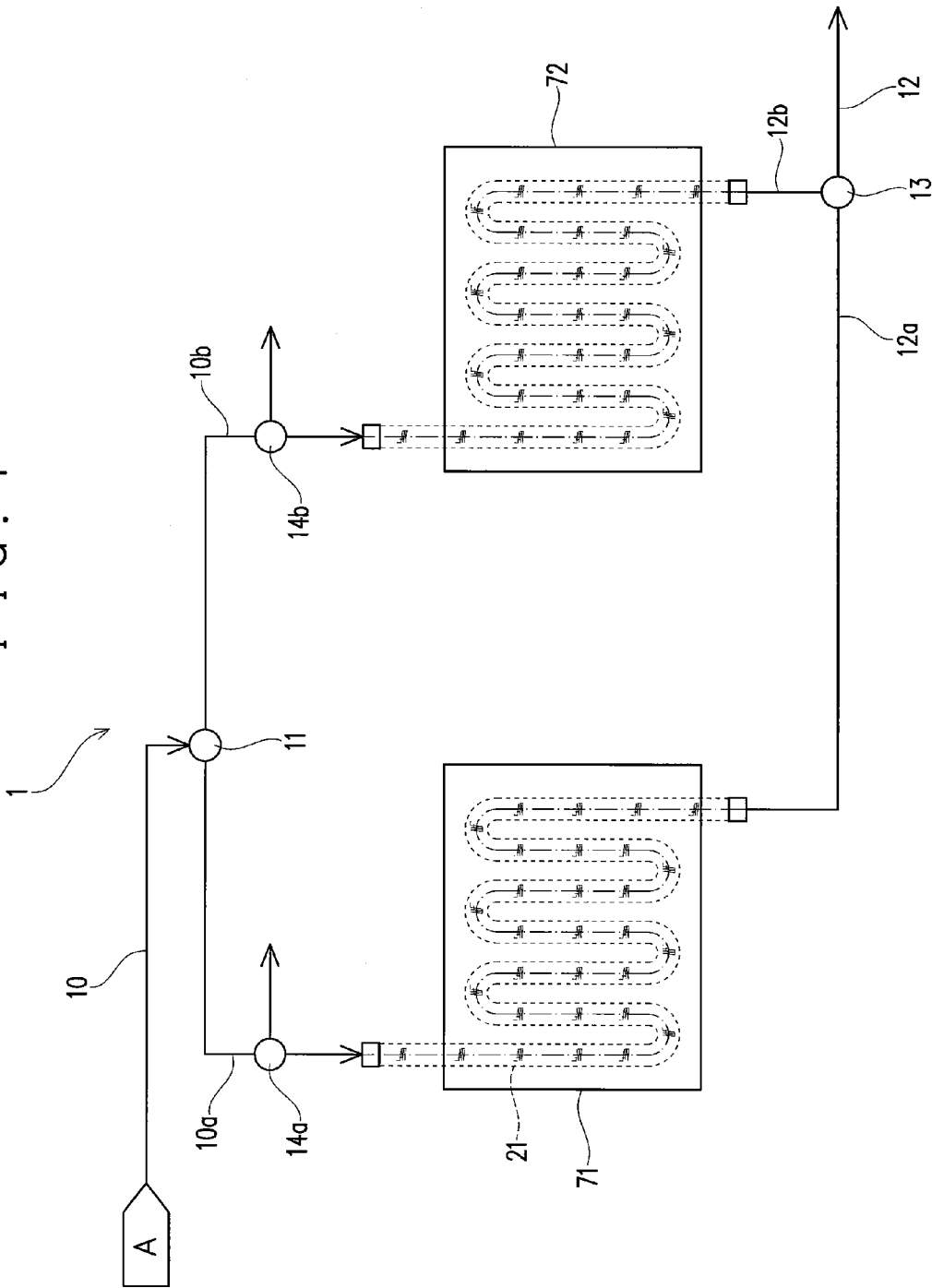
FIG. 1 is a schematic view of a dehumidifier according to a first embodiment (view schematically showing a cross section of cores of adsorption columns).

As shown in FIG. 1, a to-be-treated gas A that is subjected to moisture removal in a dehumidifier 1 of the first embodiment is produced by electrolysis of water and is at least one of hydrogen and oxygen.

The to-be-treated gas A generally contains moisture because it is produced by electrolysis of water. Further, the to-be-treated gas A can be used for various applications after the moisture removal by the dehumidifier 1.

As a device to be used in combination with the dehumidifier 1 of the first embodiment for producing the to-be-treated gas A, that is, a device for producing hydrogen and oxygen by electrolysis of water, a conventionally known general device can be used.

Figure 2:
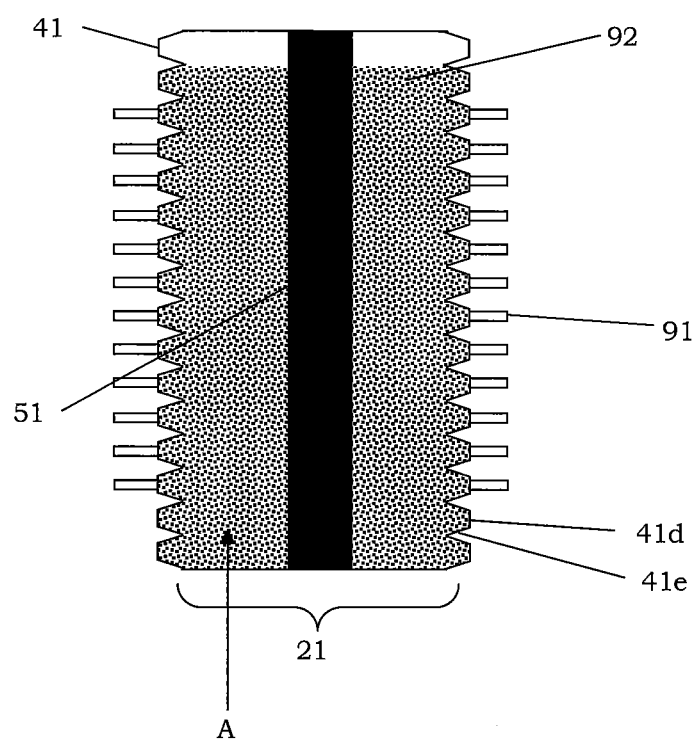
FIG. 2 is a schematic view schematically showing a cross section, cut along a circulation direction of a to-be-treated gas, of an adsorption column provided in the dehumidifier according to the first embodiment.

In the first embodiment, the dehumidifier 1 is described by exemplifying the case where the to-be-treated gas A to which a pressure higher than the atmospheric pressure is applied is supplied to the dehumidifier 1 so that the to-be-treated gas A can circulate through an adsorption column 21 filled with an adsorbent 92, as shown in FIG. 2.

As shown in FIG. 1, the dehumidifier 1 of the first embodiment includes two sets of adsorption units (71, 72) for removing moisture from the to-be-treated gas A. These two sets of adsorption units include one adsorption unit (hereinafter referred to also as a "first adsorption unit (71)") and the other adsorption unit (hereinafter referred to also as a "second adsorption unit (72)") with the same configuration.

As shown in FIG. 1, the dehumidifier 1, for example, includes a supply conduit 10 configured to supply the to-be-treated gas A to the first adsorption unit 71 or the second adsorption unit 72, a supply valve 11 attached to the supply conduit 10, a discharge conduit 12 configured to discharge the treated gas A from which moisture has been removed (hereinafter referred to also as a "dried gas") in the first adsorption unit 71 or the second adsorption unit 72 to the outside of the dehumidifier 1, and a discharge valve 13 attached to the discharge conduit 12.

The supply conduit 10 is arranged so as to connect the first adsorption unit 71 and the second adsorption unit 72 to each other. Further, the supply valve 11 is attached to a position in the course of the supply conduit 10. The supply conduit 10 includes a first supply conduit 10a on the first adsorption unit 71 side of the supply valve 11 and a second supply conduit 10b on the second adsorption unit 72 side of the supply valve 11.

The supply valve 11 is configured to deliver the to-be-treated gas A supplied from the outside of the dehumidifier 1 to either the first supply conduit 10a or the second supply conduit 10b.

The first supply conduit 10a is configured to supply the to-be-treated gas A to the first adsorption unit 71 through the supply valve 11 attached to its one end.

The second supply conduit 10b is configured to supply the to-be-treated gas A to the second adsorption unit 72 through the supply valve 11 attached to its one end.

With such a configuration, the dehumidifier 1 allows the to-be-treated gas A supplied from the outside of the dehumidifier 1 to be supplied to either the first supply conduit 10a or the second supply conduit 10b through the supply valve 11.

The discharge conduit 12 is arranged so as to connect the first adsorption unit 71 and the second adsorption unit 72 to each other. Further, the discharge valve 13 is attached to a position in the course of the discharge conduit 12. The discharge conduit 12 includes a first discharge conduit 12a on the first adsorption unit 71 side of the discharge valve 13 and a second discharge conduit 12b on the second adsorption unit 72 side of the discharge valve 13.

The discharge valve 13 is configured to discharge a dried gas, to the outside of the dehumidifier 1, which has been generated in either the first adsorption unit 71 or the second adsorption unit 72 and delivered through the first discharge conduit 12a or the second discharge conduit 12b.

The first discharge conduit 12a is configured to discharge, from the first adsorption unit 71, a dried gas generated in the first adsorption unit 71 and deliver it to the discharge valve 13.

The second discharge conduit 12b is configured to discharge, from the second adsorption unit 72, a dried gas generated in the second adsorption unit 72 and deliver it to the discharge valve 13.

With such a configuration, the dehumidifier 1 allows the dried gas generated in the first adsorption unit 71 or the second adsorption unit 72 to be discharged to the outside of the dehumidifier 1 through the discharge valve 13.

That is, the dehumidifier 1 is configured to switch the supply destination of the to-be-treated gas A between the first adsorption unit 71 and the second adsorption unit 72 using the supply valve 11, and to supply the to-be-treated gas A to either the first adsorption unit 71 or the second adsorption unit 72 through either one of the supply conduits (10a, 10b). Further, the dehumidifier 1 is configured to discharge the dried gas from either the first adsorption unit 71 or the second adsorption unit 72 to the outside of the dehumidifier 1 through the discharge conduit 12 using the discharge valve 13.

Due to such a configuration of the dehumidifier 1, the adsorbent that is contained in the adsorption column 21 and has already adsorbed moisture is allowed to desorb the moisture by heating so as to be thermally regenerated in the second adsorption unit 72, while moisture in the to-be-treated gas A is adsorbed in the adsorption column 21 in the first adsorption unit 71.

Examples of the adsorbent include conventionally known general adsorbents, specifically, such as granular synthetic zeolite, silica gel, and active alumina.

Further, the dehumidifier 1 includes a first release valve 14a and a second release valve 14b attached respectively to the first supply conduit 10a and the second supply conduit 10b. Further, the dehumidifier 1 has a configuration in which, when the adsorbent 92 is thermally regenerated in the second adsorption unit 72 while moisture is removed from the to-be-treated gas A in the first adsorption unit 71, part of the dried gas is allowed to flow back into the second adsorption unit 72 through the discharge valve 13 as a purge gas, so that water vapor and heat generated in the second adsorption unit 72 due to the thermal regeneration can be released to the outside of the system through the second release valve 14b attached to the second supply conduit 10b.

Further, the dehumidifier 1 has a configuration in which, when the adsorbent 92 is thermally regenerated in the first adsorption unit 71 while moisture is removed from the to-be-treated gas A in the second adsorption unit 72, part of the dried gas is allowed to flow back into the first adsorption unit 71 through the discharge valve 13 as a purge gas, so that water vapor and heat generated in the first adsorption unit 71 due to the thermal regeneration can be released to the outside of the system through the first release valve 14a attached to the first supply conduit 10a.

With such a configuration, the dehumidifier 1 can remove water vapor and heat generated in the adsorption units 71 and 72.

Figure 3:
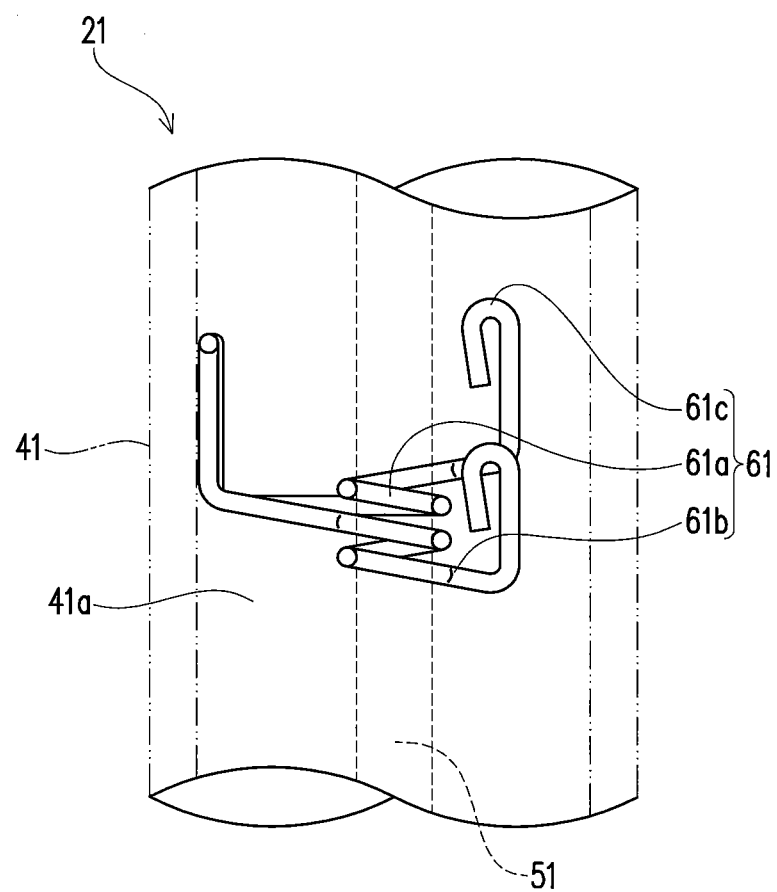
FIG. 3 is a schematic view schematically showing a cross section, cut along the circulation direction of the to-be-treated gas, of the adsorption column provided in the dehumidifier according to the first embodiment.
Figure 4:
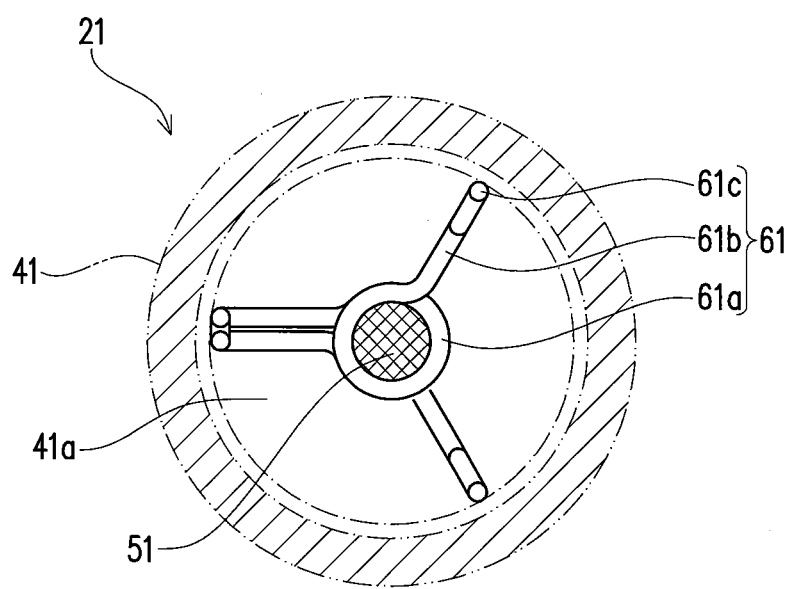
FIG. 4 is a schematic view schematically showing a cross section, cut along a direction perpendicular to the circulation direction of the to-be-treated gas, of the adsorption column provided in the dehumidifier according to the first embodiment.

As shown in FIGS. 3 and 4, a column body 41, for example, is formed into a cylindrical shape. Further, the column body 41 is formed so as to have a hollow space thereinside which can be used as a housing region 41a containing an adsorbent that adsorbs moisture contained in the to-be-treated gas A.

Further, the column body 41 has a vent hole (not shown in the figure) at each of both ends in the circulation direction of the to-be-treated gas A. The column body 41 has a configuration in which the to-be-treated gas A supplied through the vent hole (not shown in the figure) on the one end side is discharged through the vent hole (not shown in the figure) on the other end side.

Figure 5:
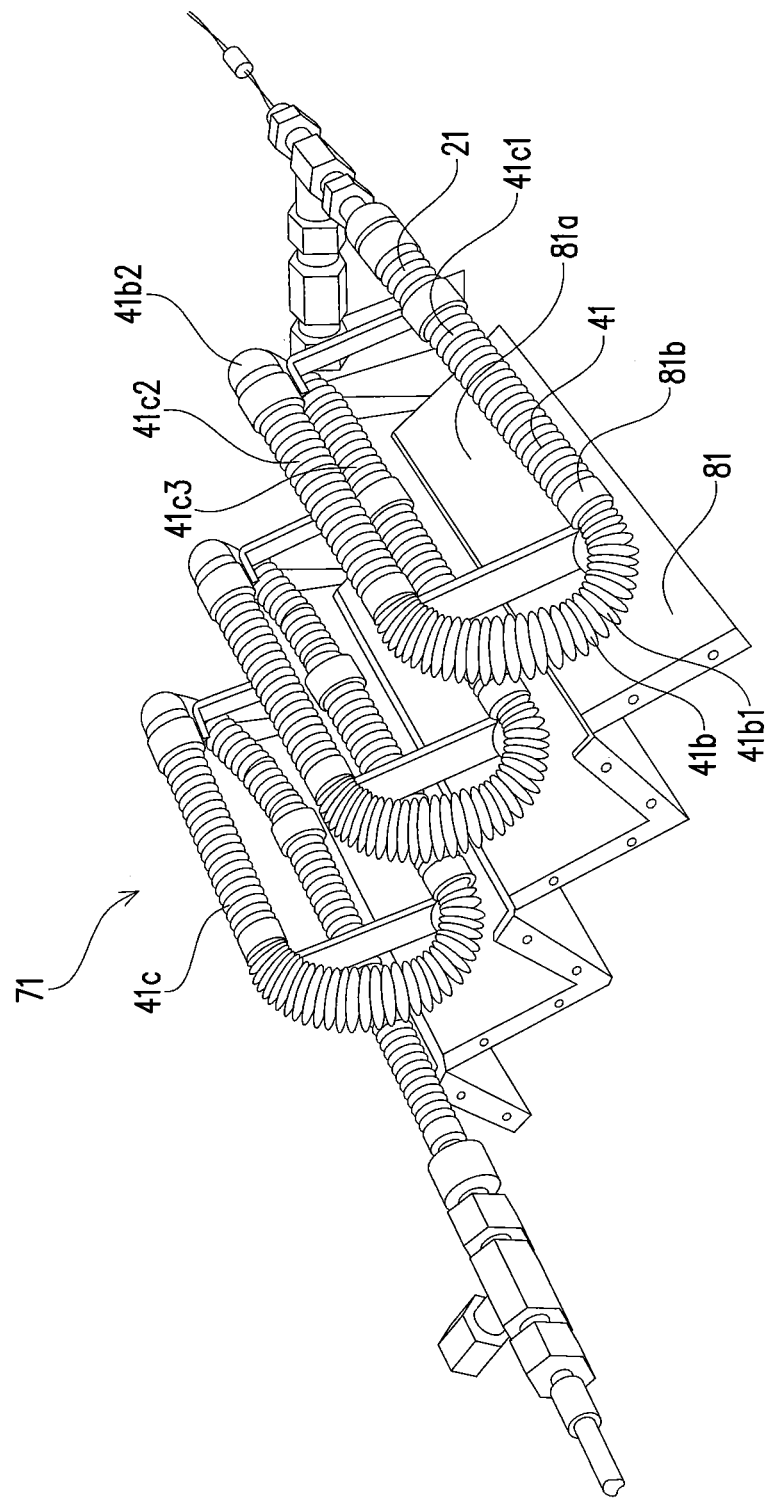
FIG. 5 is a perspective view of an adsorption unit of the dehumidifier according to the first embodiment (without a cover).

Further, the column body 41 is a tube having bent portions 41b as shown in FIG. 5.

Since the column body 41 is a tube having the bent portions 41b, the dehumidifier 1 of the first embodiment is restricted from being elongated in one direction, as compared to a conventional dehumidifier in which the column body has no bent portions, so that the possibility of occurrence of a constraint in installation space can be reduced while the decrease in the efficiency of moisture removal is suppressed.

The adsorbent and the heating unit 51 may be provided also in the hollow space of the bent portions 41b. Due to such a configuration, the dehumidifier 1 of the first embodiment has advantages of being capable of removing moisture from the to-be-treated gas A also in the bent portions 41b, and also efficiently discharging moisture adsorbed on the adsorbent to the outside of the system.

Furthermore, in the dehumidifier 1 of the first embodiment, the column body 41 may be formed so that the to-be-treated gas A circulates in one direction through the column body 41, and further the to-be-treated gas A that has circulated in the one direction through the column body 41 circulates in a direction opposite to the one direction through the column body 41. Further, the column body 41 may be formed so that the to-be-treated gas A that has circulated in the opposite direction through the column body 41 circulates in the one direction through the column body 41.

As shown in FIG. 2, the tube 41 may have at least one of a recess 41e and a projection 41d on its outer surface.

When the tube 41 has such a configuration, the dehumidifier 1 of the first embodiment has an advantage that the outer surface area of the column body 41 is enlarged, so that the adsorbent from which moisture has been desorbed by heating is efficiently cooled. Further, the dehumidifier 1 has an advantage that, while an equivalent cooling efficiency is maintained, the length of the column body 41 can be shortened, as compared to the length of a column body that is a tube having no recess or projection on its outer surface and having the same outer surface area as the column body 41.

Further, due to enhanced cooling efficiency, the dehumidifier 1 has an advantage of being capable of reducing the time from when moisture has been desorbed by heating of the adsorbent to when the adsorbent has been sufficiently cooled.

Incidentally, a conventional dehumidifier is composed of two adsorption columns in the same manner as the dehumidifier 1 of the first embodiment. The conventional dehumidifier is configured so that, while an adsorbent is heated and cooled in one adsorption column, moisture is removed from a to-be-treated gas by an adsorbent in the other adsorption column. Accordingly, in such a conventional dehumidifier, as the time required to heat and cool the adsorbent in the one adsorption column increases, the amount of to-be-treated gas which is treated in the other adsorption column also increases. Accordingly, the conventional dehumidifier suffers from a problem that the amount of adsorbent to be stored in the other adsorption column increases in order to treat a large amount of the to-be-treated gas, resulting in an increase in size of the dehumidifier itself.

In contrast, in the dehumidifier 1 of the first embodiment, the tube 41 has at least one of the recess 41e and the projection 41d on its outer surface, so that the outer surface area of the column body 41 is increased. Therefore, in the dehumidifier of the first embodiment, it is easier to cool the column body 41. Accordingly, the dehumidifier of the first embodiment has an advantage that the time to cool the adsorbent provided in the column body 41 can be reduced. Furthermore, since the dehumidifier 1 of the first embodiment includes the heating unit 51 provided within the column body 41, it is easier in the dehumidifier 1 of the first embodiment to cool the column body 41, as compared to a conventional dehumidifier in which a heating unit is provided in the outer circumference of a column body. Therefore, the dehumidifier of the first embodiment has an advantage that the time to cool the adsorbent provided in the column body 41 can be reduced. Accordingly, the compactification of the dehumidifier 1 of the first embodiment is easy, and the possibility of occurrence of a constraint in installation space is reduced.

Accordingly, the dehumidifier 1 of the first embodiment is advantageous in that the possibility of occurrence of a constraint in installation space can be reduced, while the decrease in the efficiency of moisture removal is suppressed.

Furthermore, the dehumidifier 1 of the first embodiment is advantageous also in that, since it is easy to cool the column body 41, as mentioned above, the amount of dried gas to be used as a purge gas for cooling the column body 41 can be reduced.

The tube 41 having at least one of a recess and a projection on its outer surface is preferably a corrugated tube having a recess and a projection repeatedly formed along the circulation direction of the to-be-treated gas A on its outer surface, as shown in FIG. 5.

Examples of the material for the tube 41 include stainless steel and titanium. Besides that, an alloy containing nickel as the main component also can be used therefor. Such an alloy contains at least 40 mass % of nickel. Examples of components to be contained in the alloy other than nickel include molybdenum, chromium, and iron.

Further, the dehumidifier 1 of the first embodiment may further include fins 91 in contact with the outer surface of the tube 41, as shown in FIG. 2.

By providing the fins 91 on the outer surface of the tube 41, the outer surface area of the column body 41 as the aforementioned tube is still more enlarged in the dehumidifier 1 of the first embodiment. Therefore, the dehumidifier 1 of the first embodiment has an advantage that the adsorbent 92 from which moisture has been desorbed by heating is efficiently cooled. Further, the dehumidifier 1 of the first embodiment has an advantage that, while an equivalent cooling efficiency by the column body 41 is maintained, the length of the column body 41 can be shortened, as compared to the case where the tube 41 has no fins on its outer surface.

Accordingly, when the dehumidifier 1 of the first embodiment has such a configuration, the possibility of occurrence of a constraint in installation space is still further reduced, while the decrease in the efficiency of moisture removal is still further suppressed.

The dehumidifier 1 of the first embodiment may be configured so as to have the fins 91 each lying along the circumferential direction of the tube 41.

The heating unit 51, for example, is formed into a rod shape, as shown in FIGS. 3 and 4. Further, the heating unit 51 is arranged within the column body 41 along the extending direction of the column body 41. The adsorption column 21 includes the heating unit 51.

Furthermore, the heating unit 51 is arranged so as to coincide with the center axis of the column body 41 having a cylindrical shape.

Moreover, the heating unit 51, for example, is provided with an electrical heater having a rod shape. Further, the heating unit 51 is configured to heat the adsorbent contained in the column body 41 using the electrical heater.

It should be noted that the conventional dehumidifier has a configuration in which an electrical heater as a heating unit is wound around the outer circumference of the column body. Accordingly, the conventional dehumidifier has a problem that part of heat generated from the electrical heater is directly released to the outside of the system without heating the adsorbent in the column body 41. In view of such a problem, there is also known a conventional dehumidifier having a configuration including a heat insulator in the form of a sheet wrapped around the electrical heater and the column body. However, the dehumidifier having such a heat insulator has a problem that it is difficult to cool the adsorbent that has been heated.

In contrast, since the heating unit 51 is arranged within the column body 41, the dehumidifier 1 of the first embodiment has an advantage of being capable of heating the adsorbent efficiently, and further has an advantage of being capable of cooling the adsorption column 21 efficiently, as compared to the conventional dehumidifier in which the electrical heater is wound around the outer circumference of the column body.

The region between the heating unit 51 and the column body 41 serves as the housing region 41*a* containing the adsorbent, as shown in FIGS. 3 and 4. The adsorbent can be provided in the adsorption column 21 so as to occupy almost the entire housing region 41*a*.

The adsorption column 21 may include a support member 61 arranged within the column body 41 so as to support the heating unit 51, as shown in FIGS. 3 and 4. Further, the adsorption column 21 may be configured so that the heating unit 51 is supported by the support member 61 along the center axis of the adsorption column 21.

Specifically, as shown in FIGS. 3 and 4, the support member 61 including: a winding portion 61*a* formed by winding wire rods around the outer circumference of the heating unit 51; a plurality of leg portions 61*b* formed by allowing the wire rods to radially extend outwardly from the winding portion 61*a* toward the inner side wall of the column body 41; and a plurality of pressing portions 61*c* formed, by bending the wire rods of the leg portions 61*b* at their outer ends so that each wire rod extends along the inner side wall of the column body 41, so as to press the inner side wall of the column body 41 by repulsive elastic forces of the thus bent wire rods, for example, can be used. This support member 61 is restricted from moving within the column body 41 by the repulsive elastic forces of the plurality of pressing portions 61*c*. That is, the position of the winding portion 61*a* is fixed within the column body 41. This allows the support member 61 to support the heating unit 51 by the winding portion 61*a* restricting the movement of the heating unit 51 having a rod shape.

Further, the support member 61 as shown in FIGS. 3 and 4 which is formed by: winding metal wire rods into a spiral shape so as to form a cylindrical space; radially extending the metal wire rods that have been wound into a spiral shape until each metal wire rod abuts the inner side wall of the column body 41; further bending the metal wire rods so that each metal wire rod extends along the inner side wall of the column body 41; and thereafter bending back the metal wire rod in a direction opposite to the radial direction, for example, can be used.

Figure 6:
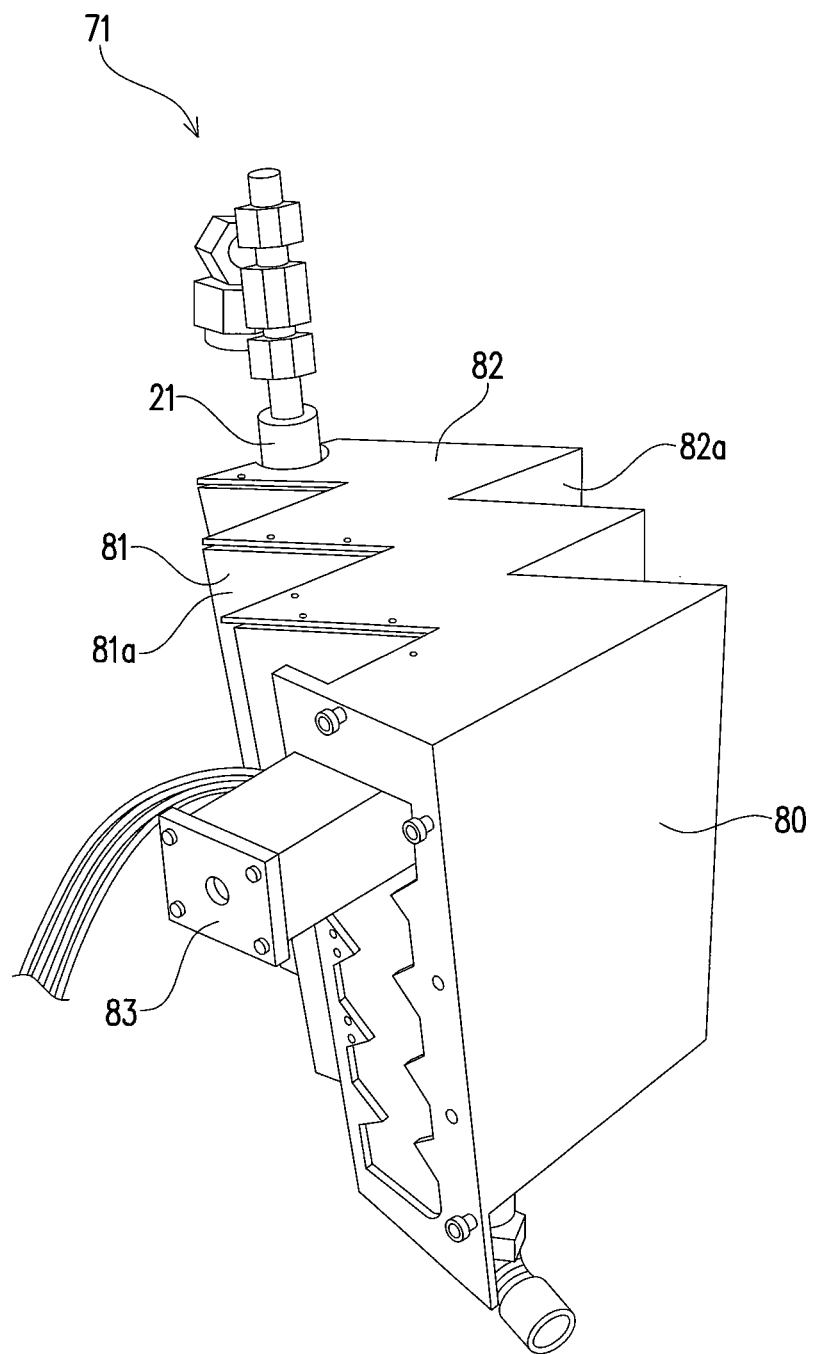
FIG. 6 is a perspective view of the adsorption unit of the dehumidifier according to the first embodiment (with the cover).

As shown in FIG. 6, the adsorption units 71 and 72 each include a duct 80 housing the adsorption column 21 therein and allowing a gas for cooling the adsorption column 21 to circulate therethrough. The duct 80 is formed so as to have a zigzag flow path for the gas circulating in the duct 80.

The duct 80 may include a fixing base 81, as shown in FIG. 5, to which the adsorption column 21 is fixed and a cover 82, as shown in FIG. 7, which covers the column body 21. The duct 80 may be configured to house the adsorption column 21 between the fixing base 81 and the cover 82, as shown in FIG. 6.

The duct 80 may further include a blower 83, as shown in FIG. 6, which delivers a blow, for cooling the adsorbent that has been heated, from the outside of the adsorption column 21 containing the adsorbent to the space between the fixing base 81 and the cover 82.

As shown in FIG. 5, the fixing base 81 has a wall plate 81*a* formed by folding a metal plate, and a fixing member 81*b* which is fixed to the upper sides of the wall plate 81*a* and to which the adsorption column 21 is fixed.

The wall plate 81*a* is formed into a stepped shape in side view by folding a rectangular metal plate so that a mountain fold and a valley fold are repeatedly formed, each fold line extending in the width direction. Specifically, the wall plate 81*a* has five folded portions of peak/valley/peak/valley/peak.

The cover 82 has a ceiling wall 82*a* having substantially the same shape as the wall plate 81*a* of the fixing base 81 and a sidewall 82*b* hanging from each of both edges of the ceiling wall 82*a*, as shown in FIG. 7.

The sidewall 82*b* has a lower edge formed into a stepped shape in side view in the same manner as the wall plate 81*a*.

That is, the cover 82 is configured to form a gas flow path having a cross section in a laterally elongated rectangular shape, together with the fixing base 81, when the lower edges of the sidewalls 82*b* are fixed to the side edges of the wall plate 81*a*. The cover 82 is configured to form a flow path extending in a zigzag manner in the circulation direction of the gas.

As shown in FIG. 5, the adsorption column 21 is attached to the fixing base 81 so as to extend in the width direction of the wall plate 81*a*. Specifically, the adsorption column 21 is attached to the fixing base 81 so that the adsorption column 21 having a length about seven times the width of the wall plate 81*a* is folded at 180° at six points so as to form six bent portions 41*b* and seven linear portions 41*c*.

More specifically, the adsorption column 21 has a first linear portion 41*c*1 arranged at the inlet of the duct 80 so as to extend in the width direction of the fixing base 81, and a first bent portion 41*b*1 arranged at a position close to the sidewall 82*b* with a second linear portion 41*c*2 extending along the first mountain fold portion of the wall plate 81*a*. Continuously, a second bent portion 41*b*2 is arranged at a position close to the sidewall 82*b* and opposite to the first bent portion 41*b*1 with a third linear portion 41*c*3 extending along the first valley fold portion of the wall plate 81*a*. The adsorption column 21 is arranged within the duct 80 in such a manner until reaching the vicinity of the outlet.

In this embodiment shown in FIG. 5, the adsorption column 21 is housed in the duct 80 having a gas flow path in a zigzag shape. Therefore, when a cooling gas for cooling the adsorption column 21 circulates through the duct 80, the flow of the cooling gas is significantly disturbed. As a result, the adsorption column 21 can be more efficiently cooled.

In the embodiment shown in FIG. 5, in the case where the dehumidifier 1 includes the fins for further improving the cooling efficiency, it is preferable that the fins be preferably arranged parallel to the circulation direction of the gas flow and each be oriented orthogonal to the corresponding linear portion 41c.

For example, a plurality of metal plates each provided with a cutout having substantially the same width as the diameter of the adsorption column 21 are prepared, and the adsorption column 21 is fitted into this cutout so that each metal plate is fixed to the outer side of the adsorption column 21. Thus, fins for promoting the cooling effect can be formed.

In this embodiment shown in FIG. 5, among four walls of the duct 80 which define the gas flow path that is rectangular in cross section, two opposite walls 81a and 82a are each formed into a stepped shape in side view, as shown in FIG. 6, so that the gas flow path is formed into a zigzag shape. Therefore, a larger length of the gas flow path can be ensured as compared to the linear distance from the inlet to the outlet of the duct 80.

Moreover, the adsorption column 21 that is longer than the width of the duct 80 is housed inside the duct 80 by forming the plurality of bent portions 41b in the adsorption column 21. Therefore, the adsorption units 71 and 72 that are compact and have excellent efficiency of cooling the adsorption column 21 are formed in the embodiment shown in FIG. 5.

Figure 8:
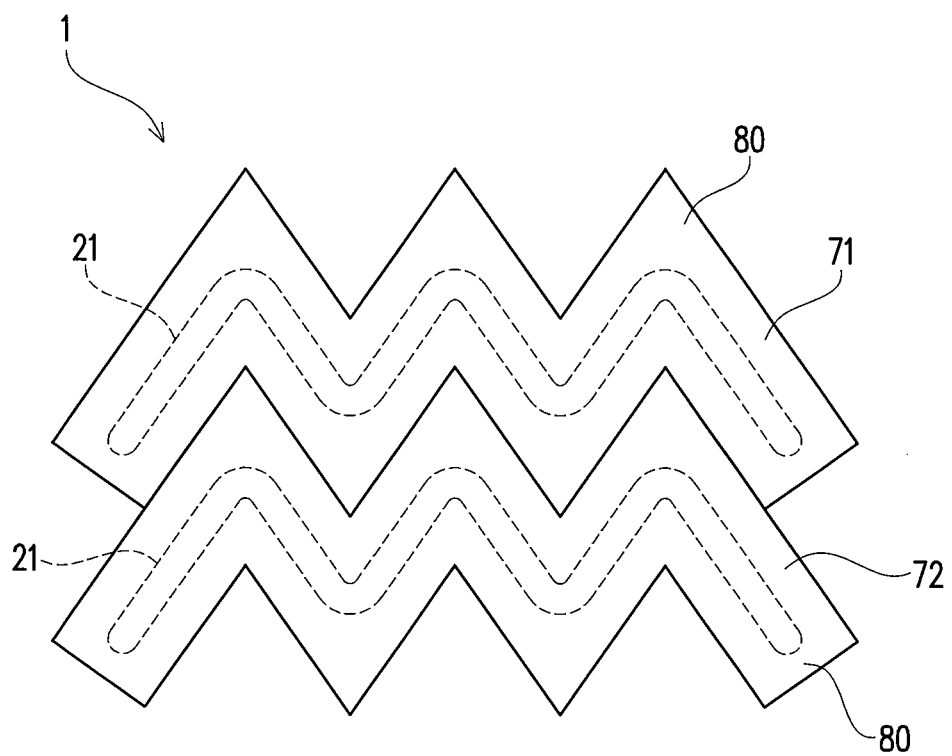
FIG. 8 is a schematic side view of the dehumidifier according to the first embodiment with a first adsorption unit and a second adsorption unit overlapping each other.

Further, in the embodiment shown in FIG. 5, the two opposite walls 81a and 82a are each formed into a stepped shape in side view, as shown in FIG. 6. Therefore, when the two adsorption units 71 and 72 are stacked together as shown in FIG. 8, formation of a gap between them can be suppressed.

That is, when the first adsorption unit 71 and the second adsorption unit 72 are configured as shown in FIG. 5, the dehumidifier 1 according to the first embodiment can be more suitably adapted for in-vehicle applications.

Then, a method for producing the dehumidifier of the first embodiment is described.

In the method for producing the dehumidifier of the first embodiment, after the inside of a straight tube constituting the column body 41 is loaded with the electrical heater having a rod shape and the adsorbent, the tube is bent, so that the dehumidifier 1 including the column body 41 formed of the tube having the bent portions 41b is produced.

Specifically, a straight tube having no bent portions that forms the column body 41 and an electrical heater having a rod shape that is slightly shorter than the tube are prepared. Next, the support member 61 is attached at a specific spacing to the electrical heater so that the electrical heater is inserted through the winding portion 61a. Then, the electrical heater with the support member 61 attached thereto is introduced into the tube through one opening, and then the adsorbent is further introduced into the tube. Thereafter, each bent portion 41b can be formed by bending the tube at a specific position.

This makes it easy to arrange such an electrical heater having a rod shape so as to coincide with the center axis of the corrugated tube, as compared to a method in which the inside of the tube after being bent is loaded with the electrical heater and the adsorbent.

In the case where a commonly used metal tube or the like is employed as the tube, the bent portion 41b can be formed using a pipe bender or the like.

At this time, since the inside of the tube has already been loaded with the adsorbent, buckling of the tube can be prevented and application of a local stress to the electrical heater by bending the tube can be suppressed. Thus, the bent portion 41b having a smaller radius of curvature can be formed.

In the method for producing the dehumidifier of the first embodiment, use of the corrugated tube as the straight tube can further suppress the concentration of a stress on a part of the bent portion of the tube when bending the tube. Therefore, the tube can be bent to a still smaller radius of curvature so as to be compact. Accordingly, the possibility of occurrence of a constraint in installation space of the dehumidifier can be reduced.

The maximum outer diameter of the corrugated tube is preferably at least 0.7 cm but not more than 4 cm, more preferably at least 1 cm but not more than 2 cm. Use of a tube having a maximum outer diameter of at least 0.7 cm but not more than 4 cm allows the corrugated tube to be bent to a small bending radius of the corrugated tube. Accordingly, it is advantageous in that compactification of the dehumidifier itself is facilitated, and further in that bending of the corrugated tube is easy.

Furthermore, the difference in height between a projection and a recess on the outer surface of the corrugated tube (absolute value of the difference between the distance from the center axis of the tube to the outer tip of the projection and the distance from the center axis of the tube to the inner base end of the recess) preferably falls within the range of 2 mm to 4 mm, for example. When this difference is at least 2 mm, the surface area of the corrugated tube is large, which is advantageous. Also, when this difference is not more than 4 mm, a small bending radius of the bent portion can be easily achieved when bending the corrugated tube, which is advantageous.

Furthermore, in the corrugated tube, the distance between the outer tips of each two adjacent projections in the axis direction of the tube preferably falls within the range of 3 to 5 mm. When this distance falls within the range of 3 to 5 mm, there are advantages that the surface area of the corrugated tube is large, and further that bending of the corrugated tube is easy.

Commonly used corrugated tubes include the following types: those having a projection and a recess that are each independently formed in the form of a ring, in which the recess and the projection are alternately repeated along the circulation direction of the to-be-treated gas A (hereinafter referred to also as an "annularly corrugated tube"); and those having a projection and a recess that are provided in a spiral shape, in which the recess and the projection are alternately repeated along the circulation direction of the to-be-treated gas A (hereinafter referred to also as a "helically corrugated tube"). When corrugated tubes are made of the same material with the same material thickness, the annularly corrugated tubes are more advantageous for reducing the bending radius of the bent portion 41b.

On the other hand, since a corrugated tube has a groove-shaped portion on the inner side corresponding to the projection, a gap is likely to be formed within the groove when a large amount of the adsorbent is introduced into the annularly corrugated tube at a time.

In contrast, the helically corrugated tubes are advantageous in that the gap is less likely to be formed since the groove is continuous from one end to the other end of such a tube in a spiral manner.

Further, in the case of the helically corrugated tubes, for example, when the electrical heater is introduced in the tube, the electrical heater can be automatically introduced into the tube by engaging the tips of the leg portions 61b of the support member 61 with the spiral groove and relatively rotating the tube and the electrical heater to each other about the axis, thereby allowing the support member 61 to penetrate into the tube along the groove.

Furthermore, the helically corrugated tubes are advantageous also in that the tube itself can be easily fabricated.

That is, the dehumidifier 1 that is compact can be produced still more easily and conveniently by forming the column body 41 using these types of corrugated tubes.

Subsequently, a method of using the dehumidifier 1 is described.

In the dehumidifier 1, the to-be-treated gas A circulates through the plurality of the adsorption columns 21 each containing the adsorbent, thereby causing moisture contained in the to-be-treated gas A to be adsorbed on the adsorbent, so that the moisture contained in the to-be-treated gas A can be removed.

Further, in the dehumidifier 1, the to-be-treated gas A containing moisture is supplied to the first adsorption unit 71, for example, by operating the supply valve 11 shown in FIG. 1, as has been described above, so that the moisture in the to-be-treated gas A can be adsorbed on the adsorbent in the first adsorption unit 71. On the other hand, while moisture in the to-be-treated gas A is adsorbed on the adsorbent in the first unit, an adsorbent that has already adsorbed moisture can be thermally regenerated in the second adsorption unit 72 by desorption of the moisture which is caused due to heating of the heating unit 51. The adsorbent that has desorbed moisture can be cooled, for example, by being left standing after termination of heating of the heating unit 51.

Further, the dehumidifier 1 can continuously dehumidify the to-be-treated gas A without intervals, by switching the supply destination of the to-be-treated gas A containing moisture between the first adsorption unit 71 and the second adsorption unit 72 at specific time periods, as has been described above.

In the dehumidifier 1, a dried gas for cooling can be circulated through the adsorption column 21 in order to cool the adsorbent that has been heated by the heating unit 51.

The dehumidifier of the first embodiment and the method for producing the dehumidifier are configured as mentioned above, and thus have the following advantages.

That is, the dehumidifier 1 of the first embodiment includes the adsorption column 21 allowing at least one to-be-treated gas A of hydrogen and oxygen produced by electrolysis of water to circulate therethrough so as to allow moisture in the to-be-treated gas A to be adsorbed therein. The adsorption column 21 includes the adsorbent 92 that adsorbs moisture, the column body 41 that has the housing region 41a containing the adsorbent 92, and the heating unit 51 that is arranged within the column body 41 and heats the adsorbent 92 so as to cause desorption of the adsorbed moisture from the adsorbent 92. The column body 41 is a tube having the bent portions 41b.

Since the column body 41 is a tube having the bent portions 41b, the dehumidifier 1 is restricted from being elongated in one direction, as compared to a conventional dehumidifier in which the column body has no bent portions, so that the possibility of occurrence of a constraint in installation space is reduced while the decrease in the efficiency of moisture removal is suppressed.

Further, in the dehumidifier 1 of the first embodiment, the heating unit 51 is formed into a rod shape. The adsorption column 21 further includes the support member 61 that is arranged within the column body 41 and capable of supporting the heating unit 51 along the center axis of the column body 41.

According to this dehumidifier 1, it is possible to heat the adsorbent 92 efficiently and to cool the adsorption column 21 efficiently as well.

Furthermore, the dehumidifier 1 of the first embodiment further includes the fins 91 in contact with the outer surface of the tube 41.

According to this dehumidifier 1, the outer surface area of the column body 41 that is the tube is still more enlarged. Therefore, the dehumidifier 1 has an advantage that the adsorbent 92 from which moisture has been desorbed by heating is efficiently cooled. Further, the dehumidifier 1 has an advantage that, while an equivalent cooling efficiency by the column body 41 is maintained, the length of the column body 41 can be shortened, as compared to the case where the tube 41 has no fins on its outer surface.

The dehumidifier 1 of the first embodiment further includes the duct 80 housing the adsorption column 21 therein and allowing a gas for cooling the adsorption column 21 to circulate therethrough. The duct 80 is formed so as to have a zigzag flow path for the gas circulating in the duct 80.

According to this dehumidifier 1, when a cooling gas for cooling the adsorption column 21 circulates through the duct 80, the flow of the cooling gas is significantly disturbed. As a result, the adsorption column 21 can be more efficiently cooled.

Furthermore, in the dehumidifier 1 of the first embodiment, the column body 41 that is the aforementioned tube is a corrugated tube having a recess and a projection repeatedly formed along the circulation direction of the to-be-treated gas A on its outer surface.

The dehumidifier 1 has an advantage that the outer surface area of the column body 41 is enlarged, so that the adsorbent 92 from which moisture has been desorbed by heating is efficiently cooled. Further, the dehumidifier 1 has an advantage that, while an equivalent cooling efficiency is maintained, the length of the column body 41 can be shortened, as compared to the length of a column body that is a tube having no recess or projection on its outer surface and having an outer surface area that is equal to that of the column body 41.

Furthermore, the method for producing the dehumidifier of the first embodiment is a method for producing the dehumidifier 1. The dehumidifier 1 includes the adsorption column 21 allowing at least one to-be-treated gas A of hydrogen and oxygen produced by electrolysis of water to circulate therethrough so as to allow moisture in the to-be-treated gas A to be adsorbed therein. The adsorption column 21 includes the adsorbent 92 that adsorbs moisture, the column body 41 that has the housing region 41a containing the adsorbent 92, and the heating unit 51 that is arranged within the column body 41 and heats the adsorbent 92 so as to cause desorption of the adsorbed moisture from the adsorbent 92.

In the method for producing the dehumidifier of the first embodiment, after the inside of a straight tube constituting the column body 41 is loaded with the heating unit 51 and the adsorbent 92, the tube is bent, so that the dehumidifier 1 including the column body 41 formed of the tube having the bent portions 41b is produced.

This method for producing the dehumidifier makes it possible to achieve the dehumidifier 1 in which the possibility of occurrence of a constraint in installation space is reduced, while the decrease in the efficiency of moisture removal is suppressed.

The dehumidifier of the first embodiment is as has been exemplified above. However, the present invention is not limited to the above-exemplified dehumidifier.

Further, various embodiments used for common dehumidifiers can be employed, as long as the effects of the present invention are not impaired.

For example, although the dehumidifier 1 of the first embodiment is composed of the two adsorption units, the dehumidifier of the present invention may include one adsorption unit alone, or may include three or more adsorption units.

Further, in the dehumidifier 1 of the first embodiment, the wall plate 81a of the fixing base 81 and the ceiling wall 82a of the cover 82 are each formed into a stepped shape in side view. However, in the dehumidifier 1 of the present invention, the wall plate 81a and the ceiling wall 82a each may be flat in side view. Specifically, the duct 80 may be formed so as to have a rectangular parallelepiped outer shape. This dehumidifier 1 may be provided with a flow path, separately formed in the duct 80, allowing a gas for cooling the adsorption column 21 to pass therethrough in the circulation direction of the gas in a zigzag manner. Alternatively, the duct 80 may be formed so as not to allow the gas for cooling the adsorption column 21 to pass therethrough in the circulation direction of the gas in a zigzag manner.

Furthermore, in the dehumidifier 1 of the present invention, the configuration for cooling the adsorption column 21 also is not specifically limited.

Figure 9:
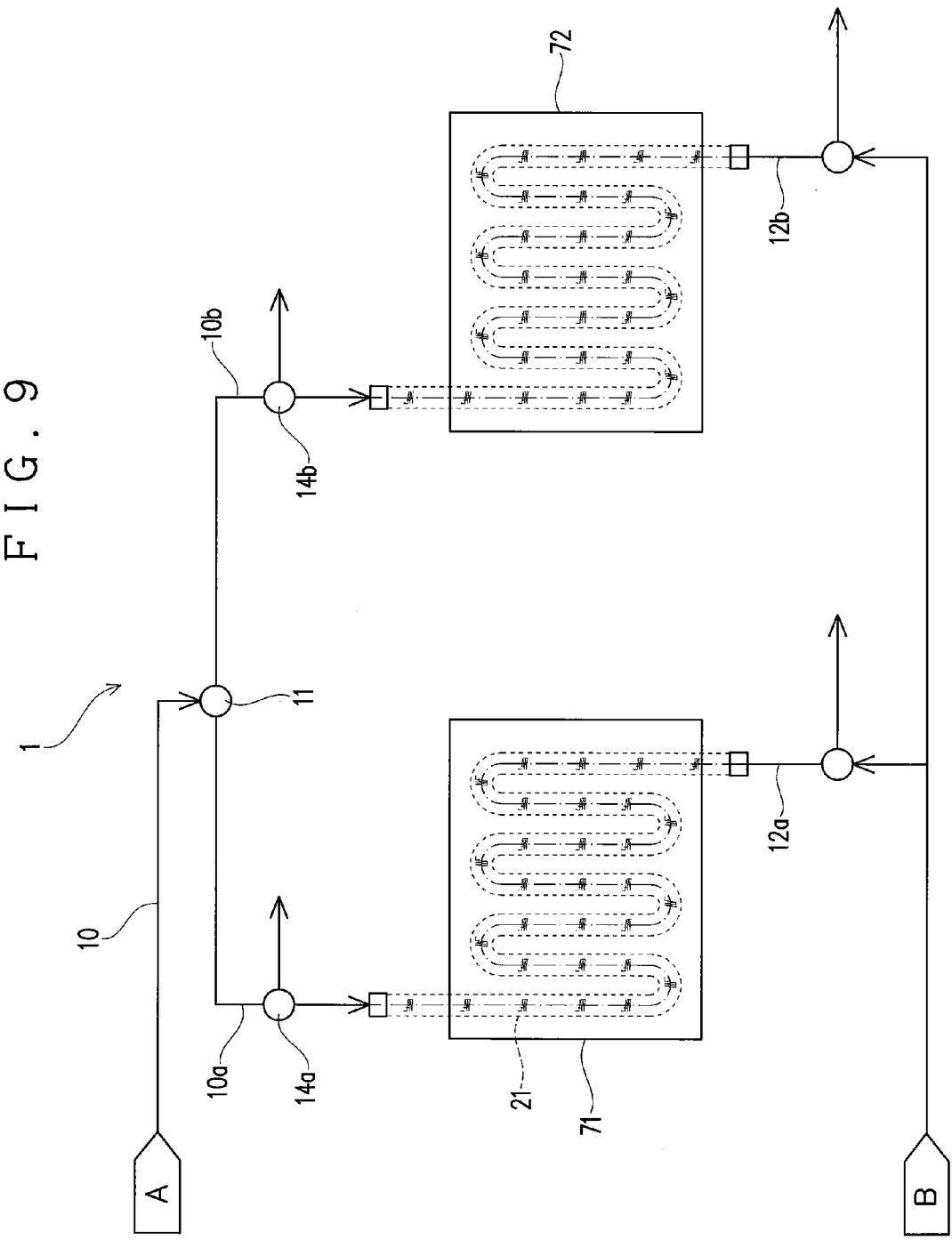
FIG. 9 is a schematic view of a dehumidifier according to another embodiment (view schematically showing a cross section of cores of adsorption columns).

For example, the dehumidifier 1 of the first embodiment is configured to supply a dried gas produced in either one of the adsorption units 71 and 72 to the other of the adsorption units 71 and 72 as a purge gas, and to release water vapor and heat generated in the other of the adsorption units 71 and 72 to the outside of the system. However, as shown in FIG. 9, the dehumidifier 1 of the present invention may be configured to supply a separately prepared dried gas B, instead of the dried gas produced in the one of the adsorption units 71 and 72, to the other of the adsorption units 71 and 72 as a purge gas, and to release water vapor and heat generated in the other of the adsorption units 71 and 72 to the outside of the system.

Further, the dehumidifier 1 of the present invention may include an outer tube housing the adsorption column 21, so as to cool the adsorption column 21 by allowing a refrigerant (e.g. water, an antifreeze solution such as ethylene glycol and alcohol, etc.) to circulate through a gap between the outer tube and the adsorption column 21. Further, the dehumidifier 1 of the present invention may include a tube that is thinner than the adsorption column 21 and wound around the outer circumference of the adsorption column 21, so as to cool the adsorption column 21 by allowing the refrigerant to circulate through the tube. The dehumidifier 1 having such a configuration enables efficient cooling of the adsorbent that has been heated.

Further, the dehumidifier 1 of the present invention may be configured so as to cool the adsorption column 21 by using at least one medium selected from a group consisting of a cold wind from the fan, the purge gas, and the refrigerant.

Further, in the dehumidifier 1 of the present invention, the heating unit 51 is preferably arranged within the column body 41 throughout the entire extending direction of the column body 41. Further, in the dehumidifier 1 of the present invention, the heating unit 51 is preferably arranged within the bent portions 41b, as has been mentioned above. In the case where the heating unit 51 includes an electrical heater having a rod shape, it is preferable that the heating unit 51 be arranged so as to coincide with the center axis of the column body 41 having a cylindrical shape in the dehumidifier 1 of the present invention. However, it does not matter if the heating unit 51 is arranged so as to pass through points deviating from the center axis to some extent.

Further, the dehumidifier 1 of the present invention preferably has two or more aforementioned bent portions. When the dehumidifier 1 has a structure including a plurality, that is, 2 or more of bent portions, the dehumidifier can be suppressed from being elongated in one direction and is allowed to be compact, as compared to a dehumidifier provided with an adsorption column having the same entire length and including only one bent portion.

Further, the adsorption column described in the first embodiment has bent portions and linear portions, which however is not restrictive. The adsorption column may be composed of bent portions without having linear portions. Specifically, the dehumidifier 1 of the present invention may have an adsorption column that is bent continuously into a spring (coil) shape. In the case where the adsorption column has such a configuration, a cooling conduit for cooling may be provided in a region surrounded by the portion wound into a spring shape of the adsorption column, so that a refrigerant is allowed to circulate through the cooling conduit during cooling. Alternatively, instead of providing the cooling conduit in such a region, the air may be simply allowed to circulate around the outer circumference of the adsorption column.

Figure 10:
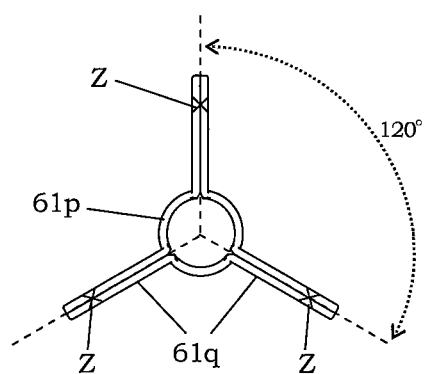
FIG. 10 is a cross sectional view, cut along a plane perpendicular to an extending direction of a heating unit, of a support member according to a modification.
Figure 11:
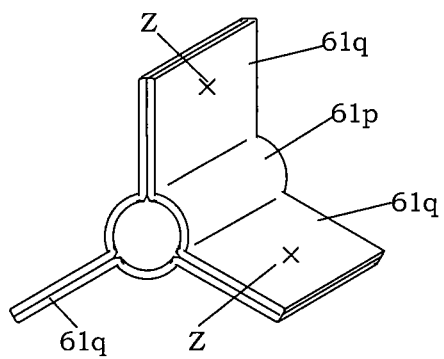
FIG. 11 is a perspective view showing the support member according to the modification.

Moreover, FIGS. 10 and 11 show a modification of the support member 61. FIG. 10 is a sectional view, cut along a plane perpendicular to the extending direction of the heating unit 51, of the modification, and FIG. 11 is a perspective view of the modification.

As shown in FIGS. 10 and 11, this modification of the support member 61 has a tubular portion 61p formed by combining three three-segmented tube bodies so as to cover the heating unit 51 having a round bar shape, and flanges 61q having a rectangular plate shape respectively extending outwardly from both edges of the three-segmented tube bodies. A total of six pieces of flanges 61q respectively extending from both edges of the three-segmented tube bodies include plate support legs, two adjacent pieces of which are stacked together, extending radially from the center of the tubular portion 61p in three directions. Further, the flanges 61q are formed to be capable of supporting the rod-shaped heating unit 51 inserted through the tubular portion 61p at the center of the column body 41 by allowing the distal edges of the plate support legs to abut the inner surface of the column body 41.

The support member 61, for example, is formed by combining three pieces of strip-shaped metal plates that each have been subjected to folding. Specifically, the flanges 61q are stacked over one another, thereby forming the plate support legs. Further, the flanges 61q are formed of both edges of the metal plates. Further, the flanges 61q thus stacked are joined by spot welding at a position Z closer to the tubular portion 61p than their distal edges.

In the support member 61, the plate support legs are arranged so that each angle between imaginary lines extending from the center of the tubular portion 61p through two of the distal edges of the plate support legs is 120°.

The thermal conductivity of metals is higher than the thermal conductivity of the adsorbent. Therefore, use of the support member 61 made of metal and provided with the flanges 61q or the leg portions 61b facilitates heat transfer, due to the flanges 61q or the leg portions 61b, from the heating unit 51 to the adsorbent present at a distance from the heating unit 51 during heating by the heating unit 51, as compared to an embodiment without using the support member 61. Accordingly, this brings about an advantage that the entire adsorbent can be heated efficiently.

Further, the support member 61 formed of metal plates and having the flanges 61q facilitates an increase in the contact efficiency between the heating unit 51 and the support member 61, and also an increase in the contact area between the support member 61 and the adsorbent, as compared to the case of the support member 61 formed of metal wire rods. Therefore, the flanges 61q make it easy for the support member 61 to transfer the heat from the heating unit 51 to the adsorbent present at a distance from the heating unit 51. Accordingly, the support member 61 has an advantage of being capable of efficiently heating the adsorbent entirely.

Furthermore, formation of the support member 61 using metal plates facilitates the production of the support member 61, as compared to the case of the support member 61 formed of metal wire rods. Accordingly, cost reduction is facilitated, which also is advantageous.

Figure 12:
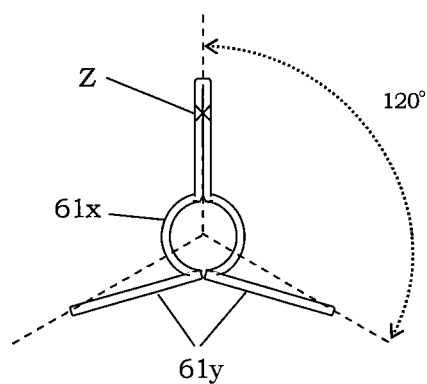
FIG. 12 is a cross sectional view, cut along a plane perpendicular to an extending direction of a heating unit, of a support member according to a modification.
Figure 13:
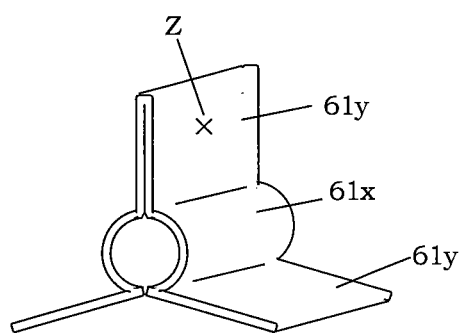
FIG. 13 is a perspective view showing the support member according to the modification.

Further, FIGS. 12 and 13 show another modification of the support member 61. FIG. 12 is a sectional view, cut along a plane perpendicular to the extending direction of the heating unit 51, of the modification, and FIG. 13 is a perspective view of the modification.

As shown in FIGS. 12 and 13, this modification of the support member 61 has a tube body 61x formed by combining a pair of half tube bodies, and flanges 61y extending outwardly from both edges of the half tube bodies. Further, in the support member 61, the flanges 61y are stacked together and joined to each other on one edge side of the half tube bodies. Further, on the other edge side of the half tube bodies, the support member 61 has plate support legs extending away from each other, so that the plate support legs extend radially from the center of the tube body 61x in three directions. The support member 61 is formed to be capable of supporting the rod-shaped heating unit 51 inserted through the tube body 61x at the center of the column body 41 by allowing the distal edges of the plate support legs to abut the inner surface of the column body 41.

The tube body 61x is formed so as to allow, while the relative positions of the half tube bodies to each other are substantially fixed on the side where the flanges 61y are joined to each other, the half tube bodies to extend away from each other on the other side. Further, the tube body 61x is formed so as to allow its diameter to expand or contract to some extent.

The support member 61, for example, is formed by folding one piece of strip-shaped metal plate. Two of the flanges 61y excluding the flanges 61y stacked together are composed of both edges of the metal plate. On the other hand, the flanges 61y stacked together are joined to each other at the distal edges along which the metal plate is folded. They are further joined by spot welding at the position Z closer to the tube body 61x than their distal edges.

In the support member 61, the plate support legs are arranged so that each angle between imaginary lines extending from the center of the tube body 61x through two of the distal edges of the plate support legs is 120°. Moreover, two plate support legs extending from the other edges of the half tube bodies are not arranged along the imaginary lines extending from the center of the tubular portion 61p through the distal edges of the plate support legs, as being different from the support member (modification shown in FIGS. 10 and 11) in which the three plate support legs are arranged along the imaginary lines.

Figure 14:
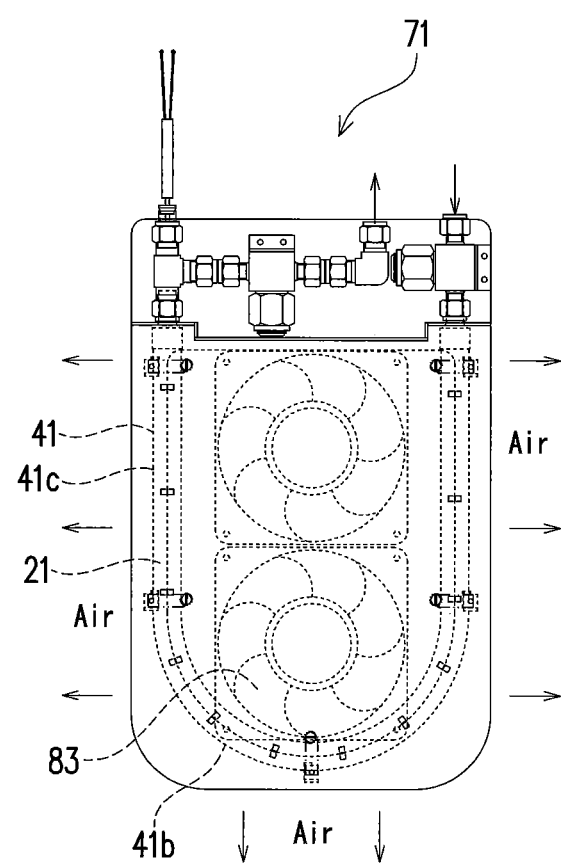
FIG. 14 is a schematic front view of a first adsorption unit of a dehumidifier according to another embodiment.
Figure 15:
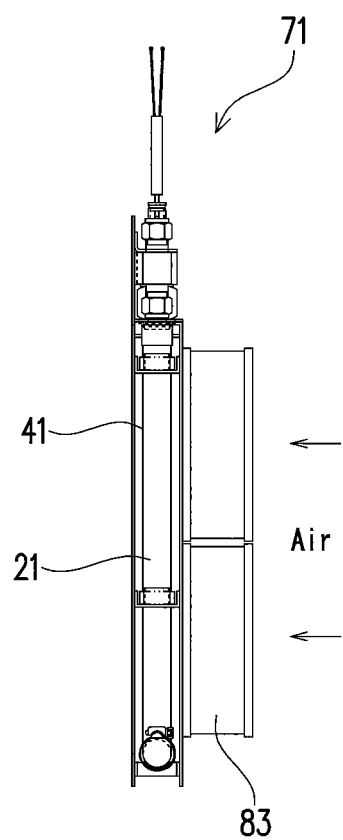
FIG. 15 is a schematic side view of the first adsorption unit of the dehumidifier according to the other embodiment.
Figure 17:
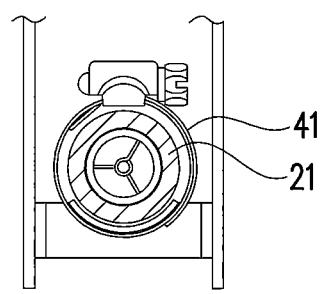
FIG. 17 is a cross sectional view in the direction of arrows A-A of FIG. 16.

Further, a modification of the dehumidifier 1 is described with reference to FIGS. 14 to 17. FIG. 14 is a front view of the first adsorption unit 71 of the dehumidifier 1. FIG. 15 is a side view of the first adsorption unit 71. FIG. 16 is a rear view of the first adsorption unit 71. FIG. 17 is a cross sectional view in the direction of arrows A-A of FIG. 16.

In this dehumidifier 1, the tube 41 of the adsorption column 21 is a U-shaped tube. The tube 41 includes a curved portion 41b curved into a semicircular shape, and two linear portions 41c extending from both ends of the curved portion 41b so as to be parallel to each other. In FIG. 14, the curved portion 41b is arranged on the lower side as viewed from the front, and the linear portions 41c as a pair are arranged extending from both ends of the curved portion 41b in the vertical direction at a distance from each other on the left and right sides.

The dehumidifier 1 includes two plates capable of covering all the curved portion 41b and the pair of the linear portions 41c. The dehumidifier 1 includes the adsorption column 21 sandwiched between the two plates from the front (front surface) side and the rear (back surface) side. Each plate has a width in the left-right direction slightly larger than the diameter of the curved portion 41b. Further, the plate has a length in the vertical direction slightly larger than the total of the radius of the curved portion 41b and the length of the linear portions 41c. In this way, since the adsorption column 21 is sandwiched between the two plates from the front and rear sides, an internal space is formed in the dehumidifier 1 with three sides, which are the left and right sides and the lower side, being surrounded by the adsorption column 21 and with the front and rear sides being surrounded by the plates. Further, the dehumidifier 1 has a sealing part that seals the upper side of the internal space, so that gases are suppressed from circulating upwardly from the internal space. However, since the tube 41 of the adsorption column 21 is formed of a corrugated tube, gaps are formed between the tube 41 and the plate due to recesses of the corrugated tube. Thus, the internal space and the outside of the system are in communication with each other through the gaps in the part other than the sealing part. The plate on the rear side has an opening at the center. Two blowers 83 that supply a gas from the outside of the system to the internal space are provided at the opening. The dehumidifier 1 is configured so that the gas is supplied to the internal space by the blowers 83, thereby causing the gas to be discharged through the gaps to the outside of the system. The dehumidifier 1 is configured so that the adsorption column 21 is cooled by the circulation of the gas through the gaps.

Figure 18:
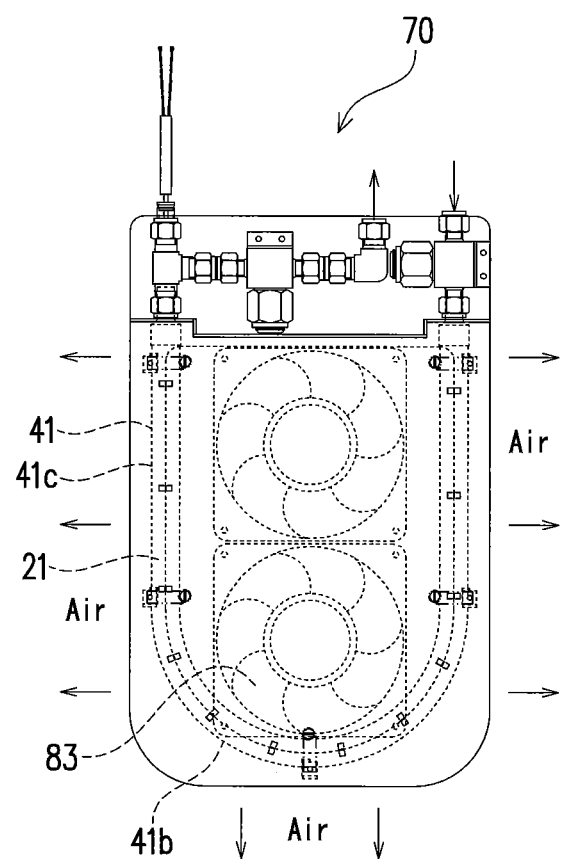
FIG. 18 is a schematic front view of an adsorption unit of a dehumidifier according to another embodiment.
Figure 19:
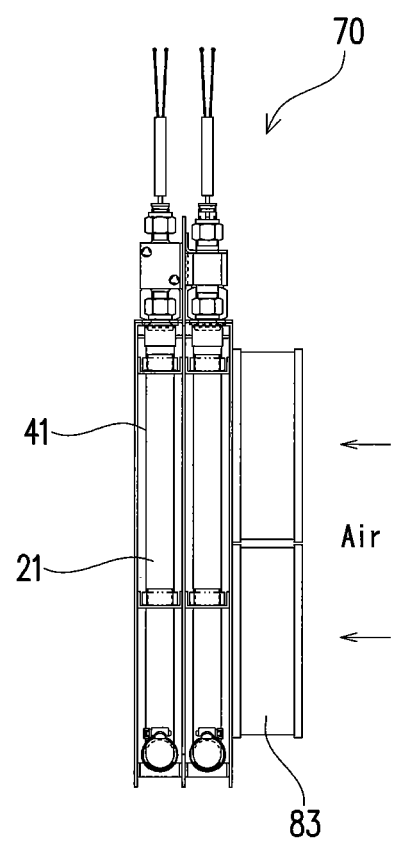
FIG. 19 is a schematic side view of the adsorption unit of the dehumidifier according to the other embodiment.
Figure 20:
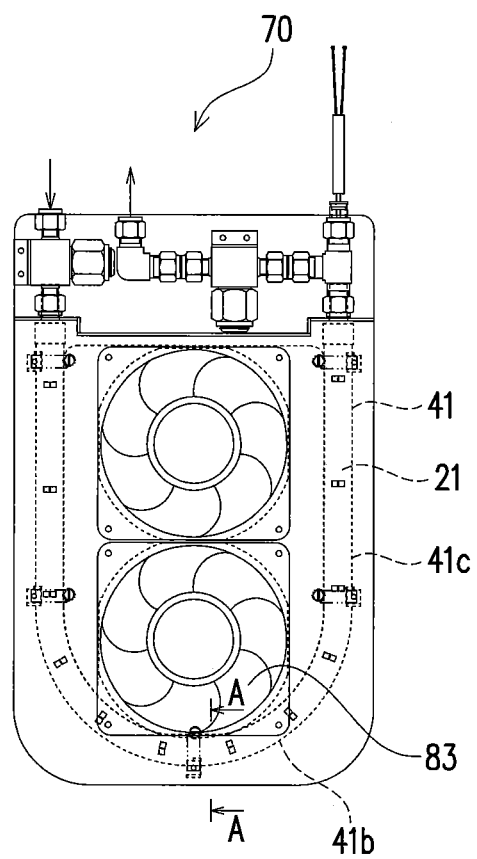
FIG. 20 is a schematic rear view of the adsorption unit of the dehumidifier according to the other embodiment.
Figure 21:
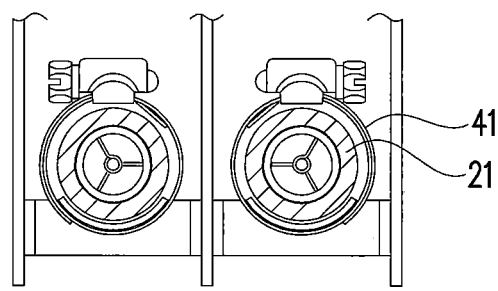
FIG. 21 is a cross sectional view in the direction of arrows A-A of FIG. 20.

It is also possible to employ an adsorption unit 70 obtained by combining two or more units each having the above-mentioned configuration. In this regard, for example, when combining two units, the first unit may be attached to the front side of the second unit after removing the blowers 83 provided on the rear side of the first unit and the plate on the front side of the second unit, as shown in FIGS. 18 to 21 (where FIG. 18 is a front view of the adsorption unit 70, FIG. 19 is a side view of the adsorption unit 70, FIG. 20 is a rear view of the adsorption unit 70, and FIG. 21 is a cross sectional view in the direction of arrows A-A of FIG. 20). That is, the adsorption unit 70 may be configured so that the internal space of the first unit and the internal space of the second unit are brought into communication with each other via a plate having an opening on the rear side of the first unit, thereby allowing the blowers 83 of the second unit to supply the gas to the internal space of the first unit.

Figure 22:
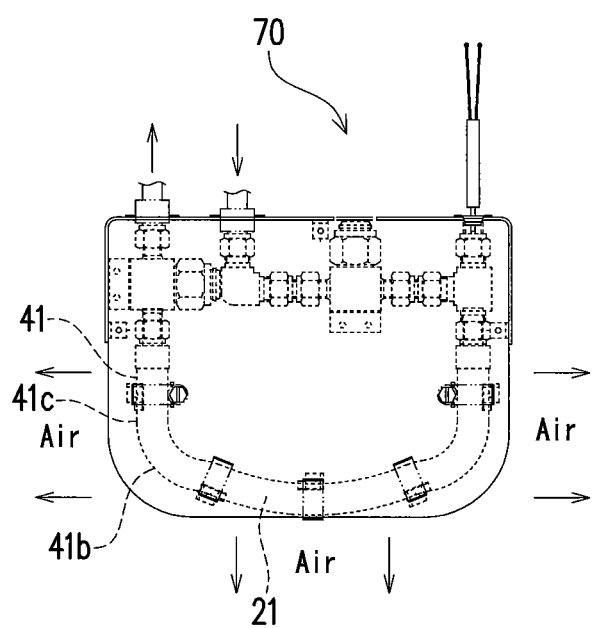
FIG. 22 is a schematic front view of an adsorption unit of a dehumidifier according to another embodiment.
Figure 23:
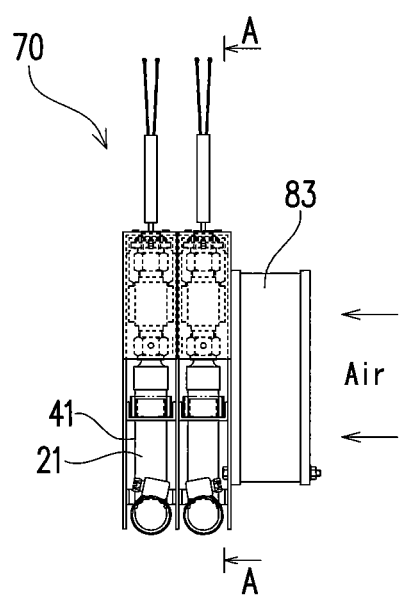
FIG. 23 is a schematic side view of the adsorption unit of the dehumidifier according to the other embodiment.
Figure 24:
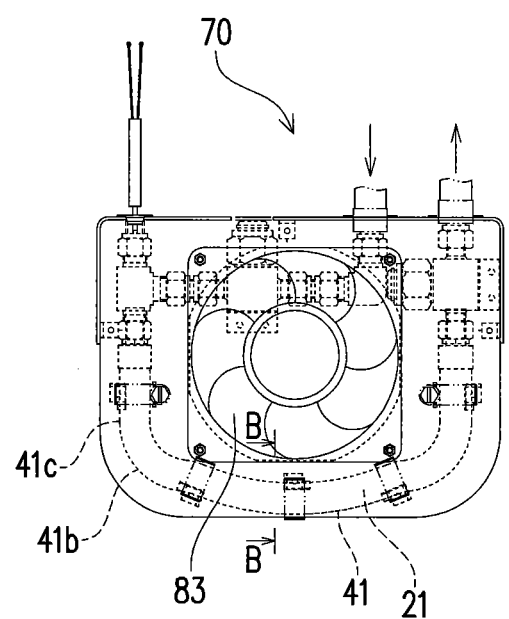
FIG. 24 is a schematic rear view of the adsorption unit of the dehumidifier according to the other embodiment.
Figure 26:
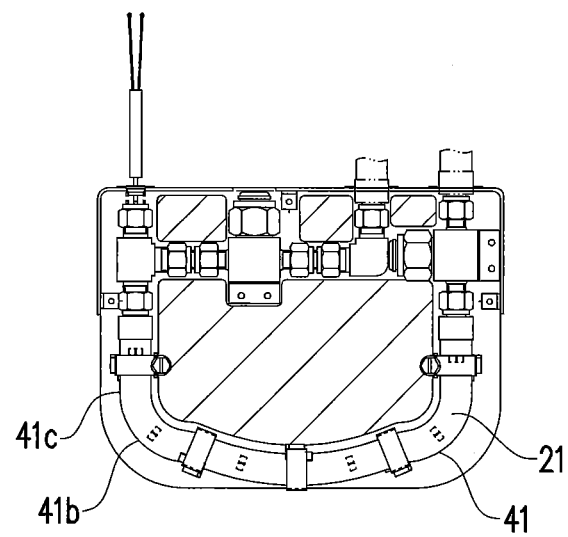
FIG. 26 is a cross sectional view in the direction of arrows A-A of FIG. 23.

Further, the blowers 83 may be reduced to one in the case of an embodiment including the linear portions 41c shorter than the linear portions 41c shown in FIGS. 18 to 21, as shown in FIGS. 22 to 26 (where FIG. 22 is a front view of the adsorption unit 70, FIG. 23 is a side view of the adsorption unit 70, FIG. 24 is a rear view of the adsorption unit 70, FIG. 25 is a cross sectional view in the direction of arrows B-B of FIG. 24, and FIG. 26 is a cross sectional view in the direction of arrows A-A of FIG. 23).

In a practical use, the dehumidifier is not necessarily used in the aforementioned directions.

Further, the dehumidifier 1 shown in FIGS. 14 to 26 is configured so that the gas is supplied to the internal space by the blowers 83, thereby causing the gas to be discharged through the gaps to the outside of the system. However, the dehumidifier of the present invention may be configured so that the gas is discharged from the internal space to the outside of the system by the blowers 83, thereby causing the gas to be supplied to the internal space through the gaps. In this case, the gas flow direction shown in FIGS. 14 to 26 is reversed.

Further, the adsorption unit 70 shown in FIGS. 18 to 26 is configured so that the gas is supplied to the internal space by the blowers 83, thereby causing the gas to be supplied to the surroundings of the two adsorption columns 21. However, the functions of both the first adsorption unit 71 and the second adsorption unit 72 shown in FIG. 1 can be exerted by employing a configuration in which the gas is supplied separately to these two adsorption columns 21. In that case, the dehumidifier may include a selection mechanism so that the gas from the blowers 83 can be distributed into the one adsorption column 21 on the near side and the other adsorption column 21 on the rear side, as viewed from the front, in FIG. 18.

The selection mechanism, for example, includes a shutter that is movable back and forth within the internal space, and a drive unit that drives the shutter to move back and forth. Specifically, the selection mechanism, for example, has a configuration in which a shutter formed by bending a plate having a width equal to the thickness of each adsorption column 21 into a U shape that is one size smaller than the adsorption column 21 is arranged along the inner side of the adsorption column 21, so that the gas flow into one adsorption column 21 (hereinafter referred to also as a "first adsorption column 21") is blocked and the gas flow is supplied only to the other adsorption column 21 (hereinafter referred to also as a "second adsorption column 21") when the shutter is arranged on the near side, whereas the gas flow into the second adsorption column 21 is blocked and the gas flow is supplied only to the first adsorption column 21 when the shutter is moved to the far side by the drive unit.

An operation process using this adsorption unit 70 is described as follows. First, the shutter is positioned on the near side, so that the first adsorption column 21 on the near side is isolated from the internal space, while allowing the to-be-treated gas to circulate through the first adsorption column 21 and the adsorbent in the first adsorption column 21 to adsorb moisture contained in the to-be-treated gas. Subsequently, after the adsorption performance in the first adsorption column 21 is degraded, the flow path of the to-be-treated gas is switched to the second adsorption column 21 on the far side, and thermal regeneration by the heating unit is performed in the first adsorption column 21. At this time, the shutter can suppress heat dissipation from the first adsorption column 21 and prevent heating of the second adsorption column 21. Then, after the adsorbent in the first adsorption column 21 is regenerated, the shutter is moved to the far side by the drive unit, and blowing is started by the blowers 83. Then, a blow is applied to the first adsorption column 21 by the blowers 83, so that the first adsorption column 21 is cooled. Subsequently, after the adsorption performance of the second adsorption column 21 is degraded, the flow path of the to-be-treated gas is switched to the first adsorption column 21 that has been sufficiently cooled, and regeneration is performed in the second adsorption column 21, in the same manner as mentioned above. In this way, the functions of both the first adsorption unit 71 and the second adsorption unit 72 shown in FIG. 1 can be exerted using the one adsorption unit 70.

Further, in the case where the tube 41 is a corrugated tube, the corrugated tube may be retained by a reinforcing member for maintaining the form of the corrugated tube.

Further, the adsorption unit may be formed by bending the adsorption column into a spiral shape on a substantially flat plane.

<Second Embodiment>

Next, a dehumidifier according to a second embodiment is described.

The dehumidifier of the second embodiment includes an adsorption column allowing at least one to-be-treated gas of hydrogen and oxygen produced by electrolysis of water to circulate therethrough so as to allow moisture in the to-be-treated gas to be adsorbed therein. The adsorption column has an adsorbent that adsorbs moisture, a column body that has a housing region containing the adsorbent, and a heating unit that is arranged within the column body and heats the adsorbent so as to cause desorption of the adsorbed moisture from the adsorbent. The column body is a tube having at least one of a recess and a projection on its outer surface.

As a specific example, a dehumidifier including two sets of adsorption units each having the aforementioned adsorption column for moisture removal from the to-be-treated gas is herein mentioned, and the second embodiment is described further in detail with reference to the drawings.

Figure 27:
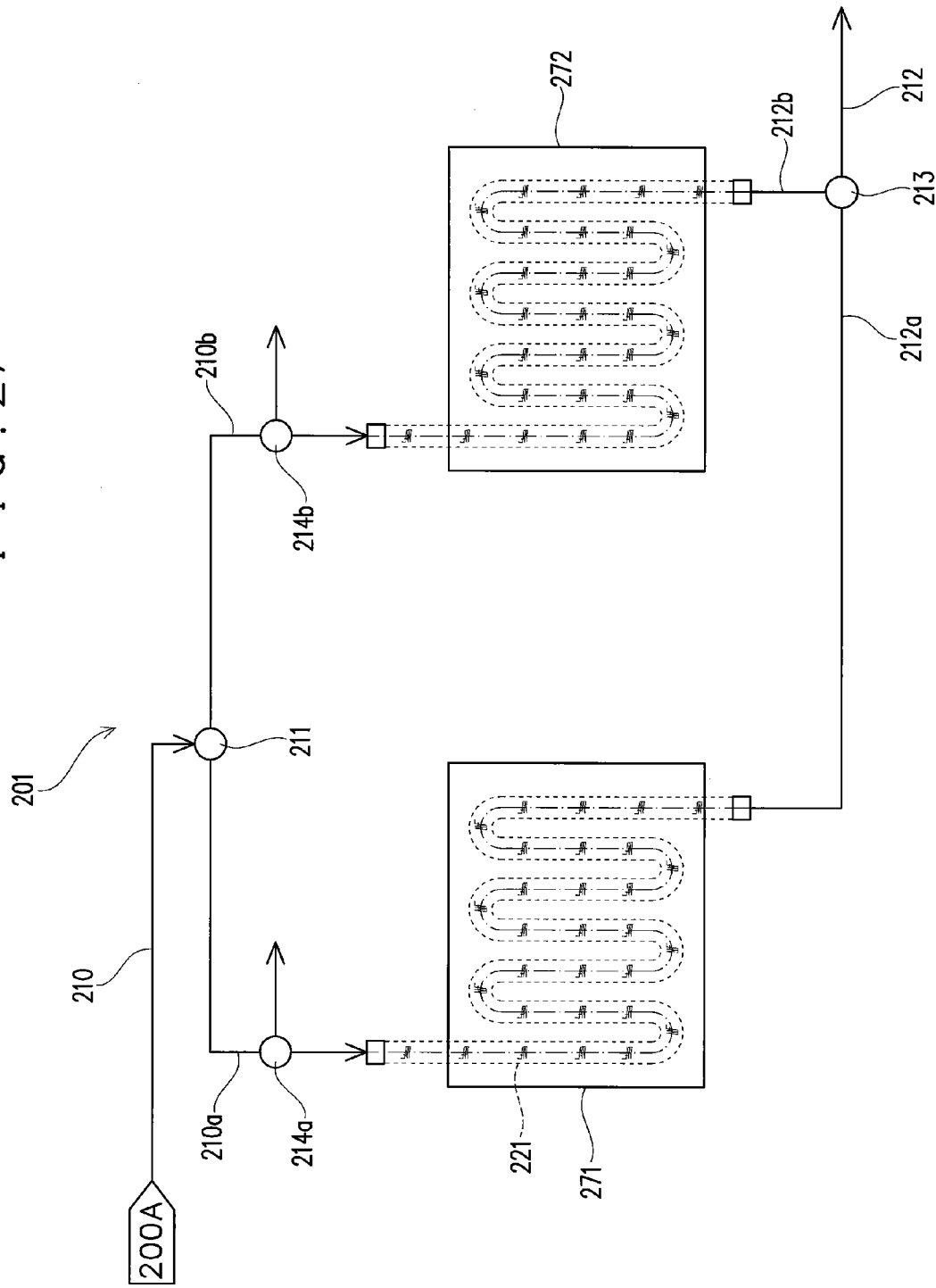
FIG. 27 is a schematic view of a dehumidifier according to a second embodiment (view schematically showing a cross section of cores of adsorption columns).

As shown in FIG. 27, a to-be-treated gas 200A that is subjected to moisture removal in a dehumidifier 201 of the second embodiment is produced by electrolysis of water and is at least one of hydrogen and oxygen.

The to-be-treated gas 200A generally contains moisture because it is produced by electrolysis of water. Further, the to-be-treated gas 200A can be used for various applications after the moisture removal by the dehumidifier 201.

As a device to be used in combination with the dehumidifier 201 of the second embodiment for producing the to-be-treated gas 200A, that is, a device for producing hydrogen and oxygen by electrolysis of water, a conventionally known general device can be used.

Figure 28:
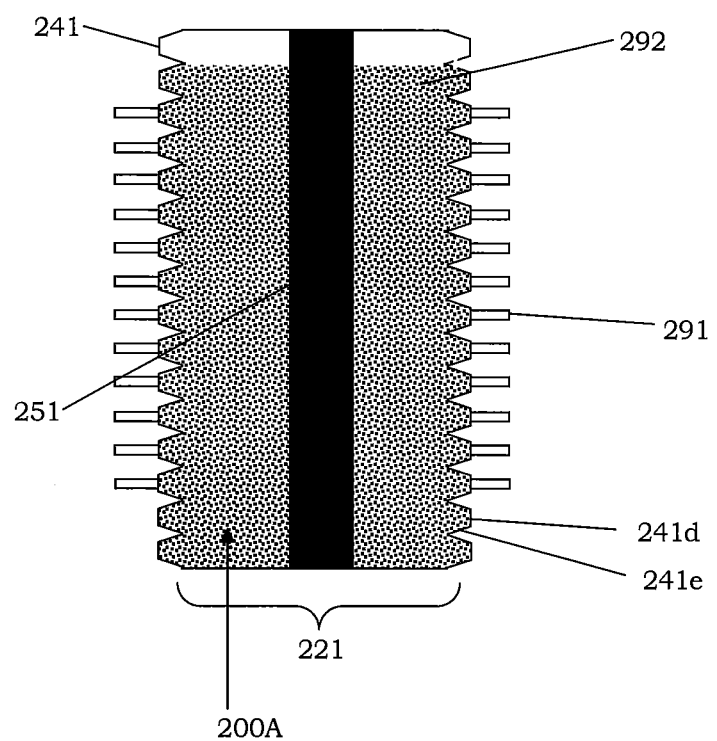
FIG. 28 is a schematic view schematically showing a cross section, cut along a circulation direction of a to-be-treated gas, of an adsorption column provided in the dehumidifier according to the second embodiment.

In the second embodiment, the dehumidifier 201 is described by exemplifying the case where the to-be-treated gas 200A to which a pressure higher than the atmospheric pressure is applied is supplied to the dehumidifier 201 so that the to-be-treated gas 200A can circulate through an adsorption column 221 filled with an adsorbent 292, as shown in FIG. 28.

As shown in FIG. 27, the dehumidifier 201 of the second embodiment includes two sets of adsorption units (271, 272) for removing moisture from the to-be-treated gas 200A. These two sets of adsorption units include one adsorption unit (hereinafter referred to also as a "first adsorption unit (271)") and the other adsorption unit (hereinafter referred to also as a "second adsorption unit (272)") with the same configuration.

As shown in FIG. 27, the dehumidifier 201, for example, includes a supply conduit 210 configured to supply the to-be-treated gas 200A to the first adsorption unit 271 or the second adsorption unit 272, a supply valve 211 attached to the supply conduit 210, a discharge conduit 212 configured to discharge the to-be-treated gas 200A from which moisture has been removed (hereinafter referred to also as a "dried gas") by the first adsorption unit 271 or the second adsorption unit 272 to the outside of the dehumidifier 201, and a discharge valve 213 attached to the discharge conduit 212.

The supply conduit 210 is arranged so as to connect the first adsorption unit 271 and the second adsorption unit 272 to each other. Further, the supply valve 211 is attached to a position in the course of the supply conduit 210. The supply conduit 210 includes a first supply conduit 210a on the first adsorption unit 271 side of the supply valve 211 and a second supply conduit 210b on the second adsorption unit 272 side of the supply valve 211.

The supply valve 211 is configured to deliver the to-be-treated gas 200A supplied from the outside of the dehumidifier 201 to either the first supply conduit 210a or the second supply conduit 210b.

The first supply conduit 210a is configured to supply the to-be-treated gas 200A to the first adsorption unit 271 through the supply valve 211 attached to its one end.

The second supply conduit 210b is configured to supply the to-be-treated gas 200A to the second adsorption unit 272 through the supply valve 211 attached to its one end.

With such a configuration, the dehumidifier 201 allows the to-be-treated gas 200A supplied from the outside of the dehumidifier 201 to be supplied to either the first supply conduit 210a or the second supply conduit 210b through the supply valve 211.

The discharge conduit 212 is arranged so as to connect the first adsorption unit 271 and the second adsorption unit 272 to each other. Further, the discharge valve 213 is attached to a position in the course of the discharge conduit 212. The discharge conduit 212 includes a first discharge conduit 212a on the first adsorption unit 271 side of the discharge valve 213 and a second discharge conduit 212b on the second adsorption unit 272 side of the discharge valve 213.

The discharge valve 213 is configured to discharge a dried gas that has been generated in either the first adsorption unit 271 or the second adsorption unit 272 and delivered through the first discharge conduit 212a or the second discharge conduit 212b to the outside of the dehumidifier 201.

The first discharge conduit 212a is configured to discharge, from the first adsorption unit 271, a dried gas generated in the first adsorption unit 271 and deliver it to the discharge valve 213.

The second discharge conduit 212b is configured to discharge, from the second adsorption unit 272, a dried gas generated in the second adsorption unit 272 and deliver it to the discharge valve 213.

With such a configuration, the dehumidifier 201 allows the dried gas generated in the first adsorption unit 271 or the second adsorption unit 272 to be discharged to the outside of the dehumidifier 201 through the discharge valve 213.

That is, the dehumidifier 201 is configured to switch the supply destination of the to-be-treated gas 200A between the first adsorption unit 271 and the second adsorption unit 272 using the supply valve 211, and supply the to-be-treated gas 200A to either one of the first adsorption unit 271 and the second adsorption unit 272 through either one of the supply conduits (210a, 210b). Further, the dehumidifier 201 is configured to discharge the dried gas from either the first adsorption unit 271 or the second adsorption unit 272 to the outside of the dehumidifier 201 through the discharge conduit 212 using the discharge valve 213.

Due to such a configuration of the dehumidifier 201, the adsorbent that is contained in the adsorption column 221 and has already adsorbed moisture is allowed to desorb the moisture by heating so as to be thermally regenerated in the second adsorption unit 272, while moisture in the to-be-treated gas 200A is adsorbed in the adsorption column 221 in the first adsorption unit 271.

Examples of the adsorbent include conventionally known general adsorbents, specifically, such as granular synthetic zeolite, silica gel, and active alumina.

Further, the dehumidifier 201 includes a first release valve 214a and a second release valve 214b attached respectively to the first supply conduit 210a and the second supply conduit 210b. Further, the dehumidifier 201 has a configuration in which, when the adsorbent is thermally regenerated in the second adsorption unit 272 while moisture is removed from the to-be-treated gas 200A in the first adsorption unit 271, part of the dried gas is allowed to flow back into the second adsorption unit 272 through the discharge valve 213 as a purge gas, so that water vapor and heat generated in the second adsorption unit 272 due to the thermal regeneration can be released to the outside of the system through the second release valve 214b attached to the second supply conduit 210b.

Further, the dehumidifier 201 has a configuration in which, when the adsorbent is thermally regenerated in the first adsorption unit 271 while moisture is removed from the to-be-treated gas 200A in the second adsorption unit 272, part of the dried gas is allowed to flow back into the first adsorption unit 271 through the discharge valve 213 as a purge gas, so that water vapor and heat generated in the first adsorption unit 271 due to the thermal regeneration can be released to the outside of the system through the first release valve 214a attached to the first supply conduit 210a.

With such a configuration, the dehumidifier 201 can remove water vapor and heat generated in the adsorption units 271 and 272.

Figure 30:
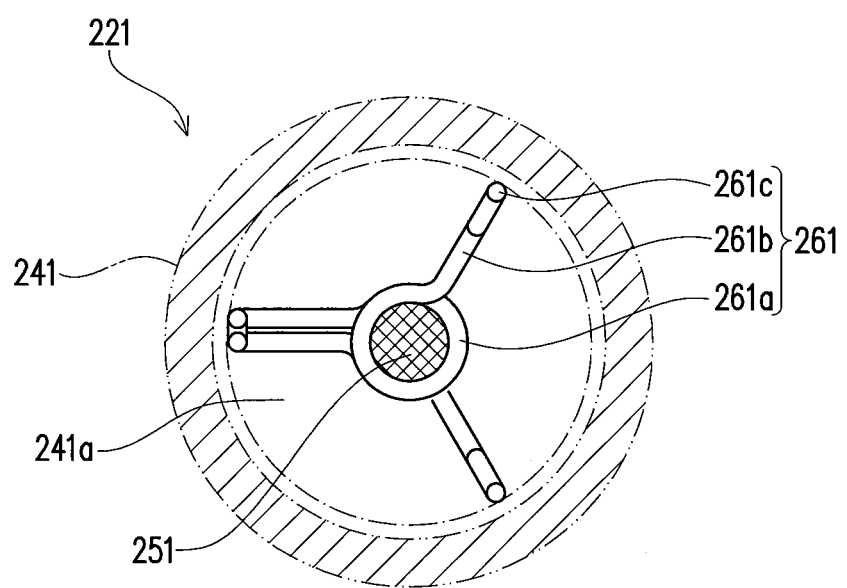
FIG. 30 is a schematic view schematically showing a cross section, cut along a direction perpendicular to the circulation direction of the to-be-treated gas, of the adsorption column provided in the dehumidifier according to the second embodiment.

As shown in FIGS. 29 and 30, a column body 241, for example, is formed into a cylindrical shape. Further, the column body 241 is formed so as to have a hollow space thereinside which can be used as a housing region 241a containing the adsorbent that adsorbs moisture contained in the to-be-treated gas A.

Further, the column body 241 has a vent hole (not shown in the figure) at each of both ends in the circulation direction of the to-be-treated gas 200A. The column body 241 has a configuration in which the to-be-treated gas 200A supplied through the vent hole (not shown in the figure) on the one end side is discharged through the vent hole (not shown in the figure) on the other end side.

As shown in FIG. 28, the column body 241 is a tube 241 having at least one of a recess 241e and a projection 241d on its outer surface.

When the column body 241 has such a configuration, the dehumidifier 201 of the second embodiment has an advantage that the outer surface area of the column body 241 is enlarged, so that the adsorbent 292 from which moisture has been desorbed by heating is efficiently cooled. Further, the dehumidifier 201 of the second embodiment has an advantage that, while an equivalent cooling efficiency is maintained, the length of the column body 241 can be shortened, as compared to the length of a column body that is a tube having no recess or projection on its outer surface and having an outer surface area that is equal to that of the column body 241.

Further, due to enhanced cooling efficiency, the dehumidifier 201 has an advantage of being capable of reducing the time from when moisture has been desorbed by heating of the adsorbent 292 to when the adsorbent 292 has been sufficiently cooled.

Incidentally, a conventional dehumidifier is composed of two adsorption columns in the same manner as the dehumidifier 201 of the second embodiment. The conventional dehumidifier is configured so that, while an adsorbent is heated and cooled in one adsorption column, moisture is removed from a to-be-treated gas by an adsorbent in the other adsorption column. Accordingly, in such a conventional dehumidifier, as the time required to heat and cool the adsorbent in the one adsorption column increases, the amount of to-be-treated gas which is treated in the other adsorption column also increases. Accordingly, the conventional dehumidifier suffers from a problem that the amount of adsorbent to be stored in the other adsorption column increases in order to treat a large amount of the to-be-treated gas, resulting in an increase in size of the dehumidifier itself.

In contrast, in the dehumidifier 201 of the second embodiment, the column body 241 of the adsorption column 221 is a tube having at least one of the recess 241e and the projection 241d on its outer surface, so that the outer surface area of the column body 241 is increased. Therefore, in the dehumidifier 201 of the second embodiment, it is easier to cool the column body 241. Therefore, the dehumidifier 201 of the second embodiment has an advantage that the time to cool the adsorbent provided in the column body 241 can be reduced. Furthermore, since the dehumidifier 201 of the second embodiment includes the heating unit 251 provided within the column body 241, it is easier in the dehumidifier 201 of the second embodiment to cool the column body 241, as compared to a conventional dehumidifier in which a heating unit is provided in the outer circumference of a column body. Therefore, the dehumidifier 201 of the second embodiment has an advantage that the time to cool the adsorbent provided within the column body 241 can be reduced. Accordingly, the compactification of the dehumidifier 201 of the second embodiment is easy, and the possibility of occurrence of a constraint in installation space is reduced.

Accordingly, the dehumidifier 201 of the second embodiment is advantageous in that the possibility of occurrence of a constraint in installation space can be reduced, while the decrease in the efficiency of moisture removal is suppressed.

Furthermore, the dehumidifier 201 of the second embodiment is advantageous also in that, since it is easy to cool the column body 241, as mentioned above, the amount of dried gas to be used as a purge gas for cooling the column body 241 can be reduced.

Figure 31:
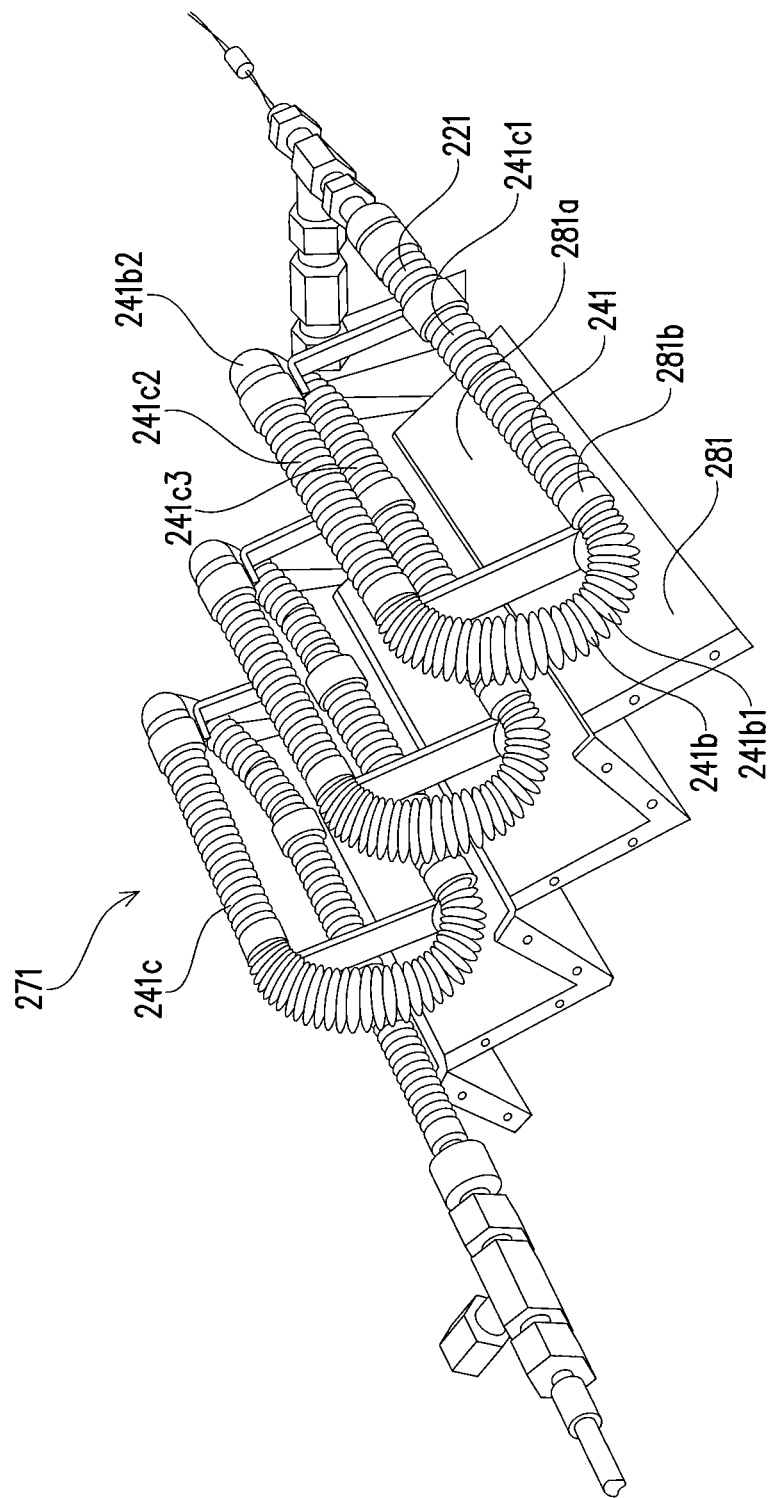
FIG. 31 is a perspective view of an adsorption unit of the dehumidifier according to the second embodiment (without a cover).

The tube 241 having at least one of a recess and a projection on its outer surface is preferably a corrugated tube having a recess and a projection repeatedly formed along the circulation direction of the to-be-treated gas 200A on its outer surface, as shown in FIG. 31.

Examples of the material for the tube 241 include stainless steel and titanium. Besides that, an alloy containing nickel as the main component also can be used therefor. Such an alloy contains at least 40 mass % of nickel. Examples of components to be contained in the alloy other than nickel include molybdenum, chromium, and iron.

Further, the tube 241 may have bent portions 241b as shown in FIG. 31.

When the tube 241 has such a configuration, the dehumidifier 201 of the second embodiment is restricted from being elongated in one direction, as compared to a conventional dehumidifier in which the column body is a tube having no bent portions. Accordingly, in the dehumidifier 201 of the second embodiment, the possibility of occurrence of a constraint in installation space can be reduced, while the decrease in the efficiency of moisture removal is suppressed.

The adsorbent and the heating unit 251 may be provided also in the hollow space of the bent portions 241b. Due to such a configuration, the dehumidifier 201 of the second embodiment has advantages of being capable of removing moisture from the to-be-treated gas 200A also in the bent portions 241b, and also efficiently discharging moisture adsorbed on the adsorbent to the outside of the system.

Furthermore, in the case where the tube 241 has the bent portions 241b, the tube 241 may be formed so that the to-be-treated gas 200A circulates in one direction through the tube 241, and further the to-be-treated gas 200A that has circulated in the one direction through the tube 241 circulates in a direction opposite to the one direction through the tube 241.

Further, the tube 241 may be formed so that the to-be-treated gas 200A that has circulated in the opposite direction through the tube 241 circulates in the one direction through the tube 241.

Further, the dehumidifier 201 of the second embodiment may further include fins 291 in contact with the outer surface of the tube 241, as shown in FIG. 28.

By providing the fins 291 on the outer surface of the tube 241, the outer surface area of the column body 241 that is the aforementioned tube is still more enlarged in the dehumidifier 201 of the second embodiment. Therefore, the dehumidifier 201 of the second embodiment has an advantage that the adsorbent from which moisture has been desorbed by heating is efficiently cooled. Further, the dehumidifier 201 of the second embodiment has an advantage that, while an equivalent cooling efficiency by the column body 241 is maintained, the length of the column body 241 can be shortened, as compared to the case where the tube 241 has no fins on its outer surface.

Accordingly, when the dehumidifier 201 of the second embodiment has such a configuration, the possibility of occurrence of a constraint in installation space is still further reduced, while the decrease in the efficiency of moisture removal is still further suppressed.

The dehumidifier 201 of the second embodiment may be configured so as to have the fins 291 each lying along the circumferential direction of the tube 241.

The heating unit 251, for example, is formed into a rod shape, as shown in FIGS. 29 and 30. Further, the heating unit 251 is arranged within the column body 241 along the extending direction of the column body 241. The adsorption column 221 includes the heating unit 251.

Furthermore, the heating unit 251 is arranged so as to coincide with the center axis of the column body 241 having a cylindrical shape.

Moreover, the heating unit 251, for example, is provided with an electrical heater having a rod shape. Further, the heating unit 251 is configured to heat the adsorbent contained in the column body 241 using the electrical heater.

It should be noted that the conventional dehumidifier has a configuration in which an electrical heater as a heating unit is wound around the outer circumference of the column body. Accordingly, the conventional dehumidifier has a problem that part of heat generated from the electrical heater is directly released to the outside of the system without heating the adsorbent in the column body 241. In view of such a problem, there is also known a conventional dehumidifier having a configuration including a heat insulator in the form of a sheet wrapped around the electrical heater and the column body. However, the dehumidifier having such a heat insulator has a problem that it is difficult to cool the adsorbent that has been heated.

In contrast, since the heating unit 251 is arranged within the column body 241, the dehumidifier 201 of the second embodiment has an advantage of being capable of heating the adsorbent efficiently, and further has an advantage of being capable of cooling the adsorption column 221 efficiently, as compared to the conventional dehumidifier in which the electrical heater is wound around the outer circumference of the column body.

The region between the heating unit 251 and the column body 241 serves as the housing region 241a containing the adsorbent, as shown in FIGS. 29 and 30. The adsorbent can be provided in the adsorption column 221 so as to occupy almost the entire housing region 241a.

The adsorption column 221 may include a support member 261 arranged within the column body 241 so as to support the heating unit 251, as shown in FIGS. 29 and 30. Further, the adsorption column 221 may be configured so that the heating unit 251 is supported by the support member 261 along the center axis of the adsorption column 221.

Specifically, as shown in FIGS. 29 and 30, the support member 261 including a winding portion 261a formed by winding wire rods around the outer circumference of the heating unit 251, a plurality of leg portions 261b formed by allowing the wire rods to radially extend outwardly from the winding portion 261a toward the inner side wall of the column body 241, and a plurality of pressing portions 261c formed, by bending the wire rods of the leg portions 261b at their outer ends so that each wire rod extends along the inner side wall of the column body 241, so as to press the inner side wall of the column body 241 by repulsive elastic forces of the thus bent wire rods, for example, can be used. This support member 261 is restricted from moving within the column body 241 by the repulsive elastic forces of the plurality of pressing portions 261c. That is, the position of the winding portion 261a is fixed within the column body 241. This allows the support member 261 to restrict the movement of the heating unit 251 having a rod shape within the winding portion 261a and to support the heating unit 251.

Further, the support member 261 as shown in FIGS. 29 and 30 which is formed by: winding metal wire rods into a spiral shape so as to form a cylindrical space; radially extending the metal wire rods that have been wound into a spiral shape until each metal wire rod abuts the inner side wall of the column body 241; further bending the metal wire rods so that each metal wire rod extends along the inner side wall of the column body 241; and thereafter bending back the metal wire rod in a direction opposite to the radial direction, for example, can be used.

Figure 32:
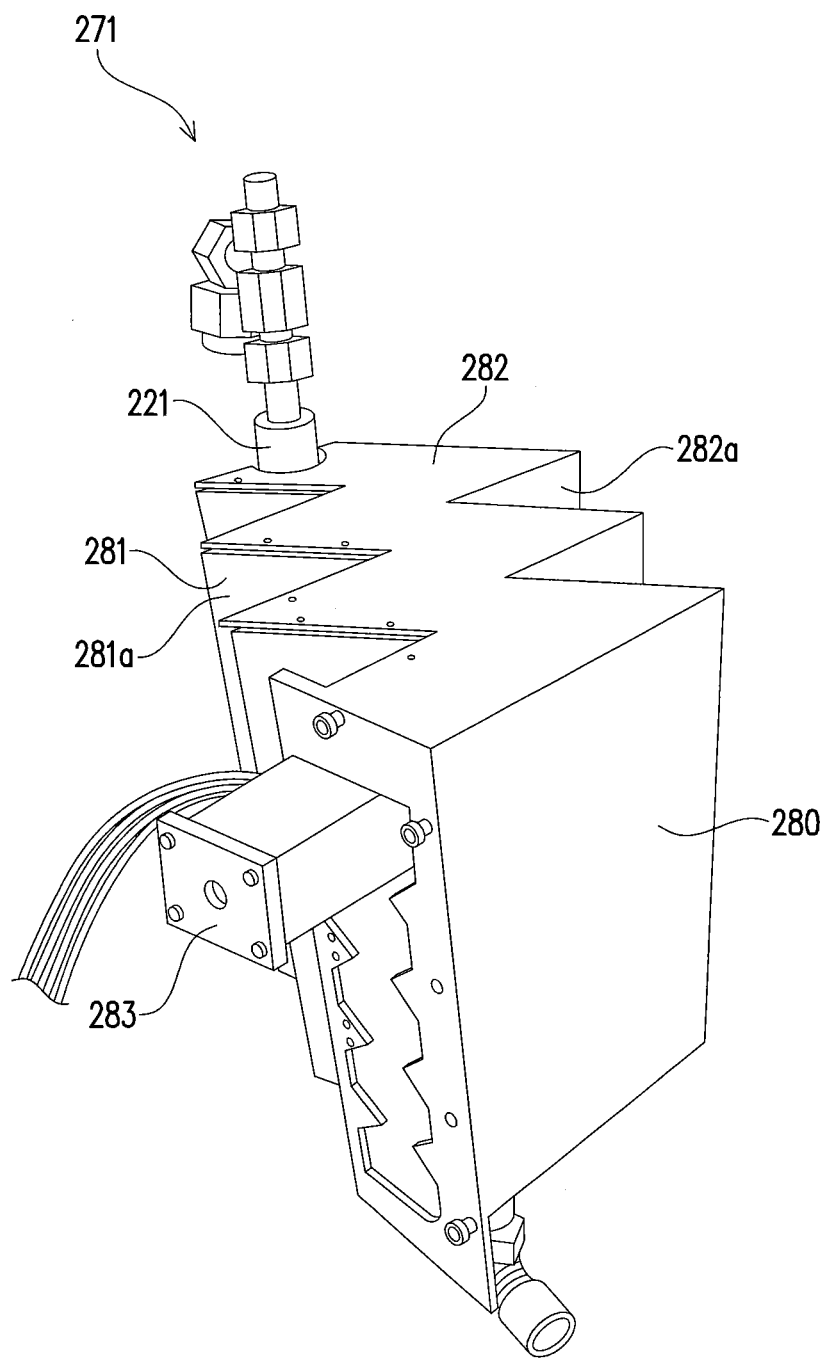
FIG. 32 is a perspective view of the adsorption unit of the dehumidifier according to the second embodiment (with the cover).

As shown in FIG. 32, the adsorption units 271 and 272 each include a duct 280 housing the adsorption column 221 therein and allowing a gas for cooling the adsorption column 221 to circulate therethrough. The duct 280 is formed so as to have a zigzag flow path for the gas circulating in the duct 280.

The duct 280 may include a fixing base 281, as shown in FIG. 31, to which the adsorption column 221 is fixed and a cover 282, as shown in FIG. 33, which covers the column body 221. The duct 280 may be configured to house the adsorption column 221 between the fixing base 281 and the cover 282, as shown in FIG. 32.

Furthermore, the duct 280 may include a blower 283, as shown in FIG. 32, which delivers a blow, for cooling the adsorbent that has been heated, from the outside of the adsorption column 221 containing the adsorbent to the space between the fixing base 281 and the cover 282.

As shown in FIG. 31, the fixing base 281 has a wall plate 281a formed by folding a metal plate, and a fixing member 281b which is fixed to the upper sides of the wall plate 281a and to which the adsorption column 221 is fixed.

The wall plate 281a is formed into a stepped shape in side view by folding a rectangular metal plate so that a mountain fold and a valley fold are repeatedly formed, each fold line extending in the width direction. Specifically, the wall plate 281a has five folded portions of peak/valley/peak/valley/peak.

The cover 282 has a ceiling wall 282a having substantially the same shape as the wall plate 281a of the fixing base 281 and a sidewall 282b hanging from each of both edges of the ceiling wall 282a, as shown in FIG. 33.

The sidewall 282b has a lower edge formed into a stepped shape in side view in the same manner as the wall plate 281a.

That is, the cover 282 is configured to form a gas flow path having a cross section in a laterally elongated rectangular shape, together with the fixing base 281, when the lower edges of the sidewalls 282b are fixed to the side edges of the wall plate 281a. The cover 282 is configured to form a flow path extending in a zigzag manner in the circulation direction of the gas.

As shown in FIG. 31, the adsorption column 221 is attached to the fixing base 281 so as to extend in the width direction of the wall plate 281a. Specifically, the adsorption column 221 is attached to the fixing base 281 so that the adsorption column 221 having a length about seven times the width of the wall plate 281a is folded at 180° at six points so as to form six bent portions 241b and seven linear portions 241c.

More specifically, the adsorption column 221 has the first linear portion 241c1 arranged at the inlet of the duct 280 so as to extend in the width direction of the fixing base 281, and the first bent portion 241b1 arranged at a position close to the sidewall 282b with the second linear portion 241c2 extending along the first mountain fold portion of the wall plate 281a. Continuously, the second bent portion 241b2 is arranged at a position close to the sidewall 282b and opposite to the first bent portion 241b1 with the third linear portion 241c3 extending along the first valley fold portion of the wall plate 281a. The adsorption column 221 is arranged within the duct 280 in such a manner until reaching the vicinity of the outlet.

In this embodiment shown in FIG. 31, the adsorption column 221 is housed in the duct 280 having a gas flow path in a zigzag shape. Therefore, when a cooling gas for cooling the adsorption column 221 circulates through the duct 280, the flow of the cooling gas is significantly disturbed. As a result, the adsorption column 221 can be more efficiently cooled.

In the embodiment shown in FIG. 31, in the case where the dehumidifier 201 includes the fins for further improving the cooling efficiency, it is preferable that the fins be preferably arranged parallel to the circulation direction of the gas flow and each be oriented orthogonal to the corresponding linear portions 241c.

For example, a plurality of metal plates each provided with a cutout having substantially the same width as the diameter of the adsorption column 221 are prepared, and the adsorption column 221 is fitted into this cutout so that each metal plate is fixed to the outer side of the adsorption column 221. Thus, fins for promoting the cooling effect can be formed.

In this embodiment shown in FIG. 31, among four walls of the duct 280 which define the gas flow path that is rectangular in cross section, two opposite walls 281a and 282a are each formed into a stepped shape in side view, as shown in FIG. 32, so that the gas flow path is formed into a zigzag shape. Therefore, a larger length of the gas flow path can be ensured as compared to the linear distance from the inlet to the outlet of the duct 280.

Moreover, the adsorption column 221 that is longer than the width of the duct 280 is housed inside the duct 280 by forming the plurality of bent portions 241b in the adsorption column 221. Therefore, the adsorption units 271 and 272 that are compact and have excellent efficiency of cooling the adsorption column 221 are formed in the embodiment shown in FIG. 31.

Figure 34:
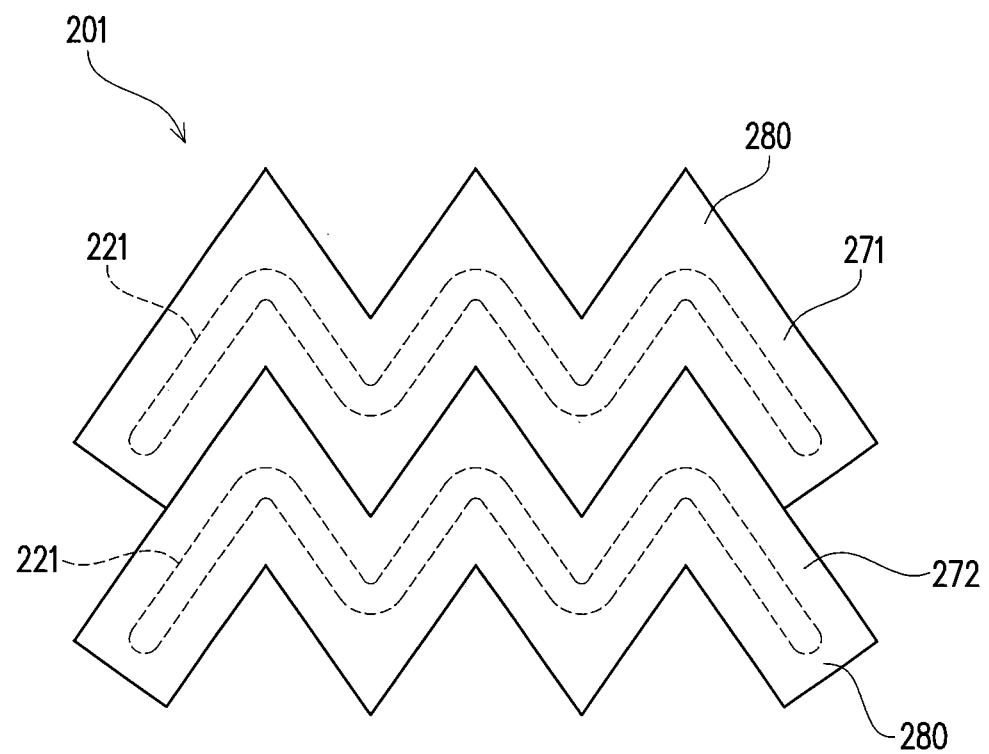
FIG. 34 is a schematic side view of the dehumidifier according to the second embodiment with a first adsorption unit and a second adsorption unit overlapping each other.

Further, the two opposite walls 281a and 282a are each formed into a stepped shape in side view, as shown in FIG. 32, in the embodiment shown in FIG. 31. Therefore, when the two adsorption units 271 and 272 are stacked together as shown in FIG. 34, formation of a gap between them can be suppressed.

That is, when the first adsorption unit 271 and the second adsorption unit 272 are configured as shown in FIG. 31, the dehumidifier 201 according to the second embodiment can be more suitably adapted for in-vehicle applications.

Subsequently, a method for producing the dehumidifier of the second embodiment is described.

In the method for producing the dehumidifier of the second embodiment, the inside of a straight tube constituting the column body 241 is loaded with the electrical heater having a rod shape and the adsorbent. Thereafter, the tube is bent, so that the dehumidifier 201 including the column body 241 formed of the tube having the bent portions 241b is produced.

Specifically, a straight tube that forms the column body 241 and an electrical heater having a rod shape that is slightly shorter than the tube are prepared. Next, the support member 261 is attached at a specific spacing to the electrical heater so that the electrical heater is inserted through the winding portion 261a. Then, the electrical heater with the support member 261 attached thereto is introduced into the tube through one opening, and then the adsorbent is further introduced into the tube. Thereafter, each bent portion 241b can be formed by bending the tube at a specific position.

This makes it easy to arrange such an electrical heater having a rod shape so as to coincide with the center axis of the corrugated tube, as compared to a method in which the tube after being bent is loaded with the electrical heater and the adsorbent.

In the case where a commonly used metal tube or the like is employed as the tube, the bent portion 241b can be formed using a pipe bender or the like.

At this time, since the inside of the tube has already been loaded with the adsorbent, buckling of the tube can be prevented and application of a local stress to the electrical heater by bending the tube can be suppressed. Thus, the bent portion 241b having a smaller radius of curvature can be formed.

In the method for producing the dehumidifier of the second embodiment, use of the corrugated tube can further suppress the concentration of a stress on a part of the bent portion of the tube when bending the tube. Therefore, the tube can be bent to a still smaller radius of curvature so as to be compact. Accordingly, the possibility of occurrence of a constraint in installation space of the dehumidifier can be reduced.

The maximum outer diameter of the corrugated tube is preferably at least 0.7 cm but not more than 4 cm, more preferably at least 1 cm but not more than 2 cm. Use of a tube having a maximum outer diameter of at least 0.7 cm but not more than 4 cm allows the corrugated tube to be bent to a small bending radius of the corrugated tube. Accordingly, it is advantageous in that compactification of the dehumidifier itself is facilitated, and further in that bending of the corrugated tube is easy.

Furthermore, the difference in height between a projection and a recess on the outer surface of the corrugated tube (absolute value of the difference between the distance from the center axis of the tube to the outer tip of the projection and the distance from the center axis of the tube to the inner base end of the recess) preferably falls within the range of 2 mm to 4 mm, for example. When this difference is at least 2 mm, the surface area of the corrugated tube is large, which is advantageous. Also, when this difference is not more than 4 mm, a small bending radius of the bent portion can be easily achieved when bending the corrugated tube, which is advantageous.

Further, in the corrugated tube, the distance between the outer tips of each two adjacent projections in the axis direction of the tube preferably falls within the range of 3 to 5 mm. When this distance falls within the range of 3 to 5 mm, there are advantages that the surface area of the corrugated tube is large, and further that bending of the corrugated tube is easy.

That is, the dehumidifier 201 that is compact can be produced still more easily and conveniently by forming the column body 241 using these types of corrugated tubes.

Commonly used corrugated tubes include the following types: those having a projection and a recess that are each independently formed in the form of a ring, in which the recess and the projection are alternately repeated along the circulation direction of the to-be-treated gas 200A (hereinafter referred to also as an "annularly corrugated tube"); and those having a projection and a recess that are provided in a spiral shape, in which the recess and the projection are alternately repeated along the circulation direction of the to-be-treated gas 200A (hereinafter referred to also as a "helically corrugated tube"). When corrugated tubes are made of the same material with the same material thickness, the annularly corrugated tubes are more advantageous for reducing the bending radius of the bent portion 241b.

On the other hand, since a corrugated tube has a groove-shaped portion on the inner side corresponding to the projection, a gap is likely to be formed within the groove when a large amount of the adsorbent is introduced into the annularly corrugated tube at a time.

In contrast, the helically corrugated tubes are advantageous in that the gap is less likely to be formed since the groove is continuous from one end to the other end of such a tube in a spiral manner.

Further, in the case of the helically corrugated tubes, for example, when the electrical heater is introduced in the tube, the electrical heater can be automatically introduced into the tube by engaging the tips of the leg portions 261b of the support member 261 with the spiral groove and relatively rotating the tube and the electrical heater to each other about the axis, thereby allowing the support member 261 to penetrate into the tube along the groove.

Furthermore, the helically corrugated tubes are advantageous also in that the tube itself can be easily fabricated.

That is, the dehumidifier 201 that is compact can be produced still more easily and conveniently by forming the column body 241 using such types of corrugated tubes.

Subsequently, a method of using the dehumidifier 201 is described.

In the dehumidifier 201, the to-be-treated gas 200A circulates through the plurality of the adsorption columns 221 each containing the adsorbent, thereby causing moisture contained in the to-be-treated gas 200A to be adsorbed on the adsorbent, so that the moisture contained in the to-be-treated gas 200A can be removed.

Further, in the dehumidifier 201, the to-be-treated gas 200A containing moisture is supplied to the first adsorption unit 271, for example, by operating the supply valve 211 shown in FIG. 27, as has been described above, so that the moisture in the to-be-treated gas 200A can be adsorbed on the adsorbent in the first adsorption unit 271. On the other hand, while moisture in the to-be-treated gas 200A is adsorbed on the adsorbent in the first unit, an adsorbent that has already adsorbed moisture can be thermally regenerated in the second adsorption unit 272 by desorption of the moisture which is caused due to heating of the heating unit 251. The adsorbent that has desorbed moisture can be cooled, for example, by being left standing after termination of heating of the heating unit 251.

Further, the dehumidifier 201 can continuously dehumidify the to-be-treated gas 200A without intervals, by switching the supply destination of the to-be-treated gas 200A containing moisture between the first adsorption unit 271 and the second adsorption unit 272 at specific time periods, as has been described above.

In the dehumidifier 201, a dried gas for cooling can be circulated through the adsorption column 221 in order to cool the adsorbent that has been heated by the heating unit 251.

The dehumidifier of the second embodiment is configured as mentioned above, and thus has the following advantages.

The dehumidifier 201 of the second embodiment includes the adsorption column 221 through which at least one to-be-treated gas 200A of hydrogen and oxygen produced by electrolysis of water circulates, so that moisture in the to-be-treated gas 200A is adsorbed. The adsorption column 221 includes the adsorbent 292 that adsorbs moisture, the column body 241 that has the housing region 241a containing the adsorbent 292, and the heating unit 251 that is arranged within the column body 241 and heats the adsorbent 292 so as to cause desorption of the adsorbed moisture from the adsorbent 292. The column body 241 is a tube having at least one of the recess 241e and the projection 241d on its outer surface.

The dehumidifier is advantageous, since the column body 241 is a tube having at least one of the recess 241e and the projection 241d on its outer surface, in that the outer surface area of the column body 241 is enlarged, so that the adsorbent 292 from which moisture has been desorbed by heating is efficiently cooled. Further, there is an advantage that, while an equivalent cooling efficiency is maintained, the length of the column body can be shortened, as compared to the length of a column body that is a tube having no recess or projection on its outer surface and having an outer surface area that is equal to that of the column body 241.

Accordingly, in the dehumidifier 201, the possibility of occurrence of a constraint in installation space can be reduced, while the decrease in the efficiency of moisture removal is suppressed.

Furthermore, in the dehumidifier 201 of the second embodiment, the tube serving as the column body 241 is a corrugated tube having a recess and a projection repeatedly formed along the circulation direction of the to-be-treated gas 200A on its outer surface.

According to this dehumidifier 201, the possibility of occurrence of a constraint in installation space can be reduced, while the decrease in the efficiency of moisture removal is suppressed.

Furthermore, in the dehumidifier 201 of the second embodiment, the tube 241 has the bent portions 241b.

Since this dehumidifier 201 is restricted from being elongated in one direction, as compared to a conventional dehumidifier in which the column body has no bent portions, the possibility of occurrence of a constraint in installation space is reduced while the decrease in the efficiency of moisture removal is suppressed.

Furthermore, the dehumidifier 201 of the second embodiment further includes the fins 291 in contact with the outer surface of the tube 241.

According to this dehumidifier 201, the outer surface area of the column body 241 that is the tube is still more enlarged. Therefore, the dehumidifier 201 has an advantage that the adsorbent 292 from which moisture has been desorbed by heating is efficiently cooled. Further, the dehumidifier 201 has an advantage that, while an equivalent cooling efficiency by the column body 241 is maintained, the length of the column body 241 can be shortened, as compared to the case where the tube 241 has no fins on its outer surface.

The dehumidifier 201 of the second embodiment further includes the duct 280 housing the adsorption column 221 therein and allowing a gas for cooling the adsorption column 221 to circulate therethrough. The duct 280 is formed so as to have a zigzag flow path for the gas circulating through the duct 280.

According to this dehumidifier 201, when a cooling gas for cooling the adsorption column 221 circulates through the duct 280, the flow of the cooling gas is significantly disturbed. As a result, the adsorption column 221 can be more efficiently cooled.

Further, in the dehumidifier 201 of the second embodiment, the heating unit 251 is formed into a rod shape. Further, the adsorption column 221 further includes the support member 261 that is arranged within the column body 241 and capable of supporting the heating unit 251 along the center axis of the column body 241.

According to this dehumidifier 201, it is possible to heat the adsorbent 292 efficiently and to cool the adsorption column 221 efficiently as well.

The dehumidifier of the second embodiment is as has been exemplified above. However, the present invention is not limited to the above-exemplified dehumidifier.

Further, various embodiments that are used for common dehumidifiers can be employed, as long as the effects of the present invention are not impaired.

For example, although the dehumidifier 201 of the second embodiment is composed of the two adsorption units, the dehumidifier of the present invention may include one adsorption unit alone, or may include three or more adsorption units.

Further, the dehumidifier 201 of the second embodiment has the wall plate 281a of the fixing base 281 and the ceiling wall 282a of the cover 282 that are each formed into a stepped shape in side view. However, the dehumidifier 201 of the present invention may have the wall plate 281a and the ceiling wall 282a that are each flat in side view. Specifically, the duct 280 may be formed so as to have a rectangular parallelepiped outer shape. The dehumidifier 201 may be provided with a flow path, separately formed in the duct 280, allowing a gas for cooling the adsorption column 221 to pass therethrough in the circulation direction in a zigzag manner, or the duct 280 may be formed so as not to allow the gas for cooling the adsorption column 221 to pass therethrough in the circulation direction in a zigzag manner.

Furthermore, in the dehumidifier 201 of the present invention, the configuration for cooling the adsorption column 221 also is not specifically limited.

Figure 35:
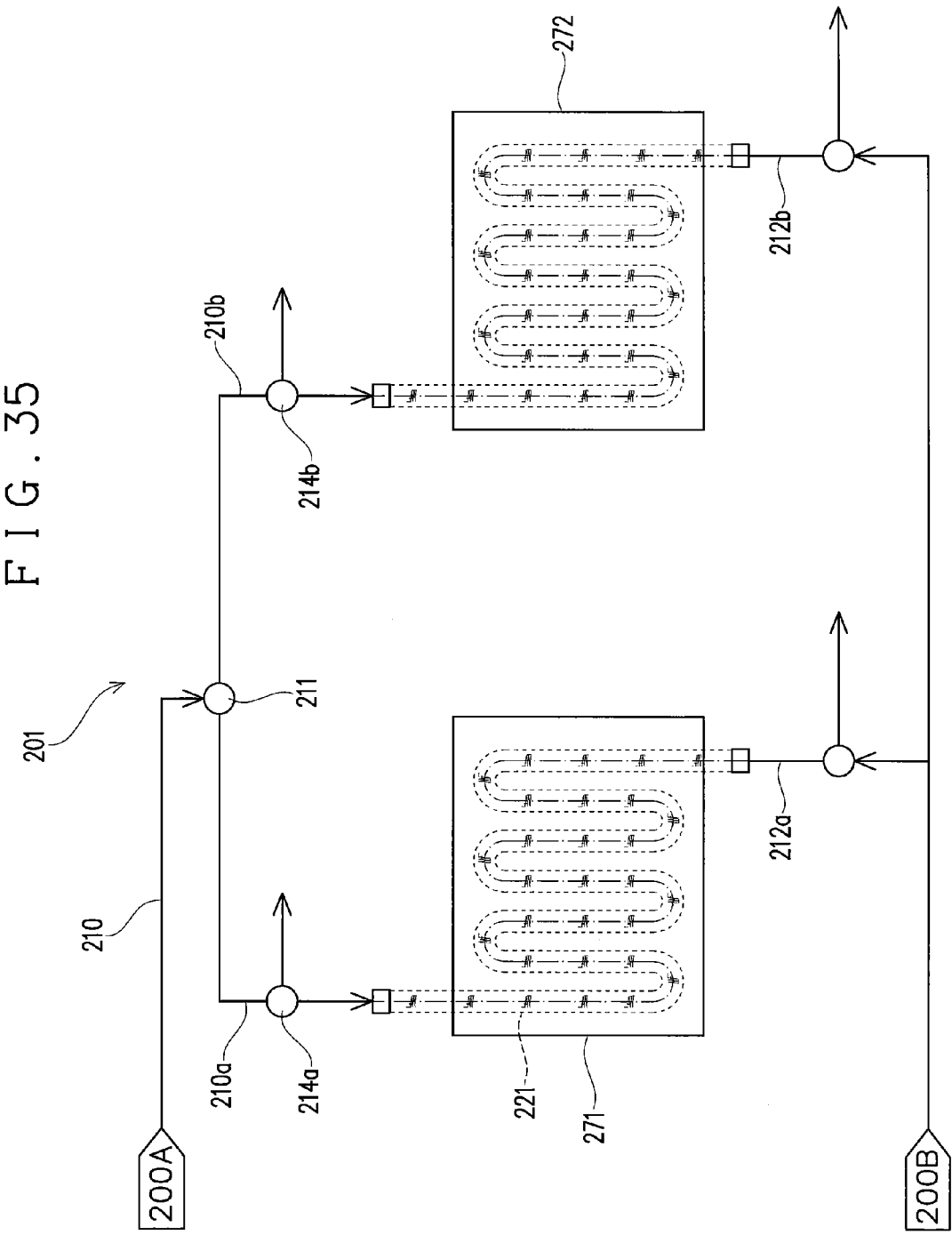
FIG. 35 is a schematic view of a dehumidifier according to another embodiment (view schematically showing a cross section of cores of adsorption columns).

For example, the dehumidifier 201 of the embodiment is configured to supply a dried gas produced in either one of the adsorption units 271 and 272 to the other of the adsorption units 271 and 272 as a purge gas, and to release water vapor and heat generated in the other of the adsorption units 271 and 272 to the outside of the system. However, the dehumidifier 201 of the present invention may be configured to supply a separately prepared dried gas 200B, instead of the dried gas produced in the one of the adsorption units 271 and 272, to the other of the adsorption units 271 and 272 as a purge gas, and to release water vapor and heat generated in the other of the adsorption units 271 and 272 to the outside of the system, as shown in FIG. 35.

Further, the dehumidifier 201 of the present invention may include an outer tube housing the adsorption column 221, so as to cool the adsorption column 221 by allowing a refrigerant (water, an antifreeze solution such as ethylene glycol and alcohol, etc.) to circulate through the gap between the outer tube and the adsorption column 221. Further, the dehumidifier 201 of the present invention may include a tube that is thinner than the adsorption column 221 and wound around the outer circumference of the adsorption column 221, so as to cool the adsorption column 221 by allowing a refrigerant to circulate through the tube. The dehumidifier 201 having such a configuration enables efficient cooling of the heated adsorbent.

Further, the dehumidifier 201 of the present invention may be configured so that the adsorption column 221 is cooled by using at least one medium selected from a group consisting of a cold gas from the fan, the purge gas, and the refrigerant.

Further, in the dehumidifier 201 of the present invention, the heating unit 251 is preferably arranged within the column body 241 throughout the entire extending direction of the column body 241. Further, in the dehumidifier 201 of the present invention, the heating unit 251 is preferably arranged within the bent portions 241b, as has been described above. In the case where the heating unit 251 includes an electrical heater having a rod shape, it is preferable that the heating unit 251 be arranged so as to coincide with the center axis of the column body 241 having a cylindrical shape in the dehumidifier 201 of the present invention. However, it does not matter if the heating unit 251 is arranged so as to pass through points deviating from the center axis to some extent.

Further, the dehumidifier 201 of the present invention preferably has two or more aforementioned bent portions. When the dehumidifier 201 has a structure including a plurality, that is, 2 or more of bent portions, the dehumidifier can be suppressed from being elongated in one direction and is allowed to be compact, as compared to a dehumidifier provided with an adsorption column having the same entire length and including only one bent portion.

Further, the adsorption column described in the second embodiment has bent portions and linear portions, which however is not restrictive. The adsorption column may be composed of bent portions without having linear portions. Specifically, the dehumidifier 201 of the present invention may have an adsorption column that is bent continuously into a spring (coil) shape. In the case where the adsorption column has such a configuration, a cooling conduit for cooling may be provided in a region surrounded by the portion wound into a spring shape of the adsorption column, so that a refrigerant is allowed to circulate through the cooling conduit during cooling. Instead of providing the cooling conduit in such a region, the air may be simply circulated around the outer circumference of the adsorption column.

Figure 36:
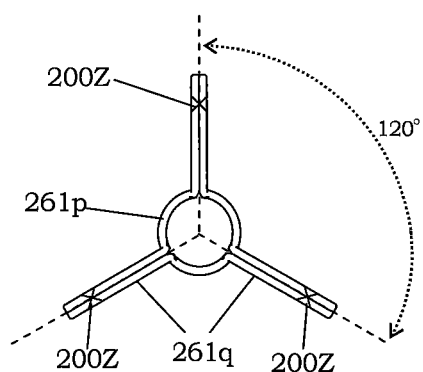
FIG. 36 is a cross sectional view, cut along a plane perpendicular to an extending direction of a heating unit, of a support member according to a modification.
Figure 37:
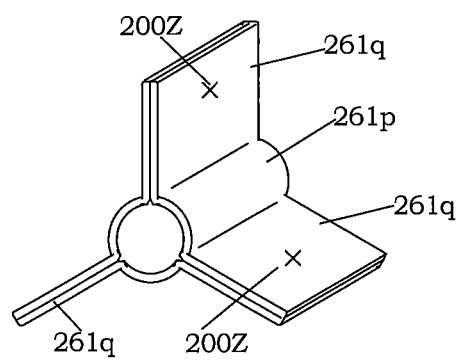
FIG. 37 is a perspective view showing the support member according to the modification.

Moreover, FIGS. 36 and 37 show a modification of the support member 261. FIG. 36 is a sectional view, cut along a plane perpendicular to the extending direction of the heating unit 251, of the modification, and FIG. 37 is a perspective view of the modification.

As shown in FIGS. 36 and 37, this modification of the support member 261 has a tubular portion 261p formed by combining three three-segmented tube bodies so as to cover the heating unit 251 having a round bar shape, and flanges 261q having a rectangular plate shape respectively extending outwardly from both edges of the three-segmented tube bodies. A total of six pieces of flanges 261q respectively extending from both edges of the three-segmented tube bodies include plate support legs, two adjacent pieces of which are stacked together, extending radially from the center of the tubular portion 261p in three directions. Further, the flanges 261q are formed to be capable of supporting the rod-shaped heating unit 251 inserted through the tubular portion 261p at the center of the column body 241 by allowing the distal edges of the plate support legs to abut the inner surface of the column body 241.

The support member 261, for example, is formed by combining three pieces of strip-shaped metal plates that each have been subjected to folding. Specifically, the flanges 261q are stacked over one another, thereby forming the plate support legs. Further, the flanges 261q are formed of both edges of the metal plates. Further, the flanges 261q thus stacked are joined by spot welding at a position 200Z closer to the tubular portion 261p than their distal edges.

In the support member 261, the plate support legs are arranged so that each angle between imaginary lines extending from the center of the tubular portion 261p through two of the distal edges of the plate support legs is 120°.

The thermal conductivity of metals is higher than the thermal conductivity of the adsorbent. Therefore, use of the support member 261 made of metal and provided with the flanges 261q or the leg portions 261b facilitates heat transfer, due to the flanges 261q or the leg portions 261b, from the heating unit 251 to the adsorbent present at a distance from the heating unit 251 during heating by the heating unit 251, as compared to an embodiment without using the support member 261. This brings about an advantage that the entire adsorbent can be heated efficiently.

Further, the support member 261 formed of metal plates and having the flanges 261q facilitates an increase in the contact efficiency between the heating unit 251 and the support member 261, and also an increase in the contact area between the support member 261 and the adsorbent, as compared to the case of the support member 261 formed of metal wire rods. Therefore, the flanges 261q make it easy for the support member 261 to transfer the heat from the heating unit 251 to the adsorbent present at a distance from the heating unit 251. Accordingly, the support member 261 has an advantage of being capable of efficiently heating the adsorbent entirely.

Furthermore, formation of the support member 261 using metal plates facilitates the production of the support member 261, as compared to the case of the support member 261 formed of metal wire rods. Accordingly, cost reduction is facilitated, which also is advantageous.

Figure 38:
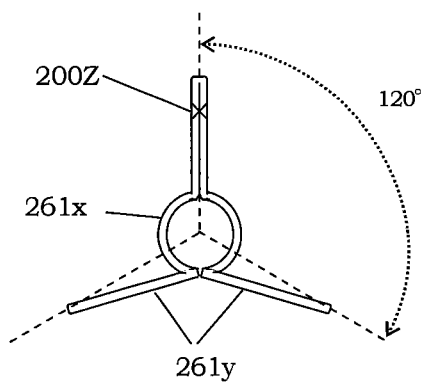
FIG. 38 is a cross sectional view, cut along a plane perpendicular to an extending direction of a heating unit, of a support member according to a modification.
Figure 39:
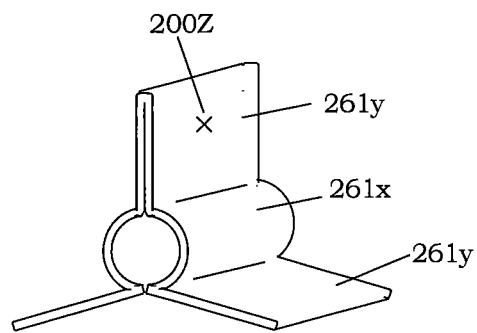
FIG. 39 is a perspective view showing the support member according to the modification.

Further, FIGS. 38 and 39 show another modification of the support member 261. FIG. 38 is a sectional view, cut along a plane perpendicular to the extending direction of the heating unit 251, of the modification, and FIG. 39 is a perspective view of the modification.

As shown in FIGS. 38 and 39, this modification of the support member 261 has a tube body 261x formed by combining a pair of half tube bodies, and flanges 261y extending outwardly from both edges of the half tube bodies. Further, in the support member 261, the flanges 261y are stacked together and joined to each other on one edge side of the half tube bodies. Further, on the other edge sides of the half tube bodies, the support member 261 has plate support legs extending away from each other, so that the plate support legs extend radially from the center of the tube body 261x in three directions. Further, the support member 261 is formed to be capable of supporting the rod-shaped heating unit 251 inserted through the tube body 261x at the center of the column body 241 by allowing the distal edges of the plate support legs to abut the inner surface of the column body 241.

The tube body 261x is formed so as to allow, while the relative positions of the half tube bodies to each other are substantially fixed on the side where the flanges 261y are joined to each other, the half tube bodies to extend away from each other on the other side. Further, the tube body 261x is formed so as to allow its diameter to expand or contract to some extent.

The support member 261, for example, is formed by folding one piece of strip-shaped metal plate. Two of the flanges 261y excluding the flanges 261y stacked together are composed of both edges of the metal plate. On the other hand, the flanges 261y stacked together are joined to each other at the distal edges along which the metal plate is folded. They are further joined by spot welding at the position 200Z closer to the tube body 261x than their distal edges.

In the support member 261, the plate support legs are arranged so that each angle between imaginary lines extending from the center of the tube body 261x through two of the distal edges of the plate support legs is 120°. Moreover, two plate support legs extending from the other edges of the half tube bodies are not arranged along the imaginary lines extending from the center of the tubular portion 261p through the distal edges of the plate support legs, as being different from the support member (modification shown in FIGS. 36 and 37) in which the three plate support legs are arranged along the imaginary lines.

Figure 40:
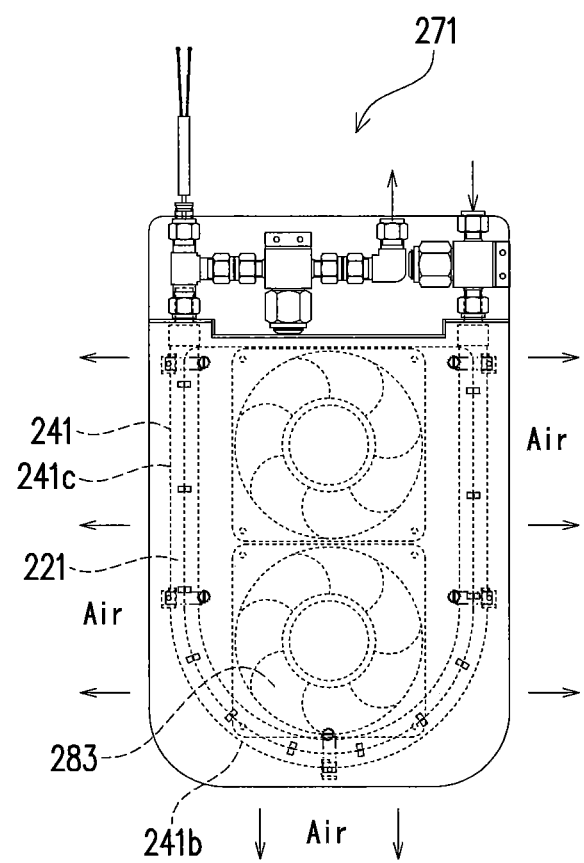
FIG. 40 is a schematic front view of a first adsorption unit of a dehumidifier according to another embodiment.
Figure 42:
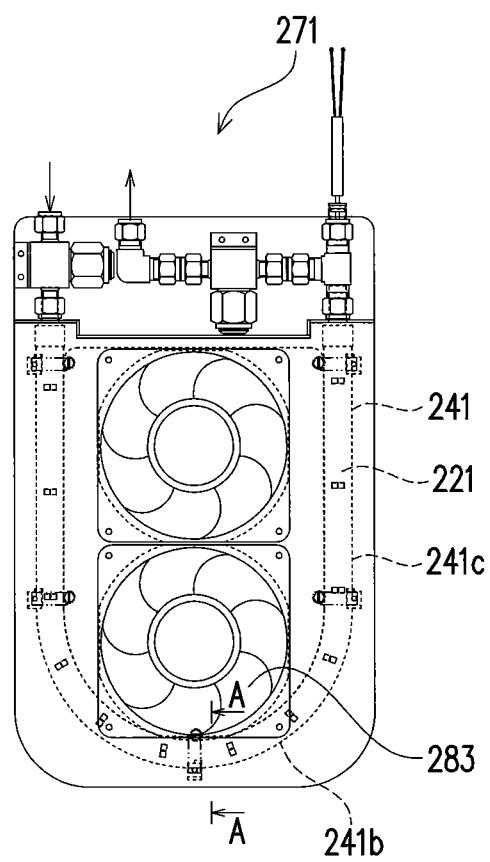
FIG. 42 is a schematic rear view of the first adsorption unit of the dehumidifier according to the other embodiment.
Figure 43:
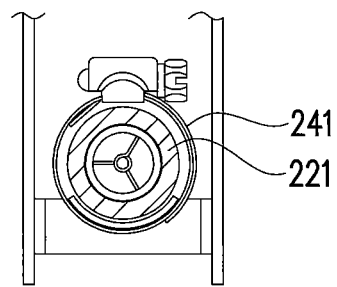
FIG. 43 is a cross sectional view in the direction of arrows A-A of FIG. 42.

Further, a modification of the dehumidifier 201 is described with reference to FIGS. 40 to 43. FIG. 40 is a front view of the first adsorption unit 271 of the dehumidifier 201. FIG. 41 is a side view of the first adsorption unit 271. FIG. 42 is a rear view of the first adsorption unit 271. FIG. 43 is a cross sectional view in the direction of arrows A-A of FIG. 42.

In this dehumidifier 201, the tube 241 of the adsorption column 221 is a U-shaped tube. The tube 241 includes a curved portion 241b curved into a semicircular shape, and two linear portions 241c extending from both ends of the curved portion 241b so as to be parallel to each other. In FIGS. 40 to 43, the curved portion 241b is arranged on the lower side as viewed from the front, and the linear portions 241c as a pair are arranged extending from both ends of the curved portion 241b in the vertical direction at a distance from each other on the left and right sides.

The dehumidifier 201 includes two plates capable of covering all the curved portion 241b and the pair of the linear portions 241c. The dehumidifier 201 includes the adsorption column 221 sandwiched between the two plates from the front (front surface) side and the rear (back surface) side. Each plate has a width in the left-right direction slightly larger than the diameter of the curved portion 241b. Further, the plate has a length in the vertical direction slightly larger than the total of the radius of the curved portion 241b and the length of the linear portions 241c. In this way, since the adsorption column 221 is sandwiched between the two plates from the front and rear sides, an internal space is formed in the dehumidifier 201 with three sides, which are the left and right sides and the lower side, being surrounded by the adsorption column 221 and with the front and rear sides being surrounded by the plates. Further, the dehumidifier 201 has a sealing part that seals the upper side of the internal space, so that gases are suppressed from circulating upwardly from the internal space. However, since the tube 241 of the adsorption column 221 is formed of a corrugated tube, gaps are formed between the tube 241 and the plate due to recesses of the corrugated tube. Thus, the internal space and the outside of the system are in communication with each other through the gaps in the part other than the sealing part. The plate on the rear side has an opening at the center. Two blowers 283 that supply a gas from the outside of the system to the internal space are provided at the opening. The dehumidifier 201 is configured so that the gas is supplied to the internal space by the blowers 283, thereby causing the gas to be discharged through the gaps to the outside of the system. The dehumidifier 201 is configured so that the adsorption column 221 is cooled by the circulation of the gas through the gaps.

Figure 45:
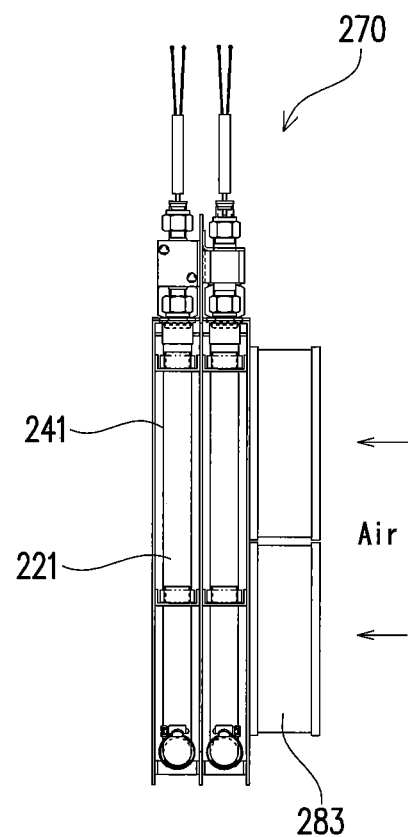
FIG. 45 is a schematic side view of the adsorption unit of the dehumidifier according to the other embodiment.
Figure 46:
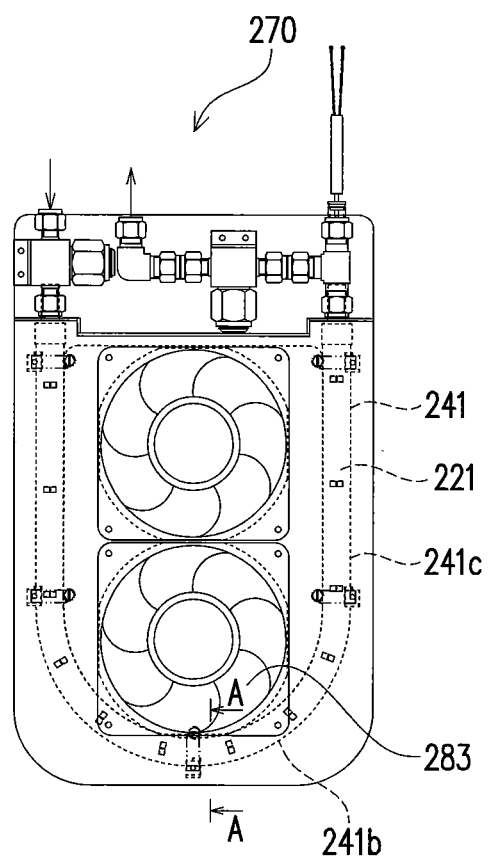
FIG. 46 is a schematic rear view of the adsorption unit of the dehumidifier according to the other embodiment.
Figure 47:
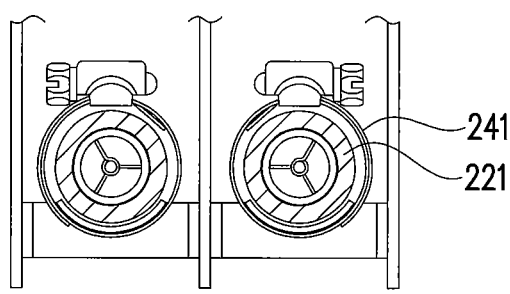
FIG. 47 is a cross sectional view in the direction of arrows A-A of FIG. 46.

It is also possible to employ an adsorption unit 270 obtained by combining two or more units each having the above-mentioned configuration. In this regard, for example, when combining two units, the first unit may be attached to the front side of the second unit after removing the blowers 283 on the rear side of the first unit and the plate on the front side of the second unit, as shown in FIGS. 44 to 47 (where FIG. 44 is a front view of the adsorption unit 270, FIG. 45 is a side view of the adsorption unit 270, FIG. 46 is a rear view of the adsorption unit 270, and FIG. 47 is a cross sectional view in the direction of arrows A-A of FIG. 46). That is, the adsorption unit 270 may be configured so that the internal space of the first unit and the internal space of the second unit are brought into communication with each other via a plate having an opening on the rear side of the first unit, thereby allowing the blowers 283 of the second unit to supply the gas to the internal space of the first unit.

Figure 48:
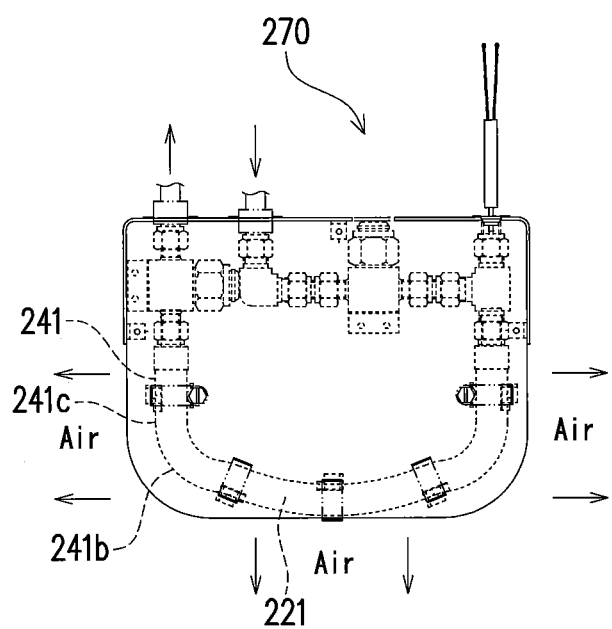
FIG. 48 is a schematic front view of an adsorption unit of a dehumidifier according to another embodiment.
Figure 49:
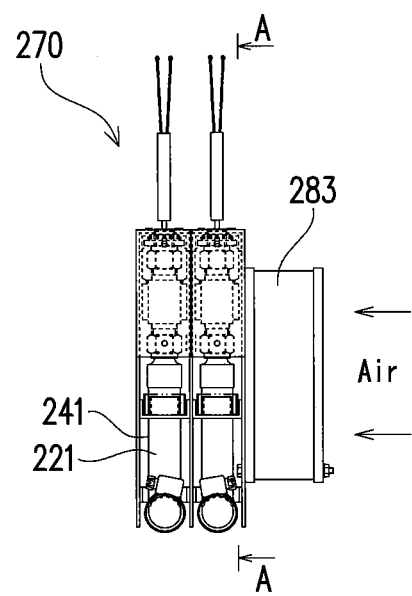
FIG. 49 is a schematic side view of the adsorption unit of the dehumidifier according to the other embodiment.
Figure 50:
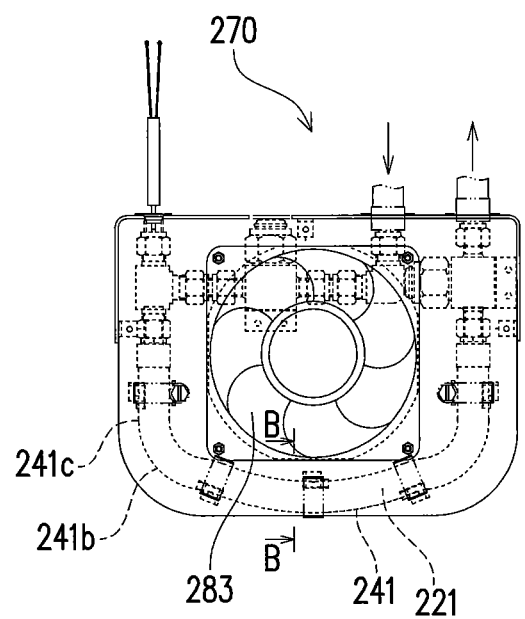
FIG. 50 is a schematic rear view of the adsorption unit of the dehumidifier according to the other embodiment.
Figure 51:
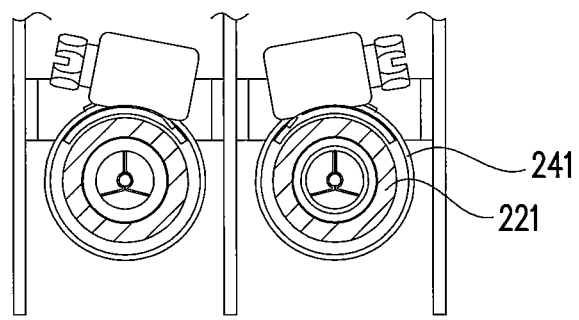
FIG. 51 is a cross sectional view in the direction of arrows B-B of FIG. 50.

Further, the blowers 283 may be reduced to one in the case of an embodiment including the linear portions 241c shorter than the linear portions 241c shown in FIGS. 44 to 47, as shown in FIGS. 48 to 52 (where FIG. 48 is a front view of the adsorption unit 270, FIG. 49 is a side view of the adsorption unit 270, FIG. 50 is a rear view of the adsorption unit 270, FIG. 51 is a cross sectional view in the direction of arrows B-B of FIG. 50, and FIG. 52 is a cross sectional view in the direction of arrows A-A of FIG. 49).

In a practical use, the dehumidifier is not necessarily used in the aforementioned directions.

Further, the dehumidifier 201 shown in FIGS. 40 to 52 is configured so that the gas is supplied to the internal space by the blowers 283, thereby causing the gas to be discharged through the gaps to the outside of the system. However, the dehumidifier of the present invention may be configured so that the gas is discharged from the internal space to the outside of the system by the blowers 283, thereby causing the gas to be supplied to the internal space through the gaps. In this case, the gas flow direction shown in FIGS. 40 to 52 is reversed.

Further, the adsorption unit 270 shown in FIGS. 44 to 52 is configured so that the gas is supplied to the internal space by the blowers 283, thereby causing the gas to be supplied to the surroundings of the two adsorption columns 221. However, the functions of both the first adsorption unit 271 and the second adsorption unit 272 shown in FIG. 27 can be exerted by employing a configuration in which the gas is supplied separately to these two adsorption columns 221. In that case, the dehumidifier may include a selection mechanism so that the gas from the blowers 283 can be distributed into the one adsorption column 221 on the near side and the other adsorption column 221 on the rear side, as viewed from the front, in FIG. 44.

The selection mechanism, for example, includes a shutter that is movable back and forth within the internal space, and a drive unit that drives the shutter to move back and forth. Specifically, the selection mechanism, for example, has a configuration in which a shutter formed by bending a plate having a width equal to the thickness of each adsorption column 221 into a U shape that is one size smaller than the adsorption column 221 is arranged along the inner side of the adsorption column 221, so that the gas flow into one adsorption column 221 (hereinafter referred to also as a "first adsorption column 221") is blocked and the gas flow is supplied only to the other adsorption column 221 (hereinafter referred to also as a "second adsorption column 221") when the shutter is arranged on the near side, whereas the gas flow into the second adsorption column 221 is blocked and the gas flow is supplied only to the first adsorption column 221 when the shutter is moved to the far side by the drive unit.

An operation process using this adsorption unit 270 is described as follows. First, the shutter is positioned on the near side, so that the first adsorption column 221 on the near side is isolated from the internal space, while allowing the to-be-treated gas to circulate through the first adsorption column 221 and the adsorbent in the first adsorption column 221 to adsorb moisture contained in the to-be-treated gas. Subsequently, after the adsorption performance in the first adsorption column 221 is degraded, the flow path of the to-be-treated gas is switched to the second adsorption column 221 on the far side, and thermal regeneration by the heating unit is performed in the first adsorption column 221. At this time, the shutter can suppress heat dissipation from the first adsorption column 221 and prevent heating of the second adsorption column 221. Then, after the adsorbent in the first adsorption column 221 is regenerated, the shutter is moved to the far side by the drive unit, and blowing is started by the blowers 283. Then, a blow is applied to the first adsorption column 221 by the blowers 283, so that the first adsorption column 221 is cooled. Subsequently, after the adsorption performance of the second adsorption column 221 is degraded, the flow path of the to-be-treated gas is switched to the first adsorption column 221 that has been sufficiently cooled, and regeneration is performed in the second adsorption column 221, in the same manner as mentioned above. In this way, the functions of both the first adsorption unit 271 and the second adsorption unit 272 shown in FIG. 27 can be exerted using the one adsorption unit 270.

Further, in the case where the tube 241 is a corrugated tube, the corrugated tube may be retained by a reinforcing member for maintaining the form of the corrugated tube.

<Third Embodiment>

Next, a dehumidifier according to a third embodiment is described.

The dehumidifier of the third embodiment includes a plurality of adsorption columns allowing at least one to-be-treated gas of hydrogen and oxygen produced by electrolysis of water to circulate therethrough so as to allow moisture in the to-be-treated gas to be adsorbed therein, and a connector coupling the adsorption columns to each other.

Each adsorption column has an adsorbent that adsorbs moisture, a column body that has a housing region containing the adsorbent, and a heating unit that is arranged within the column body and heats the adsorbent so as to cause desorption of the adsorbed moisture from the adsorbent.

In the dehumidifier according to the third embodiment, the adsorption columns include one adsorption column and another adsorption column arranged so as to be parallel to each other.

The connector is configured to couple the one adsorption column and the other adsorption column to each other on one end side of the adsorption columns.

The dehumidifier according to the third embodiment is configured to allow the to-be-treated gas, after circulating through the housing region of one adsorption column, to circulate through the housing region of the other adsorption column via the connector.

As a specific example, a dehumidifier provided with a plurality of sets of adsorption units including a plurality of the aforementioned adsorption columns for moisture removal from the to-be-treated gas is herein mentioned, and the third embodiment is described further in detail with reference to the drawings.

Figure 53:
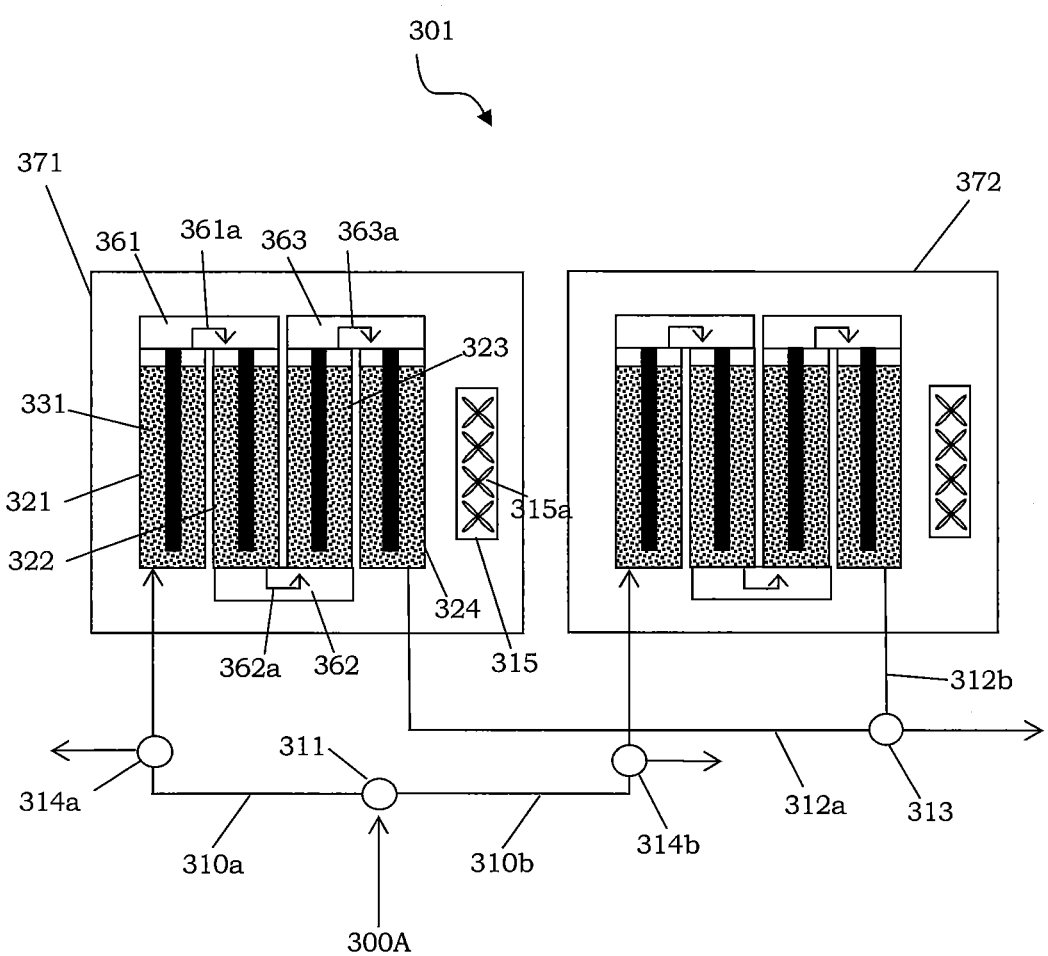
FIG. 53 is a schematic view schematically showing a dehumidifier.

FIG. 53 is a schematic view schematically showing a cross section in the up-down direction of the dehumidifier of the third embodiment.

In a dehumidifier 301 of the third embodiment, a to-be-treated gas 300A that is subjected to moisture removal is produced by electrolysis of water and is at least one of hydrogen and oxygen.

The to-be-treated gas 300A generally contains moisture because it is produced by electrolysis of water. Further, the to-be-treated gas 300A can be used for various applications after the moisture removal by the dehumidifier 301.

A conventionally known general device can be used as a device to be used in combination with the dehumidifier 301 of the third embodiment for producing the to-be-treated gas 300A, that is, a device for producing hydrogen and oxygen by electrolysis of water.

In the third embodiment, the dehumidifier 301 is described by exemplifying the case where the to-be-treated gas 300A to which a pressure higher than the atmospheric pressure is applied is supplied to the dehumidifier 301 so that the to-be-treated gas 300A can circulate through an adsorption column 321 including an adsorbent 331.

The dehumidifier 301 of the third embodiment includes two sets of adsorption units (371, 372) for removing moisture from the to-be-treated gas 300A, as shown in FIG. 53. These two sets of adsorption units include one adsorption unit (hereinafter referred to also as a "first adsorption unit (371)") and the other adsorption unit (hereinafter referred to also as a "second adsorption unit (372)") with the same configuration.

As shown in FIG. 53, the dehumidifier 301, for example, includes a supply conduit 310 configured to supply the to-be-treated gas 300A to the first adsorption unit 371 or the second adsorption unit 372, a supply valve 311 attached to the supply conduit 310, a discharge conduit 312 configured to discharge the to-be-treated gas 300A from which moisture has been removed (hereinafter referred to also as a "dried gas") by the first adsorption unit 371 or the second adsorption unit 372 to the outside of the dehumidifier 301, and a discharge valve 313 attached to the discharge conduit 312.

The supply conduit 310 is arranged so as to connect the first adsorption unit 371 and the second adsorption unit 372 to each other. Further, the supply valve 311 is attached to a position in the course of the conduit. The supply conduit 310 includes a first supply conduit 310a on the first adsorption unit 371 side of the supply valve 311 and a second supply conduit 310b on the second adsorption unit 372 side of the supply valve 311.

The supply valve 311 is configured to deliver the to-be-treated gas 300A supplied from the outside of the dehumidifier 301 to either the first supply conduit 310a or the second supply conduit 310b.

The first supply conduit 310a is configured to supply the to-be-treated gas 300A to the first adsorption unit 371 through the supply valve 311 attached to its one end.

The second supply conduit 310b is configured to supply the to-be-treated gas 300A to the second adsorption unit 372 through the supply valve 311 attached to its one end.

With such a configuration, the dehumidifier 301 of the third embodiment allows the to-be-treated gas 300A supplied from the outside of the dehumidifier 301 to be supplied to either the first supply conduit 310a or the second supply conduit 310b through the supply valve 311.

The discharge conduit 312 is arranged so as to connect the first adsorption unit 371 and the second adsorption unit 372 to each other. Further, the discharge valve 313 is attached to a position in the course of the conduit. The discharge conduit 312 includes a first discharge conduit 312a on the first adsorption unit 371 side of the discharge valve 313 and a second discharge conduit 312b on the second adsorption unit 372 side of the discharge valve 313.

The discharge valve 313 is configured to discharge a dried gas that has been generated in either the first adsorption unit 371 or the second adsorption unit 372 and delivered through the first discharge conduit 312a or the second discharge conduit 312b to the outside of the dehumidifier 301.

The first discharge conduit 312a is configured to discharge, from the first adsorption unit 371, a dried gas generated in the first adsorption unit 371 and deliver it to the discharge valve 313.

The second discharge conduit 312b is configured to discharge, from the second adsorption unit 372, a dried gas generated in the second adsorption unit 372 and deliver it to the discharge valve 313.

With such a configuration, the dehumidifier 301 of the third embodiment allows the dried gas generated in the first adsorption unit 371 or the second adsorption unit 372 to be discharged to the outside of the dehumidifier 301 through the discharge valve 313.

That is, the dehumidifier 301 is configured to switch the supply destination of the to-be-treated gas 300A between the first adsorption unit 371 and the second adsorption unit 372 using the supply valve 311, and supply the to-be-treated gas 300A to either one of the first adsorption unit 371 and the second adsorption unit 372 through either one of the supply conduits (310a, 310b). Further, the dehumidifier 301 is configured to discharge the dried gas from either the first adsorption unit 371 or the second adsorption unit 372 to the outside of the dehumidifier 301 through the discharge conduit 312 using the discharge valve 313.

Due to such a configuration of the dehumidifier 301, the adsorbent 331 that is contained in each of the plurality of adsorption columns and has already adsorbed moisture is allowed to desorb the moisture by heating so as to be thermally regenerated in the second adsorption unit 372, while moisture in the to-be-treated gas 300A is adsorbed in each of the plurality of adsorption columns in the first adsorption unit 371.

Further, the dehumidifier 301 includes release valves 314a and 314b attached respectively to the supply conduit 310a and the supply conduit 310b. Further, the dehumidifier 301 has a configuration in which, when the adsorbent is thermally regenerated in the second adsorption unit 372 while moisture is removed from the to-be-treated gas 300A in the first adsorption unit 371, part of the dried gas is allowed to flow back into the second adsorption unit 372 through the discharge valve 313 and the second discharge conduit 312b, so that water vapor generated due to the thermal regeneration in the second adsorption unit 372 can be released to the outside of the system through the release valve 314b attached to the second supply conduit 310b.

Meanwhile, the dehumidifier 301 has a configuration in which, when the adsorbent is thermally regenerated in the first adsorption unit 371 while moisture is removed from the to-be-treated gas 300A in the second adsorption unit 372, part of the dried gas is allowed to flow back into the first adsorption unit 371 through the discharge valve 313 and the first discharge conduit 312a, so that water vapor generated in the first adsorption unit 371 can be released to the outside of the system through the release valve 314a attached to the first supply conduit 310a.

With such a configuration, the dehumidifier 301, for example, is capable of thermally regenerating the adsorbent in the second adsorption unit 372, while removing moisture in a hydrogen gas serving as the to-be-treated gas 300A in the first adsorption unit 371. The dehumidifier 301 allows a part of the hydrogen gas from which moisture has been removed to flow back into the second adsorption unit 372 through the discharge valve 313 and the second discharge conduit 312b, thereby allowing water vapor generated due to the thermal regeneration in the second adsorption unit 372 to be released to the outside of the system through the release valve 314b attached to the second supply conduit 310b. Then, the dehumidifier 301 allows the adsorbent in the second adsorption unit 372 to be cooled by a backflow of the hydrogen gas from which moisture has been removed. In the same manner, it is also possible to perform the thermal regeneration and cooling of the adsorbent in the first adsorption unit 371 while performing the moisture removal from the hydrogen gas in the second adsorption unit 372.

Each adsorption unit includes a plurality, preferably at least two, more preferably at least three, further preferably at least four, of adsorption columns arranged parallel to each other. Since the plurality of adsorption columns are arranged parallel to each other, the dehumidifier 301 is suppressed from being elongated by a series arrangement of the same number of adsorption columns.

Specifically, as shown in FIG. 53, the dehumidifier 301 includes the first adsorption unit 371 including four adsorption columns, the first adsorption column 321 to the fourth adsorption column 324, arranged sequentially in rows so as to be parallel to one another so that the to-be-treated gas 300A circulates in the up-down direction, and the second adsorption unit 372 including four adsorption columns arranged in the same manner.

Further, the first adsorption unit 371 and the second adsorption unit 372 each include three aforementioned connectors. Each adsorption unit is configured so that each two adjacent adsorption columns are coupled by each connector on one end side.

The adsorption units 371 and 372 are each configured to allow the to-be-treated gas 300A to circulate sequentially through the housing regions of the four adsorption columns and the three connectors arranged in each unit.

More specifically, in the first adsorption unit 371, the first adsorption column 321 and the second adsorption column 322 are coupled by the first connector 361 on the upper side, and the second adsorption column 322 and the third adsorption column 323 are coupled by the second connector 362 on the lower side, as shown in FIG. 53. Similarly, the third adsorption column 323 and the fourth adsorption column 324 are coupled by the third connector 363, and the third connector 363 is arranged on the upper side in the same manner as the first connector 361.

Further, the first connector 361 that couples the first adsorption column 321 and the second adsorption column 322 together includes a communication passage 361a that allows communication between the housing region of the first adsorption column 321 and the housing region of the second adsorption column 322. Similarly, the second connector 362 and the third connector 363 respectively include communication passages 362a and 363a.

In the first adsorption unit 371, the circulation regions of each two adjacent adsorption columns are in communication with each other through the communication passage provided in the corresponding connector. In this way, the first adsorption unit 371 is configured to allow the to-be-treated gas 300A to circulate sequentially from the first adsorption column 321 to the fourth adsorption column 324 through the respective communication passages. The second adsorption unit 372 is configured in the same manner.

Since the dehumidifier 301 is configured as mentioned above, the circulation direction of the to-be-treated gas 300A is turned over a plurality of times during the time the to-be-treated gas 300A circulates from the first adsorption column 321 to the fourth adsorption column 324 in the first adsorption unit 371. That is, the dehumidifier 301 is configured so that the circulation direction of the to-be-treated gas 300A extends in a zigzag manner. When the length of the circulation path of the to-be-treated gas 300A is the same, the dehumidifier 301 is made more compact due to such a configuration in which the direction of the circulation path of the to-be-treated gas 300A extends in a zigzag manner. The same applies to the second adsorption unit 372.

The dehumidifier 301 preferably further includes a blower 315 that applies a blow from the outside to the plurality of adsorption columns so as to cool the adsorbent in the adsorption columns. Specifically, the dehumidifier 301 preferably includes the blower 315 in each of the housings respectively including the adsorption units 371 and 372, for example, as shown in FIG. 53.

The blower 315 has a plurality of fans 315a capable of applying a blow by rotating, and is arranged on one end side (for example, shown on the right of FIG. 53) of each housing.

The adsorbent contained in the adsorption columns can be cooled by activating the blower 315, thereby applying a blow toward the surroundings of the adsorption columns and applying the blow to the outer surfaces of the adsorption columns provided in the housing.

The blower 315 is preferably configured to apply the blow along a direction perpendicular to the axis directions of the column bodies of the adsorption columns.

As mentioned above, in the dehumidifier 301 of the third embodiment, one end side of one adsorption column and another adsorption column, which are adjacent two of the plurality of adsorption columns arranged in the first adsorption unit 371, serves as an upper side. The two adsorption columns are coupled to each other by the connector on the upper side. Specifically, the dehumidifier 301, for example, is configured so that the first adsorption column 321 that is the one adsorption column and the second adsorption column 322 that is the other adsorption column are coupled to each other by the first connector 361 on the upper side of the adsorption columns, and the to-be-treated gas that has circulated through the housing region of the first adsorption column 321 then circulates through the housing region of the second adsorption column 322 via the first connector 361.

Figure 54:
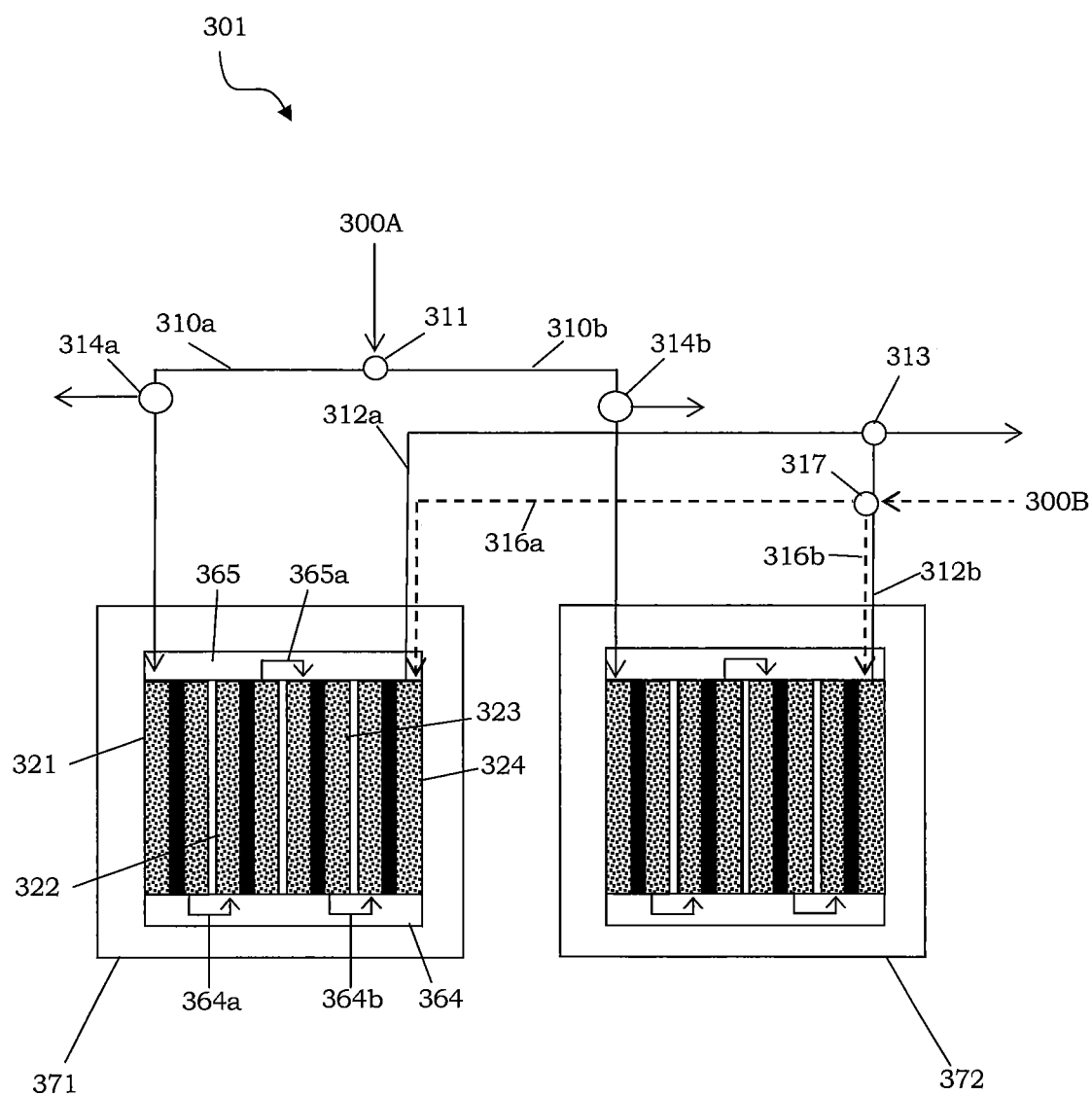
FIG. 54 is a schematic view schematically showing a dehumidifier.

Next, a modification of the dehumidifier 301 is described. FIG. 54 is a schematic view schematically showing a cross section in the horizontal direction of the modification of the dehumidifier 301. This dehumidifier includes a plurality of adsorption columns such that the to-be-treated gas 300A circulates in the horizontal direction.

The dehumidifier 301 according to the modification shown in FIG. 54 includes the first adsorption unit 371 and the second adsorption unit 372 in the same manner as the dehumidifier 301 shown in FIG. 53 mentioned above. The adsorption units each include four adsorption columns. Each adsorption unit is configured so that the to-be-treated gas 300A is supplied therein, thereby allowing moisture contained in the to-be-treated gas 300A to be removed, in the same manner as in the dehumidifier 301 shown in FIG. 53.

In each adsorption unit, four adsorption columns are arranged so that the to-be-treated gas 300A circulates in the horizontal direction, and the four adsorption columns are arranged parallel to one another.

The adsorption units each have two connectors. In each adsorption unit, the four adsorption columns are connected by one connector on one end side, and the four adsorption columns are connected by the other connector on the other end side.

Specifically, the first adsorption unit 371 is described as an example. The two connectors (364, 365) of the unit connect all the four adsorption columns, respectively on both end sides, as shown in FIG. 54. A connector 364 arranged on one end side of the four adsorption columns and connecting the four adsorption columns (321 to 324) on the one end side includes a communication passage 364a allowing communication between the housing region of the first adsorption column 321 and the housing region of the second adsorption column 322, and a communication passage 364b allowing communication between the housing region of the third adsorption column 323 and the housing region of the fourth adsorption column 324. On the other hand, a connector 365 arranged on the other end side of the four adsorption columns and connecting the four adsorption columns (321 to 324) on the other end side includes a communication passage 365a allowing communication between the housing region of the second adsorption column 322 and the housing region of the third adsorption column 323.

With such a configuration, the dehumidifier 301 allows the to-be-treated gas 300A containing moisture and supplied to the first adsorption unit 371 to circulate sequentially from the first adsorption column 321 to the fourth adsorption column 324, during which the moisture is removed therefrom, so as to be discharged out of the first adsorption unit 371.

Further, as shown in FIG. 54, the dehumidifier 301 may include a cooling conduit 316 allowing the stored hydrogen gas 300B from which moisture has already been removed to be supplied from the downstream side of each adsorption unit so as to flow back therethrough. That is, the dehumidifier 301 may include the cooling conduit 316 allowing a dried gas such as the hydrogen gas 300B to flow in a direction reverse to the circulation direction of the to-be-treated gas 300A.

The cooling conduit 316 is arranged so as to connect the first adsorption unit 371 and the second adsorption unit 372 to each other. The dehumidifier 301 includes a dried gas valve 317 provided in the course of the cooling conduit 316. The cooling conduit 316 includes a first cooling conduit 316a on the first adsorption unit 371 side of the dried gas valve 317 and a second cooling conduit 316b on the second adsorption unit 372 side of the dried gas valve 317.

The dried gas valve 317 is configured to deliver the hydrogen gas 300B to either the first cooling conduit 316a or the second cooling conduit 316b.

The first cooling conduit 316a is configured to supply the hydrogen gas 300B to the first adsorption unit 371 through the dried gas valve 317 attached to its one end.

The second cooling conduit 316b is configured to supply the hydrogen gas 300B to the second adsorption unit 372 through the dried gas valve 317 attached to its one end.

With such a configuration, the hydrogen gas 300B from which moisture has been removed is delivered to either the first cooling conduit 316a or the second cooling conduit 316b through the dried gas valve 317. Further, the hydrogen gas 300B supplied from either the first cooling conduit 316a or the second cooling conduit 316b circulates back through either the first adsorption unit 371 or the second adsorption unit 372, thereby allowing the adsorbent contained in the unit to be cooled. The hydrogen gas 300B used for the cooling is discharged through the above-mentioned release valve 314a or 314b.

Subsequently, the adsorption columns and the connectors of the dehumidifier 301 are described further in detail with reference to schematic views schematically showing the cross sections thereof.

Figure 55:
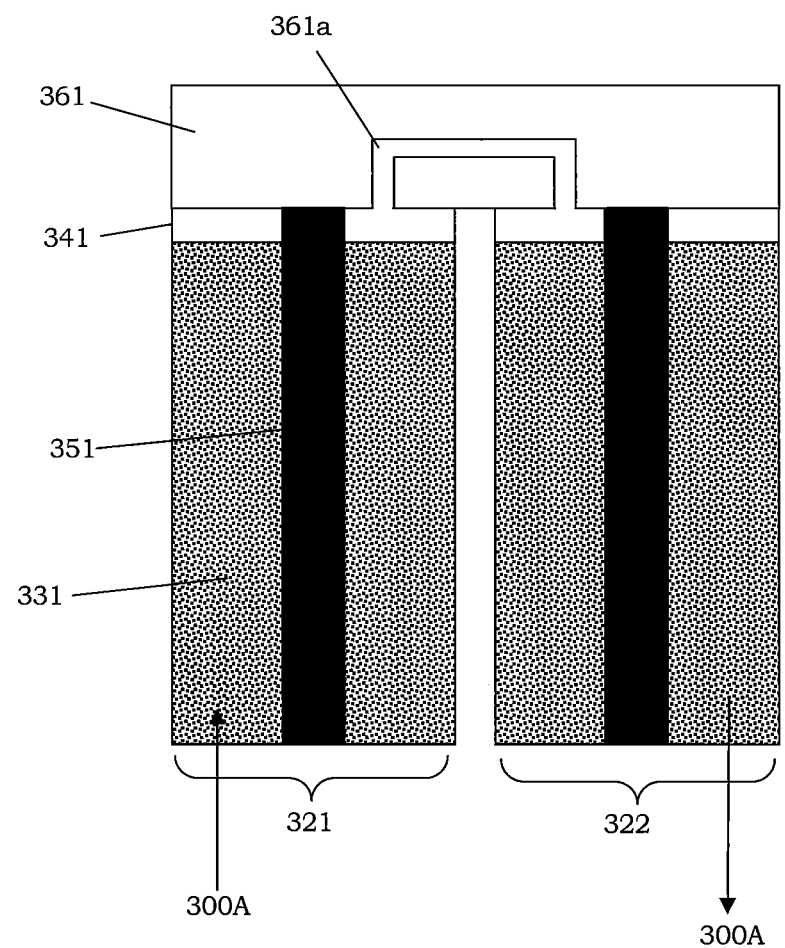
FIG. 55 is a schematic view schematically showing a cross section of an adsorption column and a connector of the dehumidifier.
Figure 56:
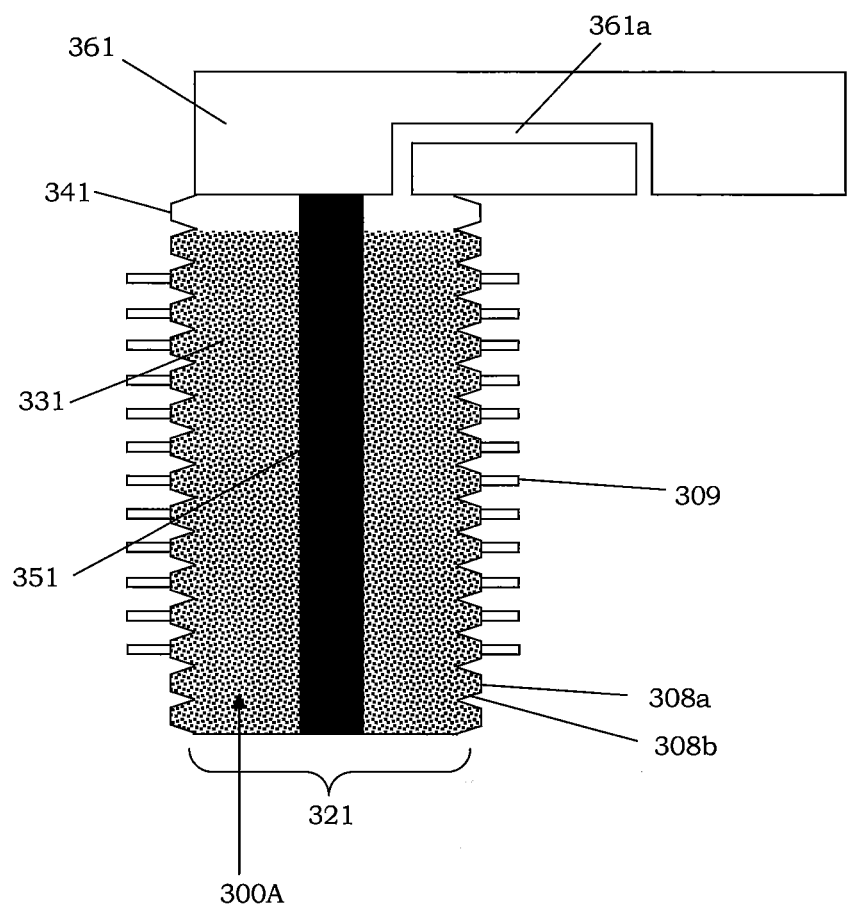
FIG. 56 is a schematic view schematically showing a cross section of the adsorption column and the connector of the dehumidifier.
Figure 57:
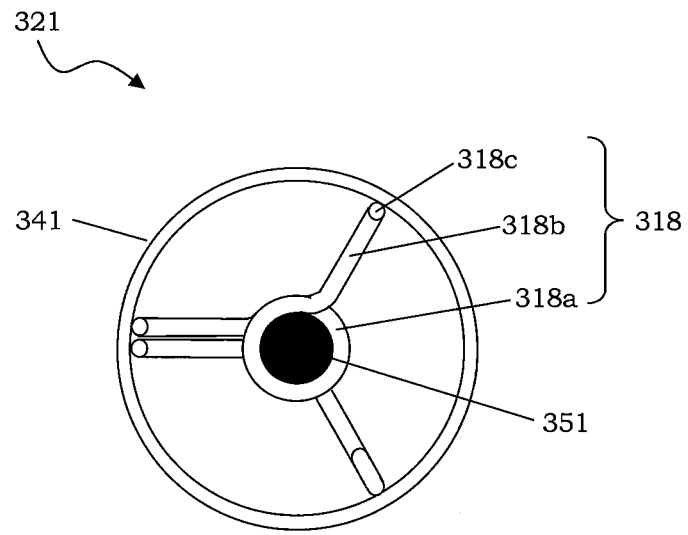
FIG. 57 is a schematic view schematically showing a cross section, cut along a direction perpendicular to a circulation direction of a to-be-treated gas, of the adsorption column of the dehumidifier.
Figure 58:
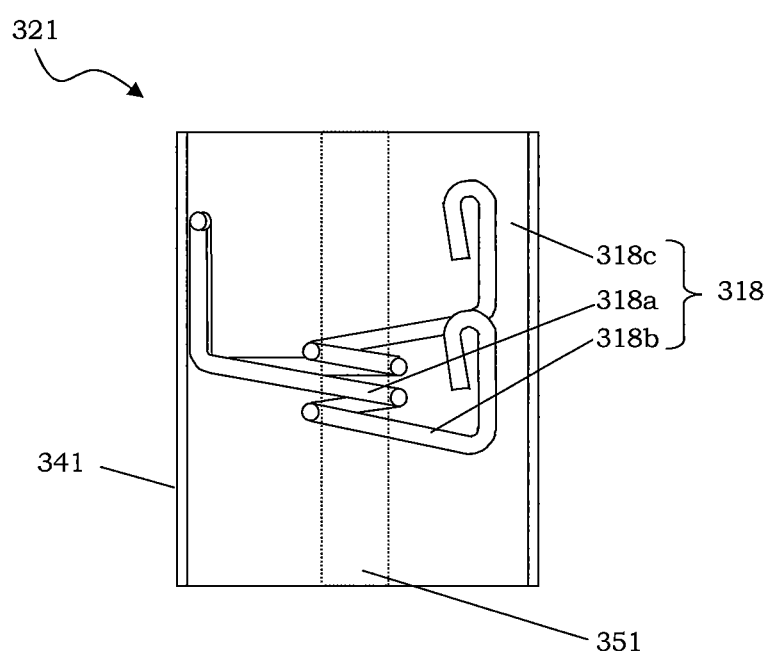
FIG. 58 is a schematic view schematically showing a cross section, cut along the circulation direction of the to-be-treated gas, of the adsorption column of the dehumidifier.

FIG. 55 is a schematic view schematically showing a cross section in the up-down direction of the adsorption columns and the connector in the first adsorption unit of the dehumidifier 301 shown in FIG. 53. FIG. 56 is a schematic view schematically showing a cross section, cut along the circulation direction of the to-be-treated gas, of one of the adsorption columns and the connector according to a modification of the dehumidifier 301 (where the second adsorption column 322 is not illustrated). FIGS. 57 and 58 are schematic views schematically showing cross sections, cut respectively along the circulation direction of the to-be-treated gas and a direction perpendicular thereto, of the adsorption column provided in the dehumidifier 301.

The column body 341 provided in the adsorption column 321, for example, is formed into a cylindrical shape.

Further, the column body 341 is formed so as to have a housing region capable of containing the adsorbent 331 that adsorbs moisture contained in the to-be-treated gas 300A. Furthermore, the column body 341 is provided in the adsorption column 321, as shown in FIG. 55.

Further, the column body 341 has a vent hole formed at each of both ends in the circulation direction of the to-be-treated gas 300A. The column body 341 is configured so that the to-be-treated gas 300A supplied through the vent hole on one end side is discharged through the vent hole on the other end side. Further, the vent hole at least on the one end side of the column body 341 is formed so as to allow communication between the housing region of the column body 341 and the internal space of the communication passage 361a provided in the connector 361. With such a configuration, the to-be-treated gas 300A supplied through the vent hole on the one end side is delivered into the internal space of the communication passage 361a through the housing region of the column body and the vent hole on the other end side.

Specifically, the first adsorption column 321 to which the to-be-treated gas is first supplied in the first adsorption unit is configured so that the to-be-treated gas supplied from the outside of the first adsorption unit is delivered to the housing region containing the adsorbent 331 through the vent hole on the other end side. Further, the fourth adsorption column 324 that finally adsorbs moisture in the to-be-treated gas in the first adsorption unit is configured so that the dried gas is discharged to the outside of the first adsorption unit through the vent hole on the other end side.

It is preferable that the column body 341, for example, is formed into a straight tube shape, as shown in FIG. 55, since there is no need for bending. When the column body 341 is formed into a straight tube shape, there is an advantage that the adsorption column 321 can be produced by comparatively easy processing.

Further, when the column body 341 is formed into a straight tube shape, it is possible to comparatively easily adjust the pressure resistance of the adsorption column 321 by appropriately changing the thickness of the material such as the metal that is used for forming the column body 341 or the connector 361, even in the case where the adsorption column 321 is required to be pressure-resistant.

The column body 341 having a straight tube shape, for example, has a diameter at least 0.7 cm but not more than 4 cm, preferably at least 1 cm but not more than 2 cm.

The column body 341 may be formed so as to have a recess and a projection repeatedly formed along the circulation direction of the to-be-treated gas 300A at least on its outer surface, as shown in FIG. 56, in order to further increase the outer surface area. When the outer surface of the column body 341 is formed as mentioned above, a projection 308a projecting outwardly and a recess 308b recessed inwardly are repeated in the cross section, cut in the circulation direction of the to-be-treated gas 300A, of the outer surface. Accordingly, the outer surface area of the column body 341 is more increased, so that the dehumidifier 301 can efficiently cool the adsorbent 331 from which moisture has been desorbed by heating. Further, there is also an advantage that, while an equivalent cooling efficiency is maintained, the length of the column body 341 can be shortened to the extent of enlargement of the outer surface area, supposed that the outer surface area of the column body 341 is the same. Accordingly, the column body 341 can be made compact by forming the outer surface of the column body 341 as described above. A corrugated tube can be used, for example, as the above-mentioned column body 341 having a recess and a projection repeatedly formed along the circulation direction of the to-be-treated gas 300A on its outer surface.

The heating unit 351, for example, is formed into a rod shape, as shown in FIG. 55. Further, the heating unit 351 is arranged within the column body 341 along the extending direction of the column body 341. Furthermore, the heating unit 351 is provided in the adsorption column 321. Moreover, the heating unit 351 is preferably arranged along the center axis of the column body 341 that is cylindrical, as shown in FIG. 55.

Specifically, the heating unit 351, for example, is provided with an electrical heater having a rod shape. Further, the heating unit 351 is configured to heat the adsorbent 331 contained in the column body 341 using the electrical heater. The electrical heater having a rod shape, for example, is configured to be in contact with the adsorbent contained in the housing region of the column body 341 on one end side and to extend, passing through the connector 361 (not shown in the figure), to the outside of the connector 361 on the other end side, so as to be connected to a power source for heating on the other end. The portion where the electrical heater passes through the connector 361 is sealed to prevent leakage of the hydrogen gas or incorporation of the outside air.

When the electrical heater that constitutes the heating unit 351 is formed into a rod shape and the column body 341 is formed into a straight tube shape, bending of the electrical heater and the column body 341 is not necessarily required, and it is thus comparatively easy to arrange the electrical heater along the center axis of the column body 341.

The adsorption column 321 may further include an electrical heater housed in the column body. Further, the adsorption column 321 may be configured to be capable of varying the heating temperature of the electrical heater independently. With such a configuration, it is possible to vary the temperature of electrical heaters one by one during the thermal regeneration of the adsorbent, so as to control the heating for each of the adsorption columns (for example, 321 to 324). Therefore, it is possible to efficiently heat the adsorption columns.

The adsorption column 321 includes the heating unit 351 arranged within the column body 341, as being different from the disclosure mentioned above in CITATION LIST, in which the heating unit is arranged along the outer circumference of the column body. Accordingly, heat is easily transferred directly to the adsorbent 331 within the column body 341, so that the adsorbent 331 can be efficiently heated. Further, different from the case where the heating unit is arranged along the outer circumference of the column body, it is not necessarily required to provide a heat insulator on the outer circumference of the column body. That is, it is not necessarily required, for example, to provide a heat insulator on the outer side of the heating unit so as to transfer heat for heating the adsorbent, as efficiently as possible, from the outside to the adsorbent. Accordingly, a decrease in cooling efficiency due to the heat insulator can be eliminated, to which extent the cooling time is shortened. Further, the cooling efficiency by the blower 315 also can be enhanced by eliminating the heat insulator provided along the outer circumference.

In this way, the adsorption column 321 includes the heating unit 351 arranged within the column body 341, and therefore the time to heat and cool the adsorbent 331 can be shortened.

Meanwhile, the dehumidifier 301 is configured so that the two sets of adsorption units each can alternately adsorb moisture in the to-be-treated gas, as has been described above. That is, the dehumidifier 301 is configured so that, while moisture in the to-be-treated gas is adsorbed in the plurality of adsorption columns of one adsorption unit, an adsorbent is thermally regenerated in the other adsorption unit. Further, the dehumidifier 301 is configured to cool the adsorbent after the thermal regeneration by allowing a dried gas such as a dried hydrogen gas to flow back.

When the dehumidifier 301 is configured as mentioned above, the time required for the adsorption of the moisture in the to-be-treated gas and the time required for the thermal regeneration and cooling of the adsorbent are adjusted to be equal, in general.

Accordingly, when the efficiency for cooling the adsorbent in the one adsorption unit is good and the cooling time is short, the time for the adsorption of the moisture in the to-be-treated gas in the other adsorption unit also can be shortened. Accordingly, the amount of adsorbent in the other adsorption unit also can be reduced to the extent that the time for the adsorption of the moisture in the to-be-treated gas can be shortened.

In this way, the dehumidifier 301 can be made compact by including the adsorption column 321 that can reduce the time to heat and cool the adsorbent 331 and by reducing the amount of adsorbent comparatively.

As the amount of adsorbent is reduced, the amount of dried gas to be allowed to flow back for cooling also can be reduced. The dried gas is part of the target substance obtained by the adsorption of moisture in one adsorption unit. Therefore, the amount of dried gas to be used for cooling the adsorbent is preferably as small as possible.

The region between the heating unit 351 and the column body 341 serves as the housing region containing the adsorbent 331, as shown in FIG. 55. The adsorbent 331 can be provided in the adsorption column 321 so as to occupy almost the entire housing region.

The adsorption column 321 may include a support member 318 arranged within the column body 341 so as to support the heating unit 351. Further, the heating unit 351 may be supported by the support member 318. FIGS. 57 to 62 show specific examples of the support member 318.

Specifically, as shown in FIGS. 57 and 58, the support member 318 including: a winding portion 318a formed by winding wire rods around the outer circumference of the heating unit 351; a plurality of leg portions 318b formed by allowing the wire rods to radially extend outwardly from the winding portion toward the inner side wall of the column body 341; and a plurality of pressing portions 318c formed, by bending the wire rods of the leg portions 318b at their outer ends so that each wire rod extends along the inner side wall of the column body 341, so as to press the inner side wall of the column body 341 by repulsive elastic forces of the thus bent wire rods, for example, can be used.

The support member 318 is formed, for example, by: winding metal wire rods into a spiral shape so as to form a cylindrical space; radially extending the metal wire rods that have been wound into a spiral shape until each metal wire rod abuts the inner side wall of the column body; further bending the metal wire rods so that each metal wire rod extends along the inner side wall of the column body; and thereafter bending back the metal wire rod in a direction opposite to the radial direction.

The aforementioned support member 318 is restricted from moving within the column body 341 by the repulsive elastic force of the plurality of pressing portions 318c. That is, the position of the winding portion 318a is fixed within the column body 341. This allows the support member 318 to support the heating unit 351 by the winding portion 318a restricting the movement of the heating unit 351 having a rod shape.

Figure 59:
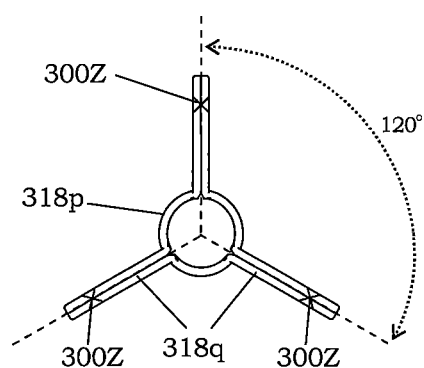
FIG. 59 is a cross sectional view, cut along a plane perpendicular to an extending direction of a heating unit, of a support member according to a modification.
Figure 60:
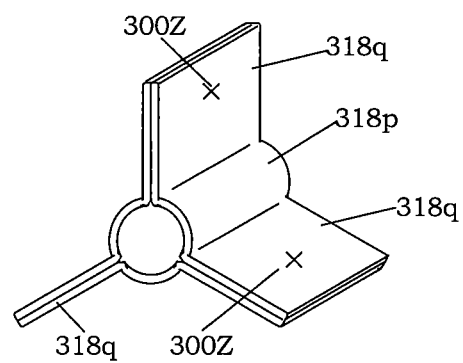
FIG. 60 is a perspective view showing the support member according to the modification.

Moreover, FIGS. 59 and 60 show a modification of the support member 318. FIG. 59 is a sectional view, cut along a plane perpendicular to the extending direction of the heating unit 351, of the modification, and FIG. 60 is a perspective view of the modification.

As shown in FIGS. 59 and 60, this modification of the support member 318 has a tubular portion 318p formed by combining three three-segmented tube bodies so as to cover the heating unit 351 having a round bar shape, and flanges 318q having a rectangular plate shape respectively extending outwardly from both edges of the three-segmented tube bodies. A total of six pieces of flanges 318q respectively extending from both edges of the three-segmented tube bodies include plate support legs, two adjacent pieces of which are stacked together, extending radially from the center of the tubular portion 318p in three directions. Further, the flanges 318q are formed to be capable of supporting the rod-shaped heating unit 351 inserted through the tubular portion 318p at the center of the column body 341 by allowing the distal edges of the plate support legs to abut the inner surface of the column body 341.

The support member 318, for example, is formed by combining three pieces of strip-shaped metal plates that each have been subjected to folding. Specifically, the flanges 318q are stacked over one another, thereby forming the plate support legs. The flanges 318q are formed of both edges of the metal plates.

Further, the flanges 318q thus stacked are joined by spot welding at a position 300Z closer to the tubular portion 318p than their distal edges.

In the support member 318, the plate support legs are arranged so that each angle between imaginary lines extending from the center of the tubular portion 318p through two of the distal edges of the plate support legs is 120°.

The thermal conductivity of metals is higher than the thermal conductivity of the adsorbent. Therefore, use of the support member 318 provided with the flanges 318q or the leg portions 318b made of metal facilitates heat transfer, due to the flanges 318q or the leg portions 318b, from the heating unit 351 to the adsorbent present at a distance from the heating unit 351 during heating by the heating unit 351, as compared to an embodiment using the support member 318 that is not made of metal. Accordingly, this brings about an advantage that the entire adsorbent can be heated efficiently.

Use of the support member 318 formed of metal plates and having the flanges 318q (see FIGS. 59 and 60, FIGS. 61 and 62, etc.) further increases the contact efficiency between the heating unit 351 and the support member 318 and the contact area between the support member 318 and the adsorbent, as compared to the embodiment using the support member 318 formed of metal wire rods (see FIGS. 57 and 58, etc.). Therefore, the flanges 318q make it easy for the support member 318 to transfer the heat from the heating unit 351 to the adsorbent present at a distance from the heating unit 351. Accordingly, the support member 318 has an advantage of being capable of more efficiently heating the adsorbent entirely.

Further, since it is comparatively easy to form the support member 318 using metal plates, use of the support member 318 formed of metal plates (see FIGS. 59 and 60, and FIGS.

61 and 62) brings about an advantage that the production cost of the dehumidifier is easily reduced, as compared to the case of using the above-mentioned support member 318 formed of metal wire rods (see FIGS. 57 and 58).

Further, FIGS. 61 and 62 show another modification of the support member 318. FIG. 61 is a sectional view, cut along a plane perpendicular to the extending direction of the heating unit 351, of the modification, and FIG. 62 is a perspective view of the modification.

As shown in FIGS. 61 and 62, this modification of the support member 318 has a tube body 318x formed by combining a pair of half tube bodies, and flanges 318y extending outwardly from both edges of the half tube bodies. Further, in the support member 318, the flanges 318y are stacked together and joined to each other on one edge side of the half tube bodies. Further, on the other edge sides of the half tube bodies, the support member 318 has plate support legs extending away from each other, so that the plate support legs extend radially from the center of the tube body 318x in three directions. Further, the support member 318 is formed to be capable of supporting the rod-shaped heating unit 351 inserted through the tube body 318x at the center of the column body 341 by allowing the distal edges of the plate support legs to abut the inner surface of the column body 341.

The tube body 318x is formed so as to allow, while the relative positions of the half tube bodies to each other are substantially fixed on the side where the flanges 318y are joined to each other, the half tube bodies to extend away from each other on the other side. Further, the tube body 318x is formed so as to allow its diameter to expand or contract to some extent.

The support member 318, for example, is formed by folding one piece of strip-shaped metal plate. Two of the flanges 318y excluding the flanges 318y stacked together are composed of both edges of the metal plate. On the other hand, the flanges 318y stacked together are joined to each other at the distal edges along which the metal plate is folded. They are further joined by spot welding at the position 300Z closer to the tube body 318x than their distal edges.

In the support member 318, the plate support legs are arranged so that each angle between imaginary lines extending from the center of the tube body 318x through two of the distal edges of the plate support legs is 120°. Moreover, two plate support legs extending from the other edges of the half tube bodies are not arranged along the imaginary lines extending from the center of the tubular portion 318p through the distal edges of the plate support legs, as being different from the support member (modification shown in FIGS. 59 and 60) in which the three plate support legs are arranged along the imaginary lines.

The adsorption column 321 may further include a plurality of fins 309 each lying along the circumferential direction and extending outwardly from the outer surface of the column body 341, as shown in FIG. 56. When the adsorption column 321 further includes the plurality of fins 309, the outer surface area of the adsorption column 321 is more enlarged, so that the adsorbent 331 from which moisture has been desorbed by heating can be efficiently cooled. Further, there is an advantage that, while an equivalent cooling efficiency is maintained, the length of the adsorption column 321 can be shortened to the extent of enlargement of the outer surface area due to the fins 309, supposed that the outer surface area of the adsorption column 321 is the same. Accordingly, the adsorption column 321 can be made compact by the adsorption column 321 further including the plurality of fins 309.

The adsorption column 321 may be configured so that the column body 341 includes two tubular bodies (not shown in the figure) each having a different diameter, where the tubular bodies are arranged so that their cylinder axes coincide with each other and a space is provided between the tubular bodies. That is, the column body 341 in which an inner cylinder having a smaller diameter is arranged inside an outer cylinder having a larger diameter may be configured to allow a fluid to circulate through the space between the two cylinders. With such a configuration, the adsorbent 331 contained in the column body 341 can be more efficiently cooled by allowing a refrigerant such as water and an antifreeze solution to circulate between the inner cylinder and the outer cylinder when cooling the adsorbent 331.

Further, the adsorption column 321 may further include a refrigerant pipe (not shown in the figure) wound around the outer circumference of the column body 341 and allowing the refrigerant to circulate therethrough. The adsorbent 331 contained in the column body 341 can be more efficiently cooled by allowing a refrigerant such as water and an antifreeze solution to circulate through the cooling conduit.

Examples of the adsorbent 331 include conventionally known general adsorbents, specifically, such as granular synthetic zeolite, silica gel, and active alumina.

As shown in FIG. 55, the connector 361 couples the first adsorption column 321 and the second adsorption column 322 arranged parallel to the first adsorption column 321 each other on one end side. Further, the connector 361 includes the communication passage 361a formed so as to allow communication between the housing region of the first adsorption column 321 and the housing region of the second adsorption column 322. With such a configuration, the dehumidifier 301 allows the to-be-treated gas 300A that has circulated through the housing region of the first adsorption column 321 to further circulate through the housing region of the second adsorption column 322 via the communication passage 361a.

Subsequently, a method of using the dehumidifier 301 is described.

In the dehumidifier 301, the to-be-treated gas 300A circulates through the plurality of the adsorption columns each containing the adsorbent 331, thereby causing moisture contained in the to-be-treated gas 300A to be adsorbed on the adsorbent 331, so that the moisture contained in the to-be-treated gas 300A can be removed.

Further, in the dehumidifier 301, the to-be-treated gas 300A containing moisture is supplied to the first adsorption unit 371, for example, by operating the supply valve 311 shown in FIG. 53, as has been described above, so that the moisture in the to-be-treated gas 300A can be adsorbed on the adsorbent 331 in the first adsorption unit 371. On the other hand, while moisture in the to-be-treated gas 300A is adsorbed on the adsorbent 331 in the first unit, the adsorbent 331 that has already adsorbed moisture can be thermally regenerated in the second adsorption unit 372 by desorption of the moisture which is caused by heating of the heating unit 351.

The dehumidifier 301 can allow a dried gas for cooling such as a dried hydrogen gas to flow back through the adsorption columns (for example, 321 to 324) in order to cool the adsorbent 331 that has been heated by the heating unit 351 and has desorbed moisture. The adsorbent 331 can be cooled, for example, by being left standing after termination of heating of the heating unit 351.

Further, the dehumidifier 301 can continuously dehumidify the to-be-treated gas 300A without intervals, by switching the supply destination of the to-be-treated gas 300A containing moisture between the first adsorption unit 371 and the second adsorption unit 372 at specific time periods, as has been described above.

In the dehumidifier 301, a blow can be applied from the outside to the adsorption column containing the adsorbent 331 so as to cool the adsorbent 331 that has been heated. That is, the adsorbent 331 contained in the plurality of adsorption columns in each adsorption unit can be cooled by activating the above-mentioned blower 315, thereby allowing the air for cooling to circulate around the adsorption columns (for example 321 to 324).

Further, the adsorbent within the column body can be cooled, as described above, by using the adsorption column provided with a column body composed of an inner cylinder and an outer cylinder each having a different diameter, and allowing a refrigerant such as water and an antifreeze solution to flow between the inner cylinder and the outer cylinder. Further, the adsorbent 331 contained in the column body can be cooled, as described above, by using the refrigerant pipe wound around the outer circumference of the column body 341, and allowing the refrigerant to circulate therethrough. The cooling efficiency is more enhanced by cooling the adsorbent in such a manner.

Further, it is also possible to employ the cooling using the adsorption column provided with an inner cylinder and an outer cylinder, the cooling using the refrigerant pipe, and the cooling using the blower 315, in combination.

The dehumidifier of the third embodiment is configured as mentioned above, and thus has the following advantages.

That is, the dehumidifier 301 of the third embodiment includes the plurality of adsorption columns 321 and 322 through which at least one to-be-treated gas 300A of hydrogen and oxygen produced by electrolysis of water circulates, so that moisture in the to-be-treated gas 300A is adsorbed, and the connector 361 coupling the adsorption columns 321 and 322 to each other. The adsorption columns 321 and 322 each have the adsorbent 331 that adsorbs moisture, the column body 341 that has a housing region containing the adsorbent 331, and the heating unit 351 that is arranged within the column body 341 and causes the adsorbent 331 to desorb the adsorbed moisture by heating the adsorbent 331.

In the dehumidifier 301 according to the third embodiment, one adsorption column 321 and another adsorption column 322 of the adsorption columns are arranged so as to be parallel to each other.

The connector 361 is configured to couple the one adsorption column 321 and the other adsorption column 322 to each other on one end side of the adsorption columns 321 and 322.

The dehumidifier according to the third embodiment is configured to allow the to-be-treated gas 300A, after circulating through the housing region of the one adsorption column 321, to circulate through the housing region of the other adsorption column 322 via the connector 361.

According to the dehumidifier 301, the circulation direction of the to-be-treated gas 300A is turned over, during the time the to-be-treated gas 300A circulates from the one adsorption column 321 and the other adsorption column 322. Accordingly, the dehumidifier 301 is configured such that a long adsorption column is folded up, and therefore the possibility of occurrence of a constraint in installation space can be reduced, while the decrease in the efficiency of moisture removal is suppressed.

In the dehumidifier 301 of the third embodiment, the adsorption column 321 further includes the plurality of fins 309 each lying along the circumferential direction.

According to the dehumidifier 301, the outer surface area of the adsorption column 321 is more enlarged, so that the adsorbent 331 from which moisture has been desorbed by heating can be efficiently cooled. There is also an advantage that, while an equivalent cooling efficiency is maintained, the length of the adsorption column 321 can be shortened to the extent of enlargement of the outer surface area due to the fins 309, supposed that the outer surface area of the adsorption column 321 is the same. Accordingly, the adsorption column 321 can be made compact by the adsorption column 321 further including the plurality of fins 309.

The dehumidifier 301 of the third embodiment further includes the blower 315 capable of applying a blow from the outside to the adsorption column 321 so as to cool the adsorbent 331 in the adsorption column 321.

According to the dehumidifier 301, the adsorbent 331 from which moisture has been desorbed by heating can be efficiently cooled.

The dehumidifier of the third embodiment is as has been exemplified above. However, the present invention is not limited to the above-exemplified dehumidifier.

Further, various embodiments to be used for common dehumidifiers can be employed, as long as the effects of the present invention are not impaired.

In the above-mentioned embodiments, the dehumidifier provided with a plurality of adsorption columns arranged in rows so as to be parallel to each other is described. However, the present invention is not limited to such an embodiment. For example, the present invention may be embodied as a dehumidifier provided with a plurality of adsorption columns, in such a manner that one adsorption column is surrounded by other adsorption columns, and those adsorption columns are parallel to each other.

Further, in the above-mentioned embodiments, the dehumidifier provided with the connector coupling two adjacent adsorption columns to each other is described. However, the dehumidifier may be provided with a connector coupling adsorption columns that are not adjacent to each other, for example.

Further, the dehumidifier described in the above-mentioned embodiments is configured so that, for example, when the adsorbent is thermally regenerated in a unit having four adsorption columns, a dried gas is supplied from the downstream side (discharge valve 313 side), thereby causing a gas containing water vapor after passing through all the adsorption columns to be released through the release valve 314, which however is not restrictive. The dehumidifier may be configured so that the gas containing water vapor can be released from each of the adsorption columns when the adsorbent is thermally regenerated by providing a conduit and a valve for drainage in each adsorption column. According to this dehumidifier, in operation to cause adsorption of moisture in the gas in the plurality of adsorption columns, a hydrogen gas or the like that has passed through all the adsorption columns and has been sufficiently dried over a specific time can be obtained, whereas a hydrogen gas containing water vapor is released from each of the adsorption columns when the adsorbent is regenerated, thereby suppressing the hydrogen gas or the like containing water vapor from flowing into the adsorption column on the upstream side. Therefore, it is possible to control the regeneration of the adsorbent for each adsorption column, thereby allowing efficient regeneration in the dehumidifier.

REFERENCE SIGNS LIST

1: Dehumidifier
10: Supply Conduit
10a: First Supply Conduit
10b: Second Supply Conduit
11: Supply Valve
12: Discharge Conduit 12a: First Discharge Conduit
12b: Second Discharge Conduit
13: Discharge Valve
14a: First Release Valve
14b: Second Release Valve
21: Adsorption Column
41: Column Body (Tube)
41a: Housing Region
41b: Bent Portion
41c: Linear Portion
41d: Projection
41e: Recess
51: Heating Unit
61: Support Member
61a: Winding Portion
61b: Leg Portions
61c: Pressing Portion
61p: Tubular Portion
61q: Flange
61x: Tube Body
61y: Flange
70: Adsorption Unit
71: First Adsorption Unit
72: Second Adsorption Unit
80: Duct
81: Fixing base
81a: Wall Plate
81b: Fixing member
82: Cover
82a: Ceiling Wall
82b: Sidewall
83: Blower
91: Fin
92: Adsorbent
A: To-be-treated gas
B: Dried Gas
201: Dehumidifier
210: Supply Conduit
210a: First Supply Conduit
210b: Second Supply Conduit
211: Supply Valve
212: Discharge Conduit
212a: First Discharge Conduit
212b: Second Discharge Conduit
213: Discharge Valve
214a: First Release Valve
214b: Second Release Valve
221: Adsorption Column
241: Column Body (Tube)
241a: Housing Region
241b: Bent Portion
241c: Linear Portion
241: Projection
242: Recess
251: Heating Unit
261: Support Member
261a: Winding Portion
261b: Leg Portions
261c: Pressing Portion
261p: Tubular Portion
261q: Flange
261x: Tube Body
261y: Flange
270: Adsorption Unit
271: First Adsorption Unit
272: Second Adsorption Unit
280: Duct
281: Fixing base
281a: Wall Plate
281b: Fixing member
282: Cover
282a: Ceiling Wall
282b: Sidewall
283: Blower
291: Fin
292: Adsorbent
200a: To-be-treated Gas
200b: Dried Gas
301: Dehumidifier
309: Fin
315: Blower
321 To 324: Adsorption Column
331: Adsorbent
341: Column Body
351: Heating Unit
361 to 365: Connector
371: First Adsorption Unit
372: Second Adsorption Unit

The invention claimed is:

1. A dehumidifier comprising:
an adsorption column allowing at least one to-be-treated gas of hydrogen and oxygen produced by electrolysis of water to circulate therethrough so as to allow moisture in the to-be-treated gas to be adsorbed therein, wherein
the adsorption column comprises:
an adsorbent capable of adsorbing moisture;
a column body having a housing region containing the adsorbent; and
a heating unit arranged within the column body and capable of heating the adsorbent so as to cause desorption of the adsorbed moisture from the adsorbent,
the column body is a tube having a bent portion, and
the tube is a corrugated tube having a recess and a projection repeatedly formed along the circulation direction of the to-be-treated gas on its outer surface.

2. The dehumidifier according to claim 1, wherein
the heating unit is formed into a rod shape, and
the adsorption column further comprises a support member arranged within the column body and capable of supporting the heating unit along a center axis of the column body.

3. The dehumidifier according to claim 1, further comprising
a fin in contact with an outer surface of the tube.

4. The dehumidifier according to claim 1, further comprising
a duct housing the adsorption column therein and allowing a gas for cooling the adsorption column to circulate therethrough, wherein
the duct is formed so as to have a zigzag flow path for the gas circulating in the duct.

5. A method for producing a dehumidifier, the dehumidifier comprising:
an adsorption column allowing at least one to-be-treated gas of hydrogen and oxygen produced by electrolysis of water to circulate therethrough so as to allow moisture in the to-be-treated gas to be adsorbed therein,
the adsorption column comprising:
an adsorbent capable of adsorbing moisture;
a column body having a housing region containing the adsorbent; and
a heating unit arranged within the column body and capable of heating the adsorbent so as to cause desorption of the adsorbed moisture from the adsorbent, the method comprising:
    after loading an inside of a straight tube constituting the column body with the heating unit and the adsorbent, bending the tube, so as to produce the dehumidifier including the column body formed of a tube having a bent portion,
wherein the tube is a corrugated tube having a recess and a projection repeatedly formed along the circulation direction of the to-be-treated gas on its outer surface.

* * * * *